US009706755B2

(12) United States Patent  
Furton et al.

(10) Patent No.: US 9,706,755 B2  
(45) Date of Patent: Jul. 18, 2017

(54) CONTROLLED ODOR MIMIC PERMEATION SYSTEM

(75) Inventors: Kenneth G. Furton, Miami, FL (US); Ross J. Harper, Stillwater, OK (US)

(73) Assignee: FLORIDA INTERNATIONAL, Miami, FL (US)

( * ) Notice: Subject to any disclaimer, the term of this patent is extended or adjusted under 35 U.S.C. 154(b) by 1317 days.

(21) Appl. No.: 11/779,815

(22) Filed: Jul. 18, 2007

(65) Prior Publication Data

US 2008/0295783 A1 Dec. 4, 2008

Related U.S. Application Data

(60) Provisional application No. 60/831,556, filed on Jul. 18, 2006.

(51) Int. Cl.
*A01K 15/02* (2006.01)
*F41H 11/132* (2011.01)

(52) U.S. Cl.
CPC ............ *A01K 15/02* (2013.01); *F41H 11/132* (2013.01)

(58) Field of Classification Search
CPC ..................................................... A01K 15/02
(Continued)

(56) References Cited

U.S. PATENT DOCUMENTS 4,605,165 A * 8/1986 Van Loveren et al. ............ 239/6
5,648,636 A * 7/1997 Simpson et al. ............... 102/355

(Continued)

OTHER PUBLICATIONS

Phillips, Training Dogs for Explosves Detection, http://www.dtic.mil/dtic/tr/fulltext/u2/733469.pdf, Oct. 1971, pp. 1-49.*

(Continued)

*Primary Examiner* — Danielle Clerkley  
(74) *Attorney, Agent, or Firm* — Marshall, Gerstein & Borun LLP

(57) ABSTRACT

The primary aspect of the Controlled Odor Mimic Permeation System (COMPS) is that it provides a field deployable instant and reproducible source of known amounts of target odors. This technology consists of a permeable polymer container (chosen to suit target odor and release rate required), stored inside a non-permeable package. The design allows for the pre-equilibration of the target odors such that the outer surface of the inner package can saturate with odor during storage. Removal of the inner item then provides an instant and reproducible source of known target vapor flux. We have successfully demonstrated this technology by placing the target odor chemicals within permeable membranes such as low density polyethylene which are then sealed within a non-permeable membranes such as metallized polyester. This design has multiple advantages including preventing cross contamination when storing multiple odor targets (5-10 targets are commonly employed) as well as being light-weight disposable, low unit cost potential, no external power/operating unit/machinery/hardware, simple to use and providing a known reproducible concentration of the target odors to the detector in the field. The applications of these COMPS include the whole range of biological (e.g. detector dog) and electronic (e.g. field sensors) detectors with examples such as explosives (e.g. 2-ethyl-1-hexanol simulating plasticized explosives), drugs (e.g. 3,4-methyl-enedioxybenzaldehyde simulating ecstasy), human remains (including dimethyl disulfide and pentanoic acid) and live human scent (including 5-heptene-2-one and nonanol).

19 Claims, 57 Drawing Sheets

Table 3 - Explosive categories and sub-categories

(58) Field of Classification Search
USPC ......... 119/711, 712; 422/2, 3, 117, 68.1, 69; 436/8; 239/6; 102/355
See application file for complete search history.

(56) References Cited

U.S. PATENT DOCUMENTS

| | | | |
|---|---|---|---|
| 6,109,537 A * | 8/2000 | Heath | 239/6 |
| 6,766,612 B1 * | 7/2004 | Liu | 43/125 |
| 2001/0047771 A1 * | 12/2001 | Bulanda et al. | 119/712 |
| 2005/0284414 A1 * | 12/2005 | Garcia et al. | 119/721 |
| 2006/0037509 A1 * | 2/2006 | Kneisl | 102/355 |
| 2007/0221087 A1 * | 9/2007 | Adebimpe et al. | 102/355 |

OTHER PUBLICATIONS

"IFRI/NFSTC Detector Dog Team Certification Program," (2003) URL:http://www.fiu.edu/~ifri/detector_dogs.htm.
Bach, "Canine-Assisted Detection, in Alternatives for Landmine Detection," Appendix T, RAND Corporation, pp. 285-299 (2003).
Black and Smokeless Powders: Technologies for Finding Bombs and the Bomb Makers, National Academy Press, (1998).
Bromenshenk et al., Alternatives for Landmine Detection, Appendix S, RAND Corporation, pp. 273-283 (2003).
Göpel, "From Electronic to Bioelectronic Olfaction, or: From Artifica 'Moses'to Real Noese," *Sensors and Actuators B*, 65:70-72 (2000).
Heramb et al., "The Manufacture of Smokeless Powders and Their Forensic Analysis: A Brief Review," *Forensic Sci. Comm.*, 4(2):1-4 (2002). Table of Contents only.
Lorenzo et al., "Laboratory and Field Experiments used to Identify Canis lupos var. Familiaris Active Odor Signature Chemicals from Drugs, Explosives, and Humans," *Analytical and Bioanalytical Chemistry*, 376:1212-1224 (2003).
Moore, "Instrumentation for Trace Detection of High Explosives," *Review of Scientic Instruments*, 75(8):2499-2512 (2004).
Perr et al., "Solid Phase Microextraction Ion Mobility Spectrometer Interface for Explosive and Taggant Detection," *J. Sep Sci.*, 28:177-183 (2005).
Pinnaduwage et al., "A Sensitive, Handheld Vapor Sensor Based on Microcantilevers," *Review of Scientific Instruments*, 75(11):4554-4557 (2004).
Schaefer et al., "Structure of Hexamethylene Triperoxide Diamine," *Journal of the American Chemical Society*, 107:2461-2463 (1985).
Settles et al., "Aerodynamic Sampling for Landmine Trace Detection," *Proceedings of SPIE*, 4394:890-898 (2001).
Yinon, "Peer Reviewed: Detection of Explosives by Electronic Noses," *Analytical Chemistry*, 75(5): 99A-105A (2003).
http://www.iasl.mcgill.ca/airlaw/public/aviation security/montreal1991.pdf. accessed on Mar. 10, 2005.
Akhavan, The Chemistry of Explosives, Royal Society of Chemistry, (1998).
Barnberger et al., Proceedings of the Third Symposium on Analysis and Detection of Explosives, (1989).
Beveridge, "Development in the Detection and Identification of Explosive Residues," *Forensic Science Review*, 4(17):17-49 (1992).
*Collins English Dictionary*, 6th Edition, (2003).
*Containing the Threat from Illegal Bombings: An Integrated National Strategy for Marking, Tagging, Rendering Inert, and Licensing Explosives and Their Precursors*, National Academy Press, (1998).
Douse, "Trace Analysis of Explosives in Handswab Extracts using Amberlite XAD-7 Porous Polymer Beads, Silica Capillary Column Gas Chromatography with Electron-Capture Detection and Thin-Layer Chromatography," *Journal of Chromatography*, 234(2):415-425 (1982).
Existing and Potential Standoff Explosives Detection Techniques, National Academies Press, (2004).
Glattstein et al., "Determination of Oxidizing Anions in Explosive Mixtures by Phase Transfer," *Journal of Energetic Materials*, 4:149-157 (1986).
Harper et al., Proceedings of the 1st Olfactory-Based Systems for Security Applications Meeting, (2004).
Harper et al., Proceedings of the 8th International Symposium on the Analysis and Detection of Explosives, (2004).
Johnston et al., "Canine Detection Odor Signatures for Mine-Related Explosives," *Proceedings of SPIE*, 3392:490-501 (1998).
Johnston et al., "Enhanced Canine Explosive Detection: Odor Generalization," Unclassified Final Report for Contract No. DAAD05-96-D-7019, Office of Special Technology (1999).
MacCrehan et al., "A Qualitative Comparison of Smokeless Powder Measurements," *Journal of Forensic Sciences*, 47(5):996-1001 (2002).
Mistafa, K9 Explosive Detection, (1998).
Odor Recognition Proficiency Standard for Explosives Detection Canines, Department of Justice, ATF Draft Publication (2003).
Peak, "A Thin-Layer Chromatographic Procedure for Confirming the Presence and Identity of Smokeless Power Flakes," *Journal of Forensic Sciences*, 25:679-681 (1980).
Penton, Method Development with Solid Phase Microextraction, Solid Phase Microextraction: A Practial Guide, Wercinski ed. (1999).
Perr et al., Proceedings of the 8th International Symposium on the Analysis and Detection of Explosive, (2004).
Reutter et al., Proceedings of the International Symposium on the Analysis and Detection of Explosives, pp. 149-158 (1983).
Tamiri et al., "Capillary col. Gas Chromatography/Mass Spectrometry of Explosives," *Journal of Energetic Materials*, 4:215-237 (1986).
Wan, Analysis of Explosive Odor Signatures and Detector Dog Performance Employing Solid Phase Microextraction/Gas Chromatography (SPME/GC) and Controlled Polymer Permeation, FIU Masters Thesis (2002).
Williams et al., "Canine Detection Odor Signatures for Explosives," *Proceedings of SPIE*, 3575:291-301 (1998).
Yinon et al., *Modern Methods and Applications in Analysis of Explosives*, John Wiley & Sons, (1993).
Zitrin et al., Proceedings of the International Symposium on the Analysis and Detection of Explosives, pp. 137-141 (1983).
Zitrin, "Post Explosive Analysis of Explosives by Mass Spectrometric Methods," *Journal of Energetic Materials*, 4:199-214 (1986).

* cited by examiner

Table 3 - Explosive categories and sub-categories

Table 4 - Stages of the Explosive Train

Table 9 - Various techniques currently available for detection of explosives

Table 12 - Explosive Fillers 1992 through 1996

Table 15 - SPME Fibre Chemistry Optimisation for TNT

Table 16 - SPME Fibre Chemistry Optimisation for C-4

Table 17 - Effect of SPME Exposure time on Extraction

Table 18 - Effect of SPME exposure temperature for 1 minute sampling

Table 19 - Effect of SPME exposure temperature for 30 minute sampling

Table 20 - Injection Port Temperature Optimisation for TNT

Table 21 - Injection Port Temperature Optimisation for C-4

Table 22 - SPME-GC-MS Headspace of TNT Explosive

Table 23 - SPME-GC-MS Headspace of TNT and HDP-1 Sheet

Table 24 - SPME-GC-MS Headspace of Tetratol & Composition B

Table 25 - SPME-GC-MS Headspace of Composition 4

Table 26 - SPME-GC-MS Headspace of Composition 4

Table 27 - SPME-GC-MS Headspace of Deta Sheet

Table 28 - SPME-GC-MS Headspace of Booster Charges

| | TNT | Tetratol | HDP-4 Sheet | Composition B | Composition 4 | Deta Sheet | Booster (TNT) | Booster (PETN) |
|---|---|---|---|---|---|---|---|---|
| 1,3-Dinotrobenzene | 0/3 | 1/1 | 1/1 | 0/1 | | | | |
| 1,3,5-Trinitrobenzene | 0/3 | 0/1 | 0/1 | 0/1 | | | | |
| 2,4-Dinitrotoluene | 2/1 | 1/1 | 1/1 | 1/1 | | | | |
| 2,6-Dintrotoluene | 0/3 | 1/1 | 1/1 | 1/1 | | | | |
| 3,5-Dinitrotoluene | 1/2 | 1/1 | 0/1 | 1/1 | | | | |
| 2,4,6-Trinitrotoluene | 3/3 | 1/1 | 0/1 | 1/1 | | | | |
| Cyclohexanone | | | | | 1/4 | 0/2 | 0/1 | 0/1 |
| 2,3-Dimethyl,-2,3-dinitrobutane | | | | | 3/4 | 1/2 | 1/1 | 1/1 |
| 2-Ethyl-1-hexanol | | | | | 3/4 | 1/2 | 1/1 | 0/1 |
| 2-Ethyl-1-hexanoic Acid | | | | | 1/4 | 0/2 | 1/1 | 0/1 |
| Phenol | | | | | 1/4 | 0/2 | 0/1 | 0/1 |
| Citric Acid Tributylacetyl Ester | | | | | 0/4 | 1/4 | 0/4 | 0/1 |
| Acetic Acid Butyl Ester | | | | | 0/4 | 1/4 | 0/4 | 0/4 |
| Acetic Acid 2-Ethylhexyl Ester | | | | | 0/4 | 1/4 | 0/4 | 0/4 |

Table 29 - Frequency of occurrence of headspace chemicals for High Explosives

FIGURE 19

Table 30 - SPME-GC-ECD Headspace of Plasticised Explosives

Table 31 - SPME-GC-MS Headspace of Hodgdon Single Based Powders

Table 32 - SPME-GC-MS Headspace of IMR Single Based Powders

Table 33 - SPME-GC-MS Headspace of Vihtavuori Single Based Powders

Table 34 - SPME-GC-MS Headspace of Vihtavuori Single Based Powders

Table 35 - SPME-GC-MS Headspace of Accurate Arms Double Based Powders

Table 36 - SPME-GC-MS Headspace of Hodgdon Double Based Powders

Table 37 - SPME-GC-MS of Vihtavuori Double Based Powders

Table 38 - SPME-GC-MS Headspace of Military Rounds

Table 39 - SPME-GC-MS Headspace of Sigma Aldrich Pseudo Powder

Table 40 - SPME-GC-ECD Headspace of Single Based Powders

Table 41 - SPME-GC-ECD Headspace of Double Based Powders

| | Hodgdon 4350 | Hodgdon 4831 | IMR 3031 | IMR 4831 | Vihtavuori N110 | Vihtavuori N140 | Vihtavuori N150 | Vihtavuori N160 | Sigma Pseudo Powder |
|---|---|---|---|---|---|---|---|---|---|
| 2,4-Dinitrotoluene | X | X | X | X | | | | | |
| 2,6-Dinitrotoluene | | X | X | | | | | | |
| 2,4,6-Trinitrotoluene | | X | X | | | | | | |
| Diphenylamine | X | X | X | X | | X | X | X | |
| Ethyl Centralite | | | | | X | X | X | X | |
| Methyl Isobutyl Ketone | | | | | | | | | X |

Table 42 - Summary of headspace chemicals for Single Based Smokeless Powders

FIGURE 32

| | Accurate Arms 2230 | Accurate Arms 2520 | Hodgdon Clays | Hodgdon 414 | Vihtavuori 540 | Vihtavuori 560 |
|---|---|---|---|---|---|---|
| Dinitroglycerin | X | X | X | X | X | X |
| Trinitroglycerin | X | X | X | X | X | X |
| 2,4-Dinitrotoluene | X | X | | | | |
| 2,6-Dinitrotoluene | X | X | | | | |
| 2-Nitrotoluene | X | X | | | | |
| 2-Nitrophenol | X | X | | | | |
| Diphenylamine | | | X | X | | |
| 2-Nitrodiphenylamine | | | X | X | X | X |
| 4-Nitrodiphenylamine | | | X | X | | |
| N-ethyl-N-nitrosodiphenylamine | X | X | | | | |
| Ethyl Centralite | X | X | | | | |
| Dibutyl Phthalate | | | X | X | | |
| Ethyl Acetate | | | | X | | |
| 2-Ethyl-1-hexanol | | | X | | | |
| Acetic Acid 2-ethylhexyl Ester | | | X | | | |
| Acetic Acid Butyl Ester | X | X | | | | |
| Benzoic Acid Butyl Ester | | | X | X | | |

Table 43 - Summary of headspace chemicals for Double Based Smokeless Powders

FIGURE 33

Table 44 - SPME-GC-MS Headspace of NESTT Petrolatum Training Aids

Table 45 - SPME-GC-MS Headspace of NESTT Petrolatum Training Aids

Table 46 - SPME-GC-MS Headspace of NESTT Petrolatum Training Aids

Table 47 - SPME-GC-ECD Headspace of NESTT Petrolatum Training Aids

Table 48 - SPME-GC-MS Headspace of NESTT Silica Training Aids

Table 49 - SPME-GC-MS Headspace of NESTT Silica Training Aids

Table 50 - SPME-GC-ECD Headspace of NESTT Silica Training Aids

Table 73 - Evaporation of Acetonitrile from Cotton

Table 74 - Evaporation of Acetonitrile to Deliver Odor Compounds

Table 75 - Permeation of 1,3-Dinitrobenzene through LDPE

Table 76 - Permeation of 2,6-Dinitrotoluene through LDPE

Table 77 - Permeation of 2,4-Dinitrotoluene through LDPE

Table 78 - Permeation of Diphenylamine through LDPE

Table 79 - Permeation of 2,3-Dimethyl-2,3-dinitrobutane through LDPE

Table 80 - Permeation of Cyclohexanone through LDPE

Table 81 - Permeation of 2-Ethyl-1-hexanol through LDPE

| Odor Compound | Permeation Rate through 2mil LDPE |
|---|---|
| 1,3-Dinitrobenzene | $1.174 \times 10^2$ pg s$^{-1}$ |
| 2,4-Dinitrotoluene | $8.036 \times 10^1$ pg s$^{-1}$ |
| 2,6-Dinitrotoluene | $1.556 \times 10^2$ pg s$^{-1}$ |
| Cyclohexanone | $9,745 \times 10^2$ ng s$^{-1}$ |
| 2-Ethyl-1-hexanol | $4.36 \times 10^1$ ng s$^{-1}$ |
| 2,3-Dimethyl-2,3-dintrobutane | $1.03 \times 10^3$ pg s$^{-1}$ |
| Diphenylamine | $3.23 \times 10^3$ pg s$^{-1}$ |

Table 82 - Permeation Rates of Odor Compounds

FIGURE 50

Table 83 - Permeation of 2,4-Dinitrotoluene through different plastics

Table 84 - Permeation of 2,3-Dimethyl-2,3-dinitrobutane through different plastics Table 85 - Permeation of Diphenylamine through different plastics Table 86 - Permeation of 2-Ethyl-1-hexanol through different plastics Table 87 - Permeation of 2-Ethyl-1-hexanol through different plastics Table 88 - Comparative headspace of inner and outer bags in C-4 mimic aid Table 89 - Mass observation of C-4 mimic aid

CONTROLLED ODOR MIMIC PERMEATION SYSTEM

CROSS-REFERENCE TO RELATED APPLICATION

This application claims the benefit of priority of provisional application Ser. No. 60/831,556 filed Jul. 18, 2006, hereby incorporated by reference in its entirety.

FIELD OF THE INVENTION

The use of canines as a method of detection of explosives is well established worldwide and those applying this technology range from police forces and law enforcement to humanitarian agencies in the developing world. Despite the recent surge in publication of novel instrumental sensors for explosives detection, canines are still regarded by many to be the most effective real-time field method of explosives detection. However, unlike instrumental methods, currently it is difficult to determine detection levels, perform calibration of the canines' ability or produce scientifically valid quality control checks. Accordingly, amongst increasingly strict requirements regarding forensic evidence admission such as Frye and Daubert, there is a need for better scientific understanding of the process of canine detection.

When translated to the field of canine detection, just like any instrumental technique, peer reviewed publication of the reliability, success and error rates, is required for admissibility. Commonly training is focussed towards high explosives such as TNT and Composition 4, and the low explosives such as Black and Smokeless Powders are added often only for completeness.

It was demonstrated that TNT and cast explosives share a common odor signature, and the same may be said for plasticized explosives such as Composition C-4 and Deta Sheet. Conversely, smokeless powders were demonstrated not to share common odors. An evaluation of the effectiveness of commercially available pseudo aids reported limited success. The implications of the explosive odor studies upon canine training then led to the development of novel inert training aids based upon the active odors determined.

Permeation rates of reported odor compounds of explosives, were determined for selected polymers including Low Density Polyethylene, Polypropylene, Cellophane, and Kapak plastic bags. Different rates of permeation were observed for the various polymers. Development of controlled odor production devices, using the various polymers lead to a "double-bag" design, and a non-permeable outer bag. This double bag design prevents the escape of odors from within the inner bag. Removal of the outer bag provides the odor from within the inner bag, at a controlled rate. We are calling this design the Controlled Odor Mimic Permeation System (COMPS).

The problem of odor contamination between detector dog training aids requires complex storage needs. The containment of odor in non-permeable packaging resolves this issue. Furthermore the rate of permeation can be controlled to provide a known amount of odor over a set time, and provides a process of controlling the rate of permeation of odor compounds through assorted polymer materials, including materials that prevent the transfer of chemical odor.

This technology provides new possibilities to develop inert calibration materials for canine and instrumental detection applications. There are also applications in odor sample storage, and in proficiency training of dogs, dog handlers, and/or instrument operators.

BACKGROUND OF THE INVENTION

Explosives and Explosions

An explosion is defined simply as a sudden release of mechanical, chemical or nuclear energy, associated with the generation of high temperatures and the discharge of gases [1]. However this study has focussed solely upon the conventional chemical explosive. An explosive is any substance that promotes or causes an explosion. Given that a chemical explosion may be recognised simply as a very fast combustion, an explosive requires both a fuel source and an oxygen source. Explosives can be separated into several sub categories, depending upon their chemical properties and applications, such as low/high, and primary/secondary explosives [2].

Low Explosives

Low explosives; often referred to as propellants, have low detonation velocities (less than the speed of sound) when compared with high explosives. In fact, the explosion of a low explosive is actually a deflagration, a very rapid combustion, rather than an actual detonation. Applications of propellants, as the name would suggest, are primarily related to the propulsion of rockets, missiles and other ballistic projectiles such as bullets. Examples of propellants include Black Powder and Smokeless Powder.

The explosive power of low explosives is proportional to the degree of confinement of a given volume. Even with optimal conditions, the shockwave produced by a powder bomb is subsonic. Low explosives are commonly encountered in domestic explosive incidents as fillers for pipebombs and improvised devices.

Black Powder

Black Powder, dating back to ancient Chinese times, is probably one of the oldest explosives, and is used in various applications including gun propellant, blasting fuses, distress rockets and fireworks. It is a mechanical mixture of fuel and oxidant, such as potassium (or sodium) nitrate, charcoal and sulphur, sensitive to spark, heat and friction. Large quantities of white smoke are created upon burning, which proved a major disadvantage of using black powder as an early rifle powder, revealing the position of snipers and obscuring the battlefield. Black powder is still used today by gun enthusiasts in muzzle loading rifles, and is readily available in gun and outdoor supply stores.

Smokeless Powder

Smokeless Powder, as the name suggests, is a replacement propellant that does not produce the volumes of smoke associated with the combustion of black powder. Smokeless powders are classified into single, double, or triple based, according to the energetic materials included during production. The single-based propellants use only nitrocellulose as the energetic, whereas double-based also includes the addition of trinitroglycerin. Triple-based powders are rarely observed outside of high calibre military applications, and include nitroguanidine as the tertiary energetic. In addition to the energetics, other components are added during manufacture to provide the desired final product.

TABLE 1

Smokeless Powder Compositions from Manufacturers' MSDS

| Manufacturer | Base | Nitro-Cellulose | Nitro-Glycerine | Dinitro-toluene | Diphenyl-amine | Ethyl Centralite | Dibutyl Phthalate |
|---|---|---|---|---|---|---|---|
| Accurate Arms | Single | <98% | | <10% | <2% | <6% | <3% |
| Accurate Arms | Double | <85% | 1-40% | <2% | <2% | <8.5% | <10% |
| Alliant | Double | N/A | 4-40% | | .5-1% | | <3.5% |
| Hodgdon | Single | >90% | | 1-10% | 1% | | |
| Hodgdon | Double | >85% | 10% | | 1% | | |
| IMR | Single | >90% | | 1-10% | 1% | | |
| IMR | Double | >85% | 10% | | 1% | | |
| Vihtavuori | Single | >90% | | | <3% | <6% | |
| Vihtavuori | Double | >65% | <25% | | <3% | <6% | |
| Winchester | Double | 40-70% | 10-60% | | .5-1.5% | 3-7% | 1-5% |

(N/A - present, but actual content not available)

Stabilisers are used to increase shelf life, by removing nitric acid formed during decomposition of the nitrated energetics. Common stabilisers include diphenylamine and its nitrated derivatives, methyl centralite and ethyl centralite. Plasticisers reduce the hygroscopicity of the powders, soften the powder granules, and reduce the need for solvents. Plasticisers used include dinitrotoluenes, phthalates, ethyl centralite and trinitroglycerin itself. Deterrents are used to coat the powder, reducing the initial burn rate, and lowering the burn temperature. Deterrents used include dinitrotoluenes, ethyl centralite, methyl centralite and phthalates. Inorganic additives such as earth metal salts are added as flash suppressants, and opacifiers such as carbon black can be added to increase the reproducibility of the burn rate [3]. Note that several of the listed additive chemicals serve multiple purposes, as shown in Table 2. Ethyl Centralite can be applied as a stabiliser, plasticiser and deterrent. Similarly, dinitrotoluenes can be used as both a plasticiser and a deterrent. Table 1 represents composition data from six powder manufacturers, taken from their respective material data sheets. Different manufacturers often choose different additives, resulting in the potential individuality of odor headspaces. Some of these may be more volatile than the explosive itself, offering a characteristic odor signature for canine detection.

TABLE 2

Common Additives in Smokeless Powder

| Stabilisers | Plasticisers | Deterrents |
|---|---|---|
| Diphenylamine | Trinitroglycerin | Dinitrotoluene |
| Nitro-diphenylamine | Dinitrotoluene | Methyl Centralite |
| Methyl Centralite | Ethyl Centralite | Ethyl Centralite |
| Ethyl Centralite | Dibutyl Phthalate | Dibutyl Phthalate |

High Explosives

High explosives have a detonation velocity far greater than the speed of sound, and the explosion can be classified as a true detonation. There are 5 principle chemical categories of organic high explosives including aliphatic nitrates (C—$NO_2$), aromatic nitrates (Ar—$NO_2$), nitramines (C—N—$NO_2$), nitrate esters (C—O—$NO_2$) and peroxides (C—O—O—C) as represented in Table 5. Some inorganic salt ($NH_4^+$, $NO_3^-$, $ClO_4^-$, & $ClO_3^-$) based binaries can also form high explosive products when combined with suitable sources of fuel.

The majority of the high explosives are stable to flame, friction and spark initiation, requiring a high velocity shockwave to detonate them. These explosives are referred to as secondary explosives. Whilst most high explosives encountered are secondary explosives, a special category of high explosives known as the primary explosives exists, based upon their application and sensitivity to initiation.

Primary Explosives

Primary explosives are high explosives that are initiated through flame, friction or electrical spark. The increased sensitivity of the primary explosives makes them ideal for use in detonators and blasting caps. Typical primary explosives include inorganics such as Lead Azide, Lead Styphenate, and Mercury Fµlminate, and organics such as Triacetone Triperoxide (TATP) and Tetrazene. When initiated, the primary explosives detonate, producing a supersonic shock wave that can be used to initiate the less sensitive secondary explosives. Primary explosives are unstable and require great precautions when handling.

The Explosive Train

The use of a sensitive primary explosive to initiate a secondary explosive is referred to as creating an explosive train. The number of different explosive components in the train gives the number of "stages" in the final explosive device. Table 4 represents the most commonly observed configurations. Note that an electrical detonator only counts as one stage, whilst a time-fuse initiated detonator counts as two stages, as both the detonator as the fuse itself contain explosive products.

The use of a booster charge between the detonator and the main charge may be required for very stable explosives such as Ammonium Nitrate Fuel Oil (ANFO). In this situation, the shock wave created by the detonator is insufficient to initiate the insensitive main charge, but it can initiate the less stable booster, creating a more powerful shockwave to trigger the secondary explosive. Table 4 demonstrates several potential explosive trains.

Explosive Taggants & Detection Aids

The extremely low vapour pressures for many of the common explosives complicate the detection of these compounds directly. For this reason, the compound 2,3-dimethyl-2,3-dinitrobutane (DMNB) is one of four chemicals now added as a marker to plastic and sheet explosives, the others being 2-nitrotoluene (2-MNT) and 4-nitrotoluene (4-MNT), and ethylene glycol dinitrate (EGDN), although DMNB is by far the most commonly used. DMNB was chosen due to its high vapour pressure, high permeability through textiles and uniqueness, and with no known industrial applications [4] its detection is highly indicative of the presence of explosives. As seen in

| Explosive Class | | Explosive | Molecular Weight (amu) | Formula | Vapour Pressure at 25° C. (torr) |
|---|---|---|---|---|---|
| Aliphatic Nitro | | Nitromethane | 61.04 | $CH_3NO_2$ | $2.8 \times 10^1$ |
| | DMNB | 2,3-Dimethyl-dinitrobutane | 176.17 | $C_6H_{12}N_2O_4$ | $2.1 \times 10^{-3}$ |
| Aromatic Nitro | o-MNT | 2-Nitrotoluene | 137.14 | $C_7H_7NO_2$ | $1.5 \times 10^{-1}$ |
| | p-MNT | 4-Nitrottoluene | 137.14 | $C_7H_7NO_2$ | $4.1 \times 10^{-2}$ |
| | DNT | 2,4-Dinitrotoluene | 182.14 | $C_7H_6N_2O_4$ | $2.1 \times 10^{-4}$* |
| | TNT | 2,4,6-Trinitrotoluene | 227.13 | $C_7H_5N_3O_6$ | $5.8 \times 10^{-6}$ |
| | Picric Acid | 2,4,6-Trinitrophenol | 229.11 | $C_6H_3N_3O_7$ | $5.8 \times 10^{-9}$ |
| Nitrate Ester | EGDN | Ethylene Glycol Dinitrate | 152.06 | $C_2H_4N_2O_4$ | $7.0 \times 10^{-2}$ |
| | GTN | Glycerol Trinitrate | 227.09 | $C_4H_5N_3O_9$ | $3.1 \times 10^{-4}$ |
| | PETN | Pentaerythritol Tetranitrate | 314.14 | $C_5H_8N_4O_{12}$ | $1.4 \times 10^{-8}$ |
| | NC | Nitrocellulose | 297.14 | $[C_6H_7N_3O_{11}]_n$ | N/A |
| Nitramine | Tetryl | 2,4,6-Trinitrophenyl Methylnitramine | 287.15 | $C_7H_5N_5O_8$ | $5.7 \times 10^{-9}$ |
| | RDX | Trinitro-triazacyclohexane | 222.12 | $C_3H_6N_6O_6$ | $4.6 \times 10^{-9}$ |
| | HMX | Tetranitro-tetrazacyclooctane | 296.16 | $C_4H_8N_8O_8$ | $1.6 \times 10^{-13}$* |
| | CL20 | Hexanitro-hexaazaisowurzitane | 438.19 | $C_6H_6N_{12}O_{12}$ | N/A |
| Peroxide | TATP | Triacetone Triperoxide | 138.08 | $C_3H_6O_6$ | $3.7 \times 10^{-1}$* |
| | HMTD | Hexamethylene Triperoxide Diamine | 208.17 | $C_6H_{12}N_2O_6$ | N/A |

(*extrapolated values, N/A not available)

Table, the vapour pressure for DMNB is more than 1 million times greater than any of the nitramine explosives.

Aliphatic Nitrates

The aliphatic nitrates are characterised by the C—$NO_2$ grouping, where the nitro moiety is bonded directly to an aliphatic carbon. Although not a predominant group of explosives, the commonly used tagging agent DMNB is to found in this group as well as nitromethane. New developments in explosives synthesis have highlighted the cubane structures, as highly energetic but inherently unstable explosive molecules.

Nitromethane

Nitromethane is one of the simplest explosive molecules available. It exists as a clear, volatile liquid and has applications in motor racing as a highly oxygenated fuel. It is readily available in specialist model shops, yet can be combined with other fuels such as powdered aluminium to make a powerful "homemade" binary explosive.

DMNB-2,3-Dimethyl-2,3-Dinitrobutane

DMNB is one of four tagging agents or 'taggants' which, since 1996, must be added to legally manufactured plastic explosives to aid detection. The International Civil Aviation Organisation (ICAO) stipulates a minimum concentration of 0.1% w/w DMNB when used to tag explosives [5].

Aromatic Nitrates

Aromatic nitrates also feature the C—$NO_2$ grouping; however in this case the carbon is to be found in an aromatic ring. The most common explosive in this group is TNT, although trinitrobenzene, and lesser substituted di- and mono-nitroaromatics are observed as well. Picric acid, 2,4,6-trinitrophenol, is less commonly observed despite historic use as an explosives, particularly by the German army at the turn of the 20$^{th}$ century.

TNT-2,4,6-Trinitroluene

Trinitrotoluene, a yellow crystalline solid, is the product of successive nitrations of toluene. Although 6 isomeric forms exist, it is the thermodynamically favoured 2,4,6 isomer which is most abundant, and which is used as the explosive [6]. TNT is one the most abundant military explosives for demolitions and land mine use, either by itself or as a mixture with RDX or PETN. TNT is sufficiently volatile and thermally stable to favour GC analysis.

o-MNT-2-Nitrotoluene, p-MNT-4-Nitrotoluene and DNT-2,4-Dinitrotoluene

First prepared back in 1841, the mononitrotoluenes have limited function as explosives due to their oxygen deficiency, however they have found application as tagging agents, in addition to DMNB and EGDN due to their volatility and explosive properties. Similarly 2,4-Dinitrotoluene is not used directly as an explosive, but has found application as an additive to smokeless powders and some dynamites as an additional fuel source.

Nitramines

The nitramines are characterised by the N—$NO_2$ grouping, where the nitro group is bonded to a nitrogen atom. The nitramine bond is less thermally stable than the organo-nitro bonds discussed previously, however nitramines such as RDX and HMX are commonly observed in military applications due to their explosive power and high resistance to accidental initiation. Novel cage structures such as CL-20 are in development for military applications. Less common nitramines include nitroguanidine, a component of triple based smokeless powder, and Tetryl, which may be also classified as an organic nitrate.

RDX-1,3,5-Tinitro-1,3,5-triazacyclohexane

RDX, a white crystalline solid, was first discovered by Henning in the 1890s, but the explosive properties were not reported until 1920. RDX found recognition in the military during World War II, often combined with TNT, and is now commonly used in military plastic explosives due to its stability and high brisance (shattering effect) [6]. RDX is the principle component in the commonly used C-4 and PE-4 explosives used by the American and British militaries, and it is also present in considerable quantities in SEMTEX. RDX is suited to GC and HPLC analysis, although it has a low vapour pressure and is susceptible to thermal degradation. RDX and HMX are indistinguishable by NMR [7].

HMX-1,3,5,7-Tetranitro-1,3,5,7-tetrazacyclooctane

Like RDX, HMX is another member of the nitramine family, as is frequently observed as an impurity of RDX. HMX is similar to RDX in its chemical properties. HMX is superior to RDX with a higher ignition temperature and chemical stability; however its explosive power is somewhat lesser than that of RDX [6]. HMX is employed in specialist warheads that require high brisance and as a booster charge for rocket propellants and artillery shells. HMX is also used in combination with aluminium powder in the 'nonel' detonation system. Due to a high molecular mass and tendency to thermally decompose at elevated temperatures, HPLC is the preferred method of analysis for HMX [8].

Tetryl-2,4,6-Trinitrophenyl Methylnitramine

Tetryl was first observed by Mertens in 1877, and found application as an explosive at the beginning of the 20$^{th}$ century. Tetryl, a light yellow crystalline solid, was frequently used in blasting caps before RDX and PETN replaced it. A moderately sensitive explosive, Tetryl was used as component of explosive mixtures, particularly during World War II [6].

Tetryl is readily analysed by instrumental methods such as GC and HPLC, but Tamiri and Zitrin reported that during GC-MS analysis, the Tetryl molecule undergoes hydrolysis to produce N-methyl-picramide; however identification of this hydrolysis product has been determined to be satisfactory evidence for the original presence of Tetryl [9].

tions. It is volatile, colourless, oily liquid that freezes below room temperature [6]. GTN forms a gel like substance when combined with NC.

GTN is a very powerful secondary explosive; it has a high brisance and is frequently used in the manufacture of commercial dynamites and gelatines. GTN is also used in double and triple-based smokeless powder in addition to NC. GTN is volatile, but thermally unstable and both GC and HPLC can be successfully applied to its analysis. For MS analysis softer ionization techniques such as CIMS are preferred over EIMS [11].

PETN—Pentaerythritol Tetranitrate

PETN, a white crystalline solid, is the most stable and least reactive of the nitrate esters presented. It is a powerful secondary explosive with a high brisance. PETN is commonly used in detonation cords and blasting caps, however outside of these applications is rarely used in its pure form due to its sensitivity to friction and impact. Once a common military explosive, PETN has now been largely replaced with RDX, yet mixed with RDX remains the principle ingredient in SEMTEX, a plasticized explosive of Eastern European origin [6].

TABLE 5

Organic explosive properties including vapour pressures

| Explosive Class | | Explosive | Molecular Weight (amu) | Formula | Vapour Pressure at 25° C. (torr) |
|---|---|---|---|---|---|
| Aliphatic | | Nitromethane | 61.04 | $CH_3NO_2$ | $2.8 \times 10^1$ |
| Nitro | DMNB | 2,3-Dimethyl-dinitrobutane | 176.17 | $C_6H_{12}N_2O_4$ | $2.1 \times 10^{-3}$ |
| Aromatic | o-MNT | 2-Nitrotoluene | 137.14 | $C_7H_7NO_2$ | $1.5 \times 10^{-1}$ |
| Nitro | p-MNT | 4-Nitrotoluene | 137.14 | $C_7H_7NO_2$ | $4.1 \times 10^{-2}$ |
| | DNT | 2,4-Dinitrotoluene | 182.14 | $C_7H_6N_2O_4$ | $2.1 \times 10^{-4}$* |
| | TNT | 2,4,6-Trinitrotoluene | 227.13 | $C_7H_5N_3O_6$ | $5.8 \times 10^{-6}$ |
| | Picric Acid | 2,4,6-Trinitrophenol | 229.11 | $C_6H_3N_3O_7$ | $5.8 \times 10^{-9}$ |
| Nitrate Ester | EGDN | Ethylene Glycol Dinitrate | 152.06 | $C_2H_4N_2O_4$ | $7.0 \times 10^{-2}$ |
| | GTN | Glycerol Trinitrate | 227.09 | $C_4H_5N_3O_9$ | $3.1 \times 10^{-4}$ |
| | PETN | Pentaerythritol Tetranitrate | 314.14 | $C_5H_8N_4O_{12}$ | $1.4 \times 10^{-8}$ |
| | NC | Nitrocellulose | 297.14 | $[C_6H_7N_3O_{11}]_n$ | N/A |
| Nitramine | Tetryl | 2,4,6-Trinitrophenyl Methylnitramine | 287.15 | $C_7H_5N_5O_8$ | $5.7 \times 10^{-9}$ |
| | RDX | Trinitro-triazacyclohexane | 222.12 | $C_3H_6N_6O_6$ | $4.6 \times 10^{-9}$ |
| | HMX | Tetranitro-tetrazacyclooctane | 296.16 | $C_4H_8N_8O_8$ | $1.6 \times 10^{-13}$* |
| | CL20 | Hexanitro-hexaazaisowurzitane | 438.16 | $C_6H_6N_{12}O_{12}$ | N/A |
| Peroxide | TATP | Triacetone Triperoxide | 138.08 | $C_3H_6O_6$ | $3.7 \times 10^{-1}$* |
| | HMTD | Hexamethylene Triperoxide Diamine | 208.17 | $C_6H_{12}N_2O_6$ | N/A |

(*extrapolated values, N/A not available)

Nitrate Esters

The Nitrate Esters are distinguished by the C—O—NO$_2$ group, with the nitro group bonded to an oxygen atom. The ester bond is not thermally stable, and GC analysis of the nitrate esters is limited. Commonly observed nitrate esters include PETN which is used both for commercial and military applications, EGDN and NG, both of which find application in dynamites, and NC which is used in the manufacture of smokeless powders.

EGDN—Ethylene Glycol Dinitrate

EGDN is a volatile yellow oil used in dynamites and as a tagging agent in some plastic explosives. Its volatility represents a problem regarding cross contamination during storage of explosives for canine training aids [10]. EGDN is suitable for analysis by most instrumental methods, but like most nitrate esters, decomposes at elevated temperatures.

GTN—Glycerol Trinitrate

Also known as trinitroglycerin, glycerol trinitrate was first prepared by Sobrero in 1846 but was deemed too sensitive and unstable to be of practical use until 1867 when Alfred Nobel proposed a desensitisation for commercial applica- Although suitable for most instrumental analysis, PETN decomposes at moderately elevated temperatures, and Douse reported that PETN is readily absorbed by any impurities within the GC system [12].

NC—Nitrocellulose

Discovered by Schönbeim in Germany in 1845, Nitrocellulose is the nitrated form of cotton, and as such may also be referred to as Guncotton. The name nitrocellulose refers not to a single compound; it is a generic term denoting the family of nitrated cottons, and often the nitrogen content is expressed as a weight percentage, up to a maximum content of 14.1% w/w [6]. NC is found in all smokeless powders as the principle propellant; by itself in single-based, combined with NG in double-based, and with NG and nitro-guanidine in triple-based powders.

Its high molecular mass and polymeric form make it unsuitable for analysis by GC or headspace methods, but TLC analysis has been successfully applied to differentiate NC samples [13,14].

TABLE 6

Common organic explosive structures

NB
Nitrobenzene 1,3-DNB
1,3-Dinitrobenzene

TNB
1,3,5-Trinitrobenzene

Picric Acid

TNT
2,4,6-Trinitrotoluene

2-MNT
2-Nitrotoluene

3-MNT
3-Nitrotoluene

TABLE 6-continued

Common organic explosive structures

4-MNT
4-Nitrotoluene 2,4-DNT
2,4-Dinitrotoluene 2,6-DNT
2,6-Dinitrotoluene

RDX
Cyclotrimethylene
Trinitramine

HMX
Cyclotetramethylene
Tetranitramine

Tetryl
2,4,6-Trinitrophenylmthyl
Nitramine

TABLE 6-continued

Common organic explosive structures

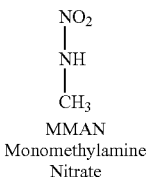

MMAN
Monomethylamine Nitrate

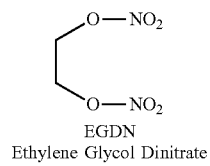

EGDN
Ethylene Glycol Dinitrate

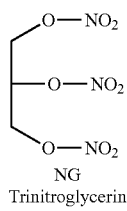

NG
Trinitroglycerin

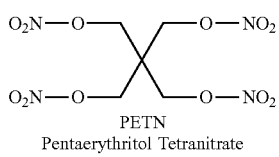

PETN
Pentaerythritol Tetranitrate

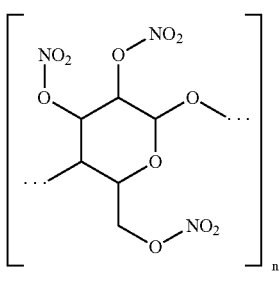

NC
Nitrocellulose

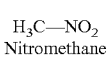

Nitromethane

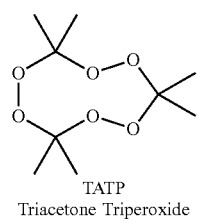

TATP
Triacetone Triperoxide

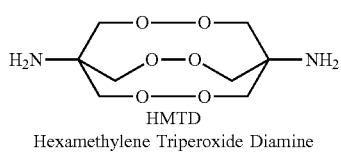

HMTD
Hexamethylene Triperoxide Diamine

Peroxides

Peroxide explosives are a somewhat recent development, characterised by the C—O—O—C grouping. They are significantly less stable than many of the nitro explosives, such that TATP can be used as a primary explosive in homemade detonators [15]. Their simplicity to manufacture as "kitchen sink explosives" makes them attractive to terrorists as alternatives to commercially available explosives.

TATP—Triacetone Triperoxide

TATP is a powerful improvised explosive, easily synthesised in a clandestine laboratory, required little prior knowledge of chemistry. It is crystalline in nature, and exposure to ultraviolet light turns the white crystals a yellowish colour. TATP has a particularly high brisance, and is sensitive to shock, friction and heat. Its reactivity can be reduced by wetting, but it remains extremely dangerous. TATP is volatile and will sublime at ambient temperatures [16].

HMTD—Hexamethylene Triperoxide Diamine

HMTD is another crystalline peroxide explosive with similar properties to TATP [17]. HMTD is less sensitive to shock initiation than TATP, but is thermally unstable, and will detonate upon melting at 145° C. [18]. Accordingly, GC analysis of HMTD is particularly difficult. HMTD is insoluble in water and most organic solvents [19].

Inorganics

Inorganic salts are often used as an oxygen supply in binary mixtures. Heavily oxygenated anions such as nitrates ($NO_3^-$), chlorates ($ClO_3^-$) and perchlorates ($ClO_4^-$), combined with ammonium ($NH_4^+$), sodium or potassium, are most commonly observed, and blended with fuel sources. Examples of binary mixtures include Black Powder ($KNO_3$, carbon and sulphur), Flash Powder ($KClO_4$, aluminium and magnesium) and ANFO ($NH_4NO_3$ and fuel oil).

Explosive Products and Combinations

Explosive compounds are rarely found in the pure state; frequently combined with other explosives, and/or with stabilisers, tagging agents, plasticizers and other modifiers to increase the stability and efficiency of the explosive product in question and to provide a commercial product with the desired properties.

The canine community often observes, with disdain, that there is no such thing as waste at an explosives manufacturing plant; whatever is left over from one batch almost always ends up in the next. This introduces impurities and heterogeneity into the explosives, something which is welcomed by the trace analyst in the forensic lab but despised by experienced trainers wishing to imprint the optimum range of explosive odors onto the dogs. Secondary explosives may be sub-categorized into commercial and military explosives, as denoted by their respective applications, represented in and Table 7 and Table 8 [20,21].

TABLE 7

Common commercial explosive contents

| Explosive | Components |
|---|---|
| Amatol | Ammonium Nitrate + TNT |
| Ammonal | Ammonium Nitrate + TNT + Al |
| ANFO (Amex or Amite) | Ammonium Nitrate + Fuel Oil (Diesel) |
| Black Powder | Potassium Nitrate + C + S |
| DBX | TNT + RDX + Ammonium Nitrate + Al |
| Detonation Cord (commercial) | PETN |
| Dynamite (ammonia) | NG + NC + Sodium Nitrate |
| Dynamite (gelatine) | NG + NC + Ammonium Nitrate |
| HBX-1 | RDX + TNT + Al |
| Helhoffnite | NB + Nitric Acid |
| Nitropel | TNT |
| Non-el Cord | HMX |
| Picratol | TNT + Ammonium Picrate |
| Red Diamond | NG + EGDN + Sodium Nitrate + Ammonium Nitrate |
| Smokeless Powder (single based) | NC |
| Smokeless Powder (double based) | NC + NG |
| Time Fuse | Potassium Nitrate + C + S |
| Water Gel/Slurry (aquaspex) | NG |
| Water Gel/Slurry (hydromex) | Ammonium Nitrate + TNT |
| Water Gel/Slurry (powermex) | Ammonium Nitrate + Sodium Nitrate + EGMN |
| Water Gel/Slurry (tovex) | Ammonium Nitrate + Sodium Nitrate + MMAN |

TABLE 8

Common military explosive contents

| Explosive | Components |
|---|---|
| Composition A-3 | RDX + Wax |
| Composition B | RDX + TNT |
| Composition C-2 | RDX + TNT + DNT + NC + MNT |
| Composition C-3 | RDX + TNT + DNT + Tetryl + NC |
| Composition C-4 | RDX + Plasticisers |
| Composition D | Ammonium Picrate |
| Cyclotol | RDX + TNT |
| Datasheet (Flex-X) | RDX + Plasticisers |
| Demex 200 | RDX |
| Detonation Cord (military) | RDX or HMX |
| Dynamite (military) | TNT |
| HTA | HMX + TNT + Al |
| PE-4 | RDX + Plasticiser |
| Pentolite | PETN + TNT |
| Primasheet 1000 | PETN + Plasticisers |
| Primasheet 2000 | RDX + Plasticisers |
| PTX-1 | RDX + TNT + Tetryl |
| PTX-2 | RDX + TNT + PETN |
| SEMTEX A | PETN + Plasticisers |
| SEMTEX H | RDX + PETN + Plasticisers |
| Smokeless Powder (triple based) | NC + NG + Nitroguanidine/TNT |
| Tetratol | TNT + Tetryl |
| Torpex | TNT + RDX + Al |
| Tritonal | TNT + Al |

Commercial Explosives see application in demolitions and mining and include dynamites, water gels, gelatines, and slurries such as aquaspex or ANFO. These are available in stick (solid and gel) or liquid (slurry) form. Slurries see most application in open cast mining, where large quantities can be pumped into prepared wells. The commercial explosives are generally less stable than military charges due to the less extreme handling conditions expected. The military explosives include TNT, RDX, PETN and combinations of these and related products. Military ordinance may be cast into warheads and mines, or plasticized to form explosives such as C-4 and Semtex.

Improvised Explosive Devices

There has been a marked increase in the use of Improvised Explosive Devices (IED) in recent years. In particular, the majority of explosive incidents currently observed in Iraq and Afghanistan are IEDs. Additionally, the Bali bombing in 2001 and the first attack on the World Trade Centre in 1993 utilised an improvised device. Most IEDs will combine a fuel source such as a petroleum product, sugar or aluminium powder, with an oxygen source such as inorganic salts discussed previously.

Odor Chemistry

The Olfactory Sense

The sense of smell is a complicated biochemical process beginning with the odor molecule in air. Inhalation draws a sample of air into the nasal cavity. When searching, canines use short sharp breaths that create turbulent airflow through the nasal labyrinths within the nose. Odor molecules in the inhaled air interact with the olfactory nerves. The millions of olfactory nerves, located within the olfactory epithelium contain individual receptor sites known as cilia, which project into the airflow within the nose.

It is reported that a German Shepherd has over 220 million sensory cells in comparison to 5 million of a human [22]. Additionally, there exist thousands of different types of cilia, each one a target site for a different odorant, which in combination gives the potential for odor recognition of tens of thousands of odors.

Movement of Odor in Air

Odor molecules are present in the atmosphere, either released directly in gaseous from, or more commonly through evaporation and sublimation from liquid and solids states respectively. Once present in the air space, the odor moves through thermal diffusion creating an odor plume, which increases in intensity of odor as the source is approached.

Odor movement through air is laminar in nature close to surfaces, producing a widening filament of odor, of reducing intensity. Air currents or wind provide an additive factor in distribution of the odor. Air velocity of sufficient magnitude create a turbulent plume downwind of the source, as an irregular and expanding plume of "patches" of odor.

Olfactometry & Canine Detection

The olfactory bulb in a canine brain is four times the size of the same region in the human brain, despite the significantly smaller overall dimensions. The larger portion of brain devoted to olfaction, in addition to the higher number of olfactory sensors in the nasal cavity, accounts for the canines' ability to detect odors reported 10,000 to 1,000,000 million times below the detection threshold of humans.

The canine nose is a highly efficient sampling system. When searching, the dog inhales in short sharp breath at a frequency of 5-8 Hz, equivalent to 300-480 breaths per minute. In comparison, humans average 10-12 breaths per minute during normal activity. The volume of inhaled air is around 30 ml/sec/nostril equating to approximately 3.6 L/min of sampled air [23]. The dynamics of air flow around the nostrils are such that the air is inhaled from the front and exhaled to the side.

Explosives Detection

Detector dogs still represent the fastest, most versatile, reliable real-time explosive detection device available. Instrumental methods, while they continue to improve, generally suffer from a lack of efficient sampling systems, selectivity problems in the presence of interfering odor chemicals and limited mobility/tracking ability [24].

The invention described herein is aimed to test and improve the reliability and detection limits of canine drug and explosive detectors and canine odor detection training. Preliminary results from this research, on the identification of active odor signature chemicals of forensic specimens including explosives employing SPME with GC/MS and GC/ECD, have already been published [25,26,27,28].

Explosive Detection Technologies

There are a variety of technologies currently available and others under development. Table 3 illustrates some trace explosive technologies including separation techniques ranging from high performance liquid chromatography (HPLC) and capillary electrophoresis (CE) commonly with fluorescence or electrochemical detection and Gas Chromatography (GC) combined with mass spectrometry (GC/MS) electron capture (GC/ECD) or luminescence detection.

In addition, techniques based on mass spectrometry and ion mobility spectrometry (IMS) continue to improve [29] Currently, the most widely deployed explosives screening technology deployed at airports is Ion Mobility Spectrometers (IMS) which rely primarily on the detection of particles contaminated on the outside of baggage or paper tickets. Recently, a new IMS inlet has been developed which allows for the detection of odor chemicals using SPME sampling [30,31].

Electronic Noses

Microsensors have the potential for selective GC detectors and also as remote sensors when combined in arrays often referred to as "electronic noses". Promising microsensors include surface acoustic wave (SAW) detectors normally coated with different semi-selective polymeric layers and microelectromechanical systems (MEMS) including microcantilever sensors. Recently, a handheld sensor based on piezoresistive microcantilevers named "SniffEx" has been demonstrated to detect PETN and RDX at levels below 10 parts per trillion within a few seconds of exposure, albeit on a clean matrix [32]. The hope is that, in the future, hundreds of such microcantilevers, coated with suitable coatings, may be able to achieve sufficient selectivity to provide a cost-effective platform for detecting explosives in the presence of potentially interfering compounds in real environments.

Other electronic nose technologies under development include the use of fibre optics and sensor beads, polymeric thin films, nanocluster Metal-Insulator-Metal Ensembles (MIME) [33], and fluorescent polymers using amplifying chromophore quenching methods. To date, there has been limited testing of these devices with noisy chemical backgrounds under operational conditions, however the handheld "FIDO" system based upon quenching chromophore amplifying fluorescent polymers (AFP) was recently field tested against certified explosive detection canines for the detection of TNT based explosives, and was reported to share similar detection capabilities with canines [34].

TABLE 10

Comparison of Field Instrument and Canine Detection Technologies

| Aspect | Instrument | Canine |
|---|---|---|
| Duty cycle | 24 hr/day (theoretically but not practically) | 5 hr/day (20 min on/40 min break) |
| Calibration standards | Widely available, can be run simultaneously | Not widely available, run individually |
| I.D. of explosive | Presumptive I.D. possible | Not trained to I.D. with different alerts |
| Operator/handler influence | Less of a factor | A potential factor |
| Environmental conditions | Less affected | Potential affect (high temperatures) |
| Instrument lifetime | Generally 10 years | Generally 6-8 years |
| State of scientific knowledge | Relatively mature | Late emerging |
| Courtroom acceptance | Generally unchallenged | Sometimes challenged |
| Selectivity | Sometimes problematic | Very good |
| Overall speed of detection | Generally slower | Generally faster |
| Mobility | Limited at present | Very versatile |
| Integrated sampling system | Problematic/inefficient | Highly efficient |
| Scent to source | Difficult with present technology | Natural and quick |
| Intrusiveness | Variable | Often innocuous (breed dependent) |
| Initial cost | ca. $60,000 | ca. $8,000 |
| Annual cost | ca. $5,000 (service contract) | ca. 3,000 (vet and food bill) |
| Sensitivity | Very good/well known | Very good/few studies |
| Target chemical(s) | Parent explosive(s)/well studied | Odorant signatures/mostly unknown |

Optical Techniques

Optical techniques under investigation comprise transmission and reflectance spectophotometry, including infrared (IR) detection of decomposition products such as the well established EGIS system. UV/Visible absorption methods which include cavity ring down spectroscopy (CRDS), Raman scattering including using localized surface plasmon resonance (LSPR) and optoacoustic (OA) spectroscopy are also under development [24]. Standoff technologies under development include laser, light detection and ranging (LIDAR), differential absorption LIDAR (DIAL) and differential reflection LIDAR (DIRL) for imaging. Nonlinear optical techniques offer the potential for increased signal-to-noise ratios in sensing modes including coherent anti-Stokes Raman Scattering (CARS), optical phase configuration, and coherent control of the specific states of molecules and optimise their luminescence [35].

Biosensors

A recent report on standoff explosive detection techniques conducted by the National Academy of Sciences concluded that it is important to use multiple orthogonal detection methods (methods that measure the properties of explosives that are not closely related) as no single technique solves the explosive detection problem. Studies conducted include free-running and Remote Explosive Scent Tracing (REST) in which the odor is collected on a sorbent in the field and presented to the animal at a different location [36]. Biological explosive detectors, including detector dogs can be considered orthogonal detectors to sensors under development as they generally rely on different detection modalities.

In addition to canines, other animal and plant species have been proposed as alternative methods of biological explosives detectors. A research project in Tanzania, under the support of the Belgian research organization APOPO, trains African Giant Pouched rats to detect landmines. Reports indicate that rats may be capable of detecting similarly low levels of explosive odors compared to dogs with advantages including their small size and low cost, but with more challenging training and retrieval aspects [37].

Bees are also being studied as a biological explosive detection system. It has been demonstrated that bees are capable of detecting explosive odors at concentrations below those of most instruments and comparable to dogs [38]. The bees can be imaged or traced to the source or, more commonly, used to survey areas by examining chemical residues brought back to the hive. Advantages include that they can be trained quickly and will not set off any mines. Limitations include that bees do not fly at night, in heavy rain or in cold weather (below 40° F.).

Danish scientists at Aresa Biodetection have developed a genetically modified (GM) cress crop which, when sown over a suspected mine field, will change its leaves from green to red upon detection of buried explosives [39]. The GM thale cress crop is altered to change colour should its roots contact $NO_2$ in the soil. Since this method relies upon seepage of $NO_2$ from leaking mines, it has the potential to miss the more recent models that are specially sealed to obscure detection.

Table 10 highlights some of the advantages and disadvantages of canine and instrumental field detection, revealing how complimentary operation rather than competitive operation should be considered. Whilst the sensitivity of some of the emerging instrumental technologies is on par with, if not beyond that of the canine, the dogs still hold an advantage over the instruments on selectivity. Canines are renowned for their ability to individualize the scent picture, ignoring the 'background matrix' to focus upon a single odor. It is this selectivity, combined with mobility and independent thinking that still ranks the canines as the current best method for real-time detection of explosives.

Explosives Detection Canines

The use of canines as a method of detection of explosives is well established worldwide and those applying this technology range from police forces and military to humanitarian agencies in the developing world. Until recently, most data regarding optimal training protocols and the reliability of canine detection has been anecdotal, leading to successful challenges regarding the admissibility of evidence obtained with the assistance of canines and hampering the improvement of performance of canines as biological explosive detectors [40]. Challenges facing the field of canine detection include the limited ability to evaluate canine performance with standardized calibration standards. Unlike instrumental methods, it is currently difficult to determine detection levels, perform a calibration of the canines' ability or produce scientifically valid quality control checks. In addition, there are increasingly strict requirements being applied to the admissibility of the application of detector dogs in locating items of forensic interest, highlighting the need for better a scientific understanding of the process of canine detection.

This current research is targeted towards the identification of active odors for canine detection of items of forensic interest and the development of what we are calling odor mimics, or training aids that contain the odor chemicals that mimic the real substances. There are presently several theories about what is responsible for the canines' high selectivity and specificity to explosives including (i) that canines alert to the parent explosives regardless of their volatility, (ii) that canines alert to more volatile, non-explosive chemicals that are present in explosives, and which are characteristic to explosives; or (iii) both parent explosives as well as characteristic volatiles are used to accurately locate explosives. To date, there are no definitive peer-reviewed studies to support any of these theories.

By identifying the key odors of items of forensic interest, in this case explosives, levels of detection and linearity ranges may be determined, and better documentation of training and deployment will serve to benefit reliability studies. In addition, identification of active odor signature chemicals aids in the selection of the fewest number of target substances needed for optimal training and facilitates the development of reliable, cost-effective non hazardous odor mimics which can be used to enhance the capabilities of detector dogs. Recent reviews of electronic noses have highlighted the current limitations of instrumental methods with Yinon concluding that electronic noses for detecting explosives have a long way to go before being field operational [33] and Gopel concluding that, for most applications, the performance of electronic noses containing sensor arrays are insufficient compared to established analytical instruments such as GC/MS [29]. A recent extensive review of instrumentation for trace detection of high explosives concluded that there is still no instrument available that simultaneously solves the problems of speed, sensitivity and selectivity required for the real time detection of explosives [24].

Training Explosive Detection Canines

Unlike narcotic detection canines, which are expected to face a predictable line-up of 5 or 6 drug odors, the explosive detection canine is expected to face dozens of different explosive products during its service. Narcotics detection canines are typically trained on Cocaine (HCl and Base), heroin and marijuana. They may be trained on additional drugs depending on the training agency and the locations where they are deployed including methamphetamine, MDMA, hashish, opium, mescaline, LSD [41]. Whilst there are the six principle chemical categories of explosives, there are dozens of individual explosive chemicals which must be detected.

Target Odors

Depending on the training agency and deployment locations, explosive detection canines are currently trained on a wide variety of samples ranging from half a dozen samples to upwards of twenty. Using at least one representative sample from each explosive chemical class would require an acid salt such as ammonium nitrate, an aromatic nitro such as TNT, a nitrate ester such as PETN a nitramine such as RDX, an aliphatic nitro such as DMNB, a peroxide such as TATP and representative black and smokeless powders. Unfortunately, there is currently little scientific information available to aid in the optimal selection of training aids. Due to the challenges in handling and storing of a wide variety of explosives, non-hazardous training aids are commercially available, but with limited types available and limited testing of their effectiveness under field conditions in double-blind studies.

The difficulty in choosing an optimal number of training aids lies in the multiple explosives within each category, and is then confounded by the wealth of explosive products that employ various combinations of the explosives, as highlighted in Table 8 and Table 7 [20,42]. One of the most important decisions a canine trainer has to make is in choosing which explosives to use as odor targets. Many trainers and canine programs choose to focus on one main explosive from each principle category. However, there is scant peer reviewed data to demonstrate the utility of this practice. The difficulty in selecting the optimal number and combinations of training aids can be highlighted by looking at the choice of a smokeless powder training aid. While bombs made from black and smokeless powder are generally relatively small, these devices are the ones most commonly used in criminal bombings in the U.S. and are readily available with millions of individuals purchasing these powders for sport use each year and hundreds of different formulations available from different manufacturers [43]. Finding one smokeless powder that adequately represents the hundreds of possibilities seems unlikely, and the results presented here support this. A previous study reported results consistent with the theory of stimulus generalization, indicating that odor generalization is a function of the similarity of the vapour chemistry between trained and untrained target substances and the extent of training across multiple variants of the substances. Conclusions from this study include the importance of identifying the variants of explosives that will yield optimal effectiveness [44].

US Domestic Explosive Incident Reporting

The Bureau of Alcohol, Tobacco, Firearms and Explosives (ATF) is responsible for control of all firearms and explosives within the United States of America. Figures released documenting the use of explosive materials in domestic incidents between 1976 and 1992 revealed that only 8.0% of all incidents featured a high explosive as the energetic material, and from 1992 to 1996 that figure dropped to only 1.2% [66].

TABLE 11

Explosive Fillers 1976 through 1996

| Filler | 1976-1992 | 1992-1996 | 1976-1996 |
|---|---|---|---|
| Black/Smokeless Powders | 6,232 (26.4%) | 2,578 (18.1%) | 8,810 (23.2%) |
| Photo Flash/Fireworks Powders | 1,712 (7.2%) | 1,833 (12.8%) | 3,545 (9.4%) |
| Flammable Liquids | 5,248 (22.2%) | 3,438 (24.1%) | 8,686 (22.9%) |
| Unreported | 6,365 (27.0%) | 2,859 (20.0%) | 9,224 (24.3%) |
| Chemicals | 642 (2.7%) | 2,833 (19.8%) | 3,475 (9.2%) |
| Other* | 1,542 (6.5%) | 575 (4.0%) | 2,117 (5.6%) |
| Commercial High Explosives | 1,690 (7.2%) | 126 (0.9%) | 1,816 (4.8%) |
| Blasting Agents | 141 (0.6%) | 29 (0.2%) | 170 (0.4%) |
| C4/TNT | 45 (0.2%) | 11 (0.1%) | 56 (0.1%) |
| Total | 23,617 (100%) | 14,282 (100%) | 37,899 (100%) |

The most prevalent explosive fillers were black/smokeless powders and flash/pyrotechnic powders at 26.4% and 7.2% respectively for 1976 through 1992, and 18.1% and 12.8% for 1992 through 1996. Other devices reported included flammable, $CO_2$ and other chemical reactions. Most important is the noted 85% reduction in high explosive usage from 1976-92 through 1992-96.

With high explosives accounting for such a small percentage of explosive incidents, as shown in Table 12, it is clear that sufficient attention must be focused towards detection of explosive devices from low explosives, a category which is often given less attention by canine trainers, who favour traditional training on the high explosives.

Solid Phase Microextraction

Solid Phase Microextraction (SPME) was recently hailed as one of the top six analytical chemistry discoveries of the 1990s [67]. Developed in 1990 by Janusz Pawliszyn, SPME utilises a fused silica fibre, 1.0 cm in length, coated with an absorbent, which is capable of rapid extraction of analytes from both aqueous and vapour phases. The fibre can be likened at best to an inside out fused silica capillary column for Gas Chromatography (GC), and in the same manner that the stationary phase of a GC column may be chosen to suit the analytes within the sample, the absorbent that coats the SPME fibre is also chosen for chemistry and polarity.

SPME fibres are available with a range of different chemistries and film thicknesses depending upon the analytes and method of analysis. The different chemistries impart specific advantages towards various applications, and can be selected for pH and temperature stability. Table 13 highlights the range of fibre chemistries and applications. The non-polar polydimethylsiloxane (PDMS) is well suited to hydrocarbons, whereas the polar polyacrylate (PA) and carboxen (CAR) chemistries are better matched to phenols and polar analytes.

The fragile silica fibre is attached to a metal needle, and the entire ensemble is housed within a protective needle-like sheath, which is used to protect the fibre between exposures, and during insertion through septa.

TABLE 13

Different Chemistries and Applications of SPME Fibres

| Fibre Chemistry | PDMS | PDMS/DVB | PA | CAR/PDMS | CW-DVB | DVB/CAR/PDMS |
|---|---|---|---|---|---|---|
| Film Thickness (μm) | 100 | 7 | 65 | 85 | 75 | 65 | 55 |
| Colour Hub | Red | Green | Blue | White | Black | Orange | Grey |
| Temperature Range (° C.) | 200-280 | 220-320 | 200-270 | 220-310 | 220-310 | 200-250 | 230-270 |
| Polarity | Non-polar | Non-polar | Bi-polar | Polar | Bi-polar | Polar | Bi-polar |
| Phase | Non-bonded | Bonded | Bonded | Bonded | Bonded | Bonded | StableFlex |
| Extraction | ABsorbent | ABsorbent | ADsorbent | ABsorbent | ADsorbent | ADsorbent | ADsorbent |
| Application | GC/HPLC | GC/HPLC | GC | GC/HPLC | GC | GC | GC |
| pH Range | 2-11 | 2-11 | 2-11 | 2-11 | 2-11 | 2-9 | 2-11 |
| Recommended Applications | Volatiles, mid- to non-polar semi-volatiles | | Polar volatiles | Polar semi-volatiles | Gases and volatiles | Polar analytes | Odors and Flavours |

CAR Carboxen
CW Carbowax
DVB Divinylbenzene
PA Polyacrylate
PDMS Polydimethylsiloxane The SPME extraction process involves two principle steps; (1) the adsorption or adsorption of analytes from the sample matrix onto the SPME fibre, and (2) desorption of analytes from the fibre either through solvent effects in liquid chromatography, or thermally in the injection port of a gas chromatograph. The extraction is performed in a closed vial, the cap of which requires a septum, though which the fibre sheath pierces before the fibre itself is exposed. Extraction may be through direct immersion in an aqueous solution often involving the addition of NaCl to increase the ionic strength of the solution and thus "salting out" the organic analytes, or by headspace sampling of the vapour space above the sample. During sampling there, is a three-phase equilibrium between the analyte concentration in the sample, the sample headspace and the fibre.

SPME has several advantages over traditional headspace extraction methods such as Purge and Trap or Static Headspace, and these are listed in Table 14 in addition to Solid Phase Extraction for comparison[45]. It is rapid, solvent free, and extracts both volatiles and semi-volatiles in a competitive extraction to provide a comprehensive sample of the headspace components.

TABLE 14

Comparison of SPME with traditional extraction techniques

| Feature | Solid Phase Extraction | Static Headspace | Purge & Trap | SPME |
|---|---|---|---|---|
| Sample Matrices | Liquids (organic & aqueous) | Aqueous liquids & solids | Aqueous liquids & solids | Aqueous liquids, solids & gases |
| Sample Pre-treatment | Some samples require pre-treatment to remove solids, most liquids require no treatment | None for many samples Matrix modifiers sometimes used, such as salting out or varying pH | None for many samples Matrix modifiers sometimes used, such as salting out or varying pH | None for many samples Matrix modifiers sometimes used, such as salting out or varying pH |
| Analytes | Semivolatiles and nonvolatiles, recovery a problem for volatiles | Volatiles (up to 300° C.) | Volatiles (up to 300° C.) | Volatiles & Semivolatiles |
| Recovery of Analytes | Up to 100% expected | Equilibrium method - quantification by comparing to spiked blank matrix or standard additions | Up to 100% expected | Equilibrium method - quantification by comparing to spiked blank matrix or standard additions |
| Automation | Limited on-line for GC | Automation available | Automation available | Automation available |
| Regulatory Agency Approval | Several approved methods | Several approved methods | Several approved methods | Relatively new method Comparable recovery to static headspace for volatiles, but better recovery for semivolatiles No active transfer lines (static headspace) |
| Advantages | Better sensitivity from full recovery from large sample volumes | Older, established method | Greater sensitivity (~100 fold) for purgeable compounds | No foaming problems (purge & trap) Simpler & solvent free (solid phase extraction) |

TABLE 14-continued

Comparison of SPME with traditional extraction techniques

| Feature | Solid Phase Extraction | Static Headspace | Purge & Trap | SPME |
|---|---|---|---|---|
| | | | | Requires no bench space Lower capital cost for dual function (liquid injection and headspace) |

BRIEF DESCRIPTION OF THE DRAWINGS

FIG. 19 shows the frequency of occurrence of headspace chemicals for high explosives.

FIG. 32 shows a summary of headspace chemicals for single based smokeless powders.

FIG. 33 shows a summary of headspace chemicals for double based smokeless powders.

FIG. 50 shows permeation rates of odor compounds.

DETAILED DESCRIPTION

Materials

Explosives and Chemicals

Figure 1:
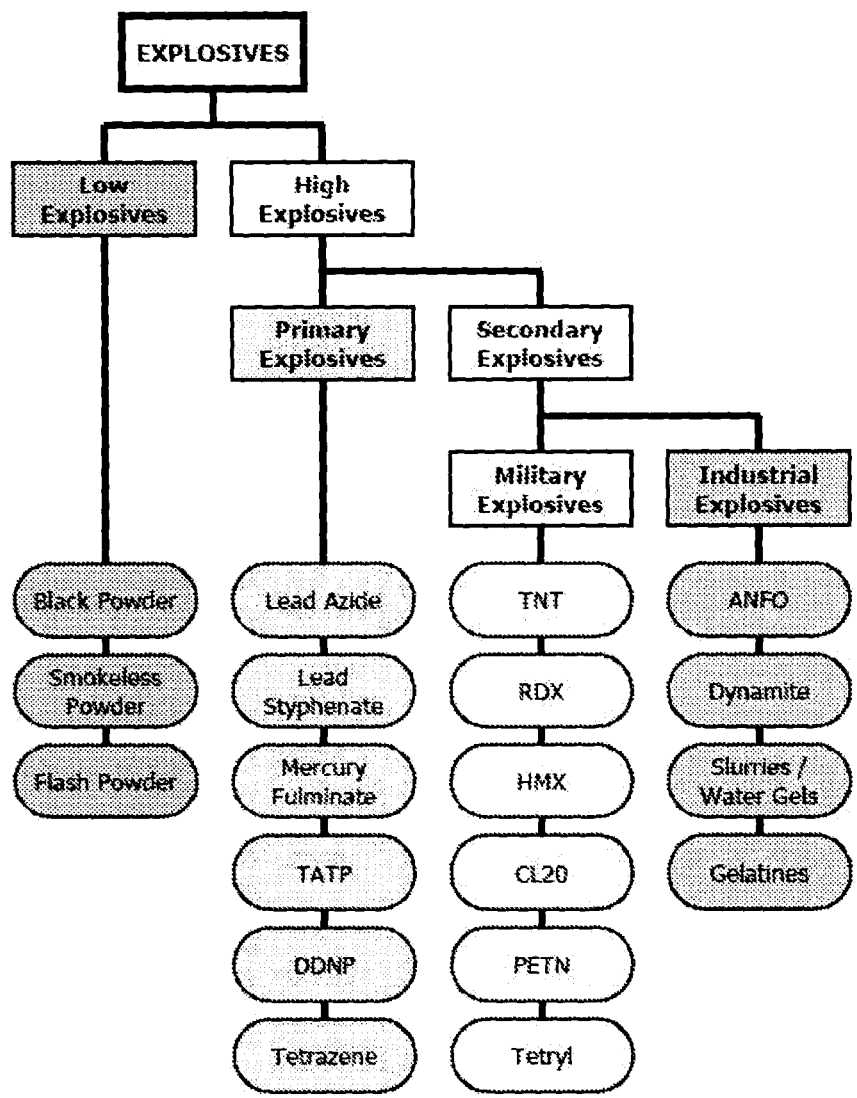
FIG. 1 shows explosive categories and sub-categories.
Figure 2:
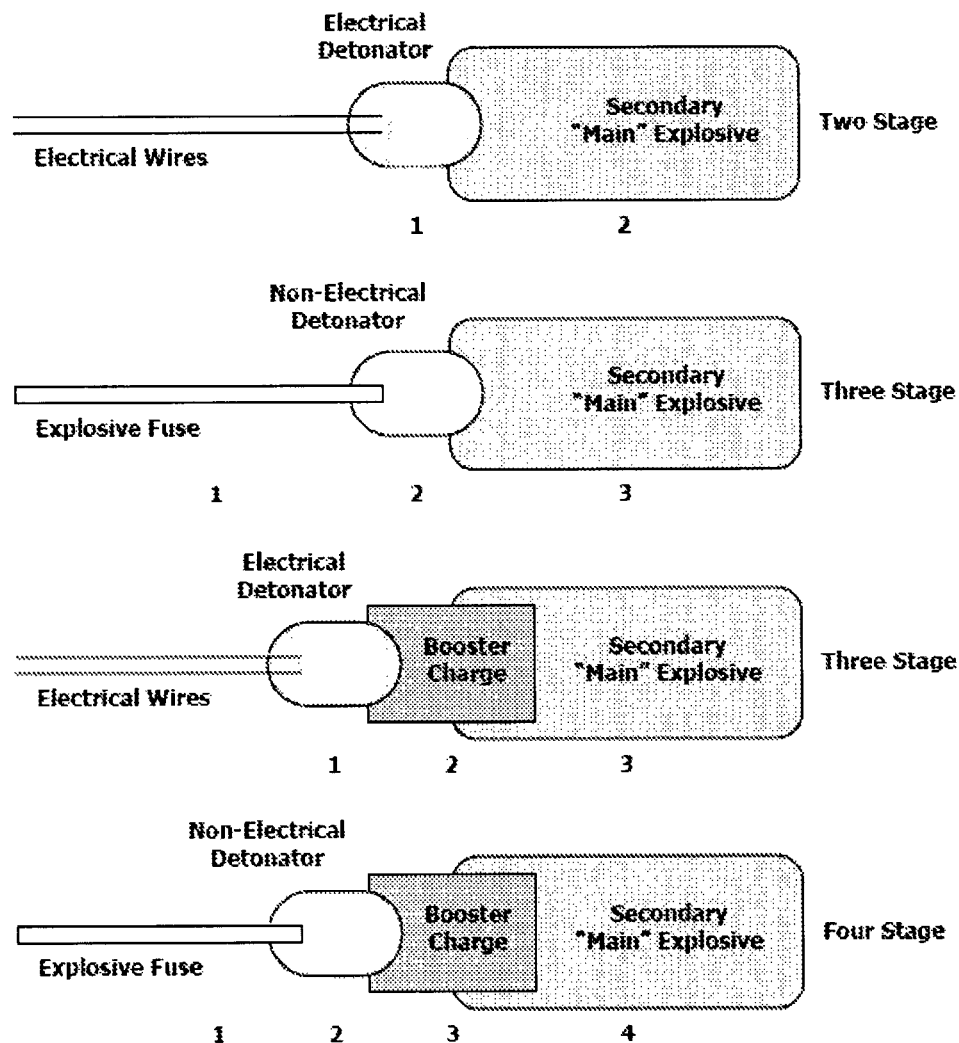
FIG. 2 shows stages of the explosive train.
Figure 3:
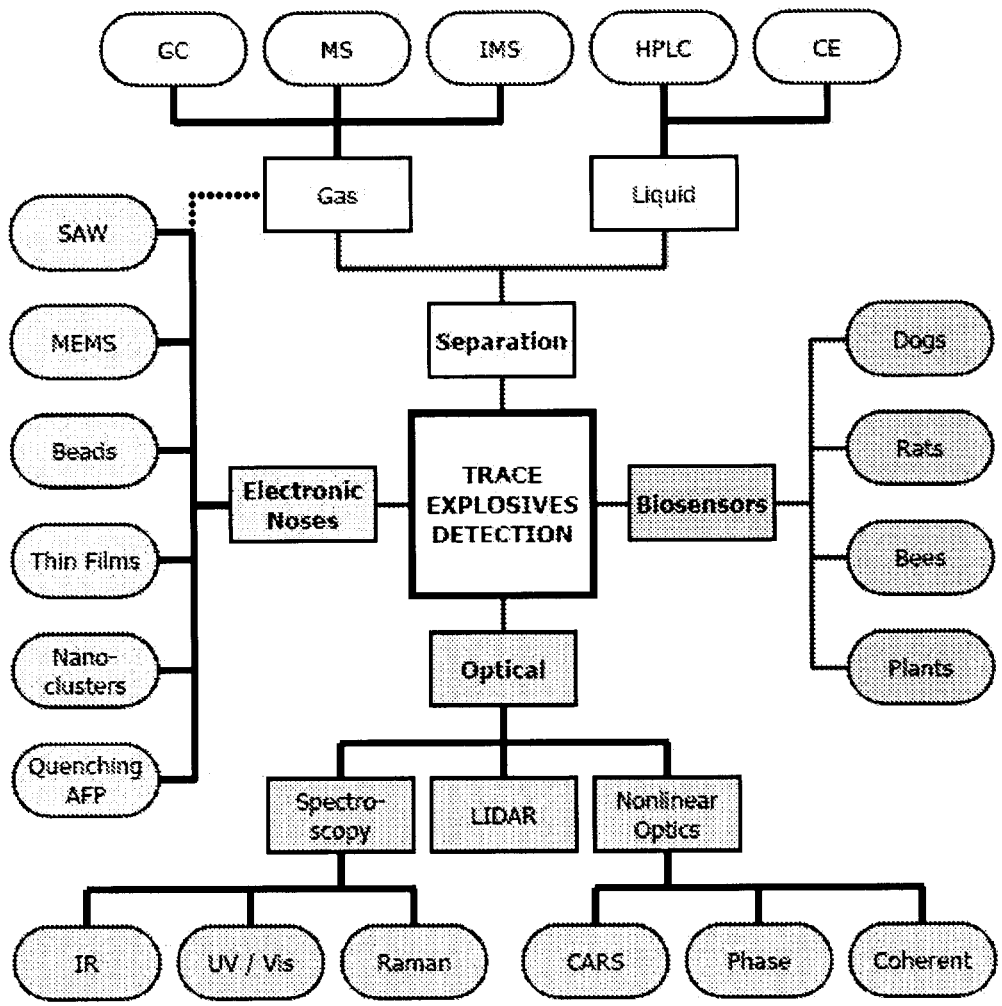
FIG. 3 shows various techniques currently available for detection of explosives.
Figure 4:
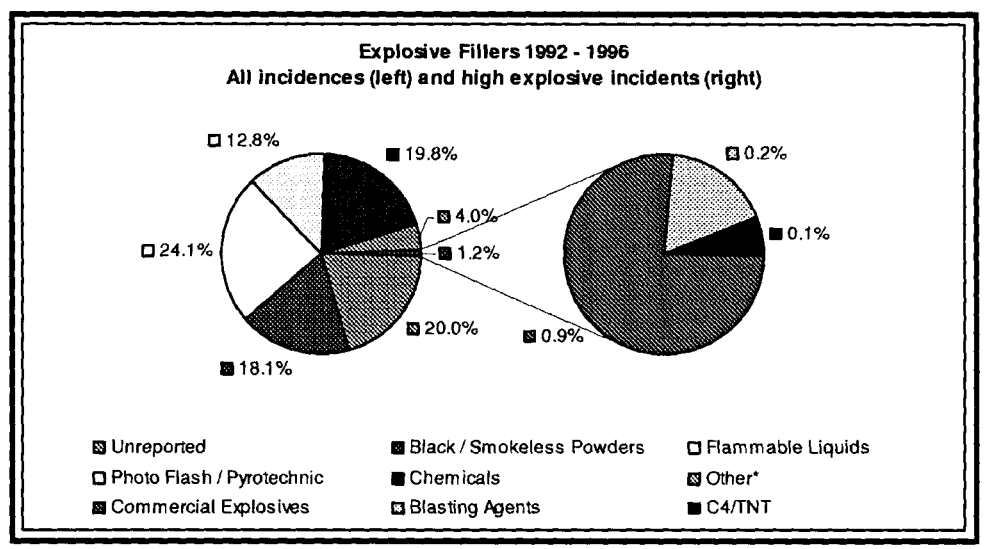
FIG. 4 shows the explosive fillers 1992 through 1996.
Figure 5:
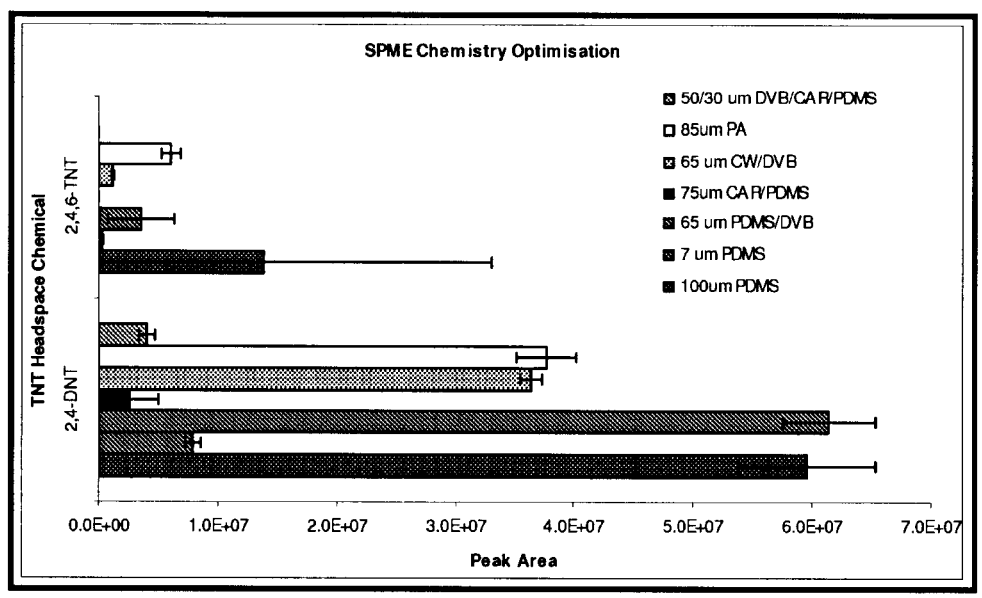
FIG. 5 shows SPME fiber chemistry optimization for TNT.
Figure 6:
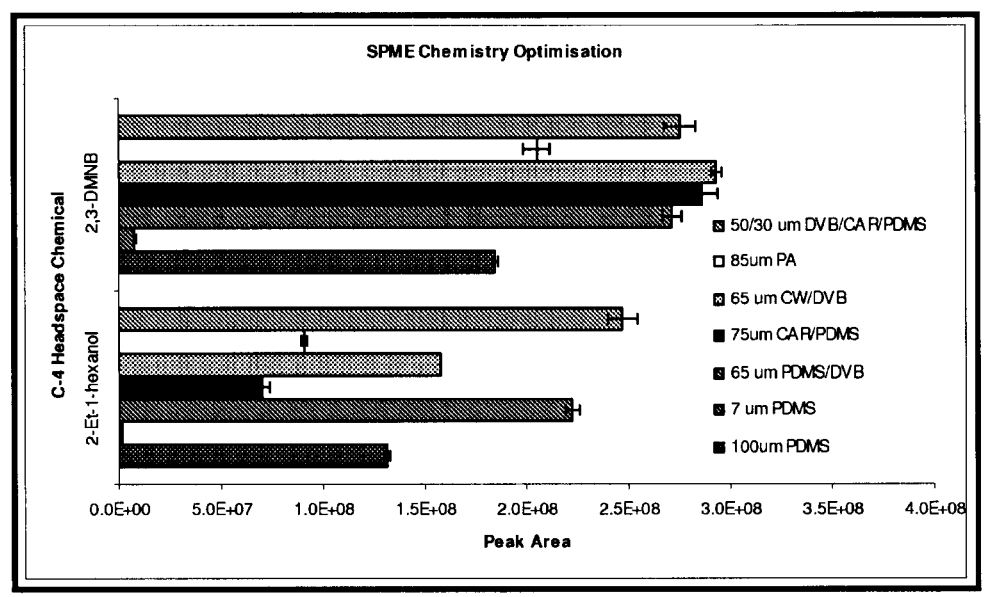
FIG. 6 shows SPME fiber chemistry optimization for C-4.
Figure 7:
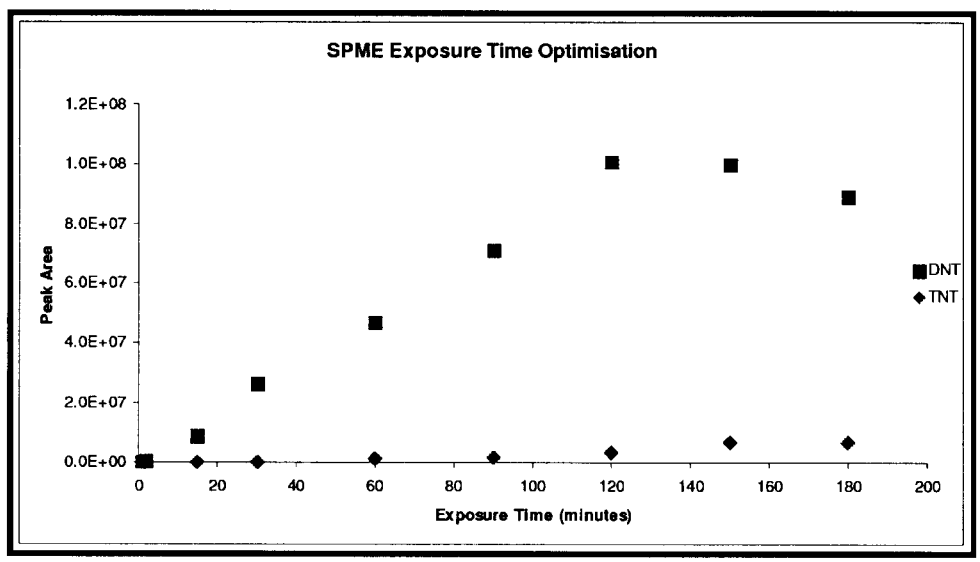
FIG. 7 shows the effect of SPME exposure time on extraction.
Figure 8:
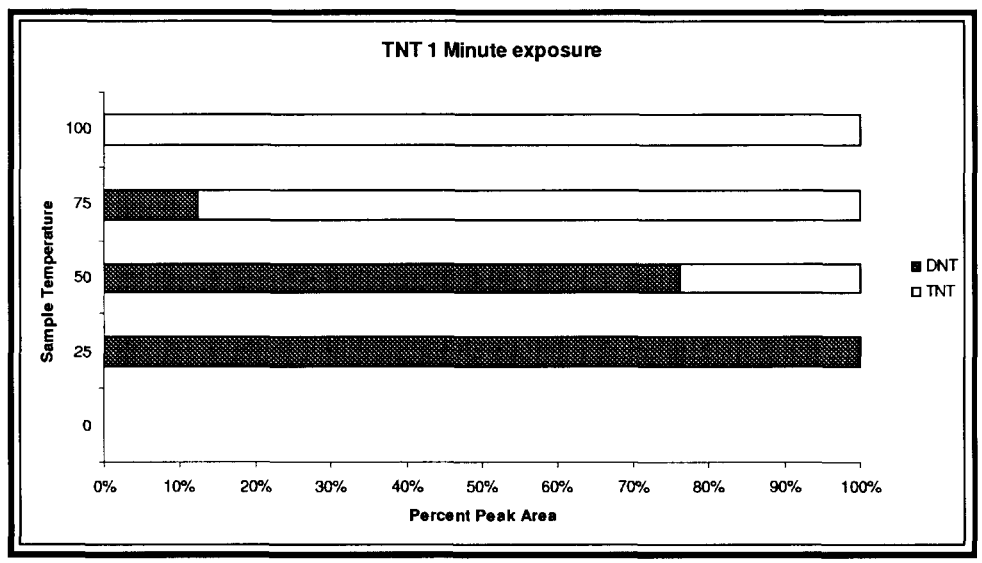
FIG. 8 shows the effect of SPME exposure temperature for 1 minute sampling.
Figure 9:
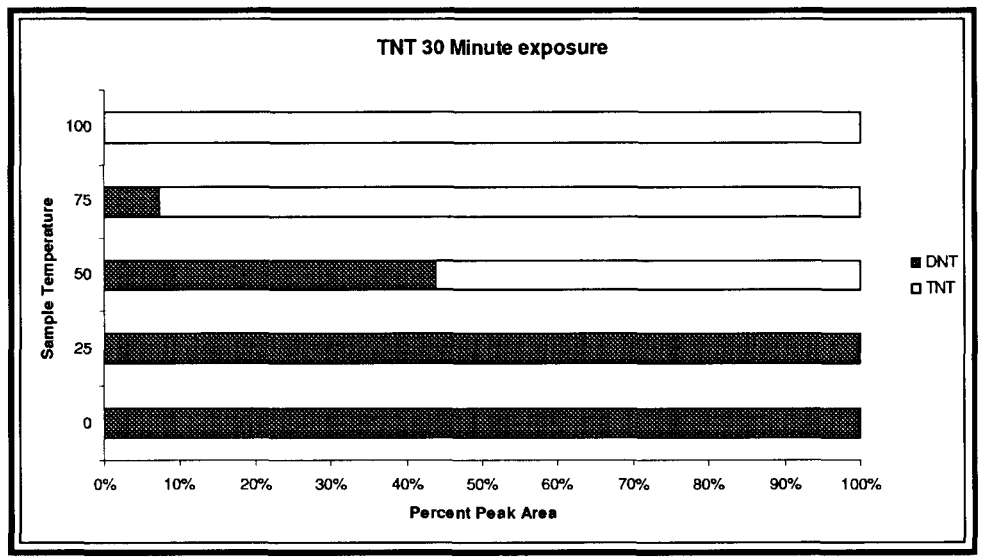
FIG. 9 shows the effect of SPME exposure temperature for 30 minute sampling.
Figure 10:
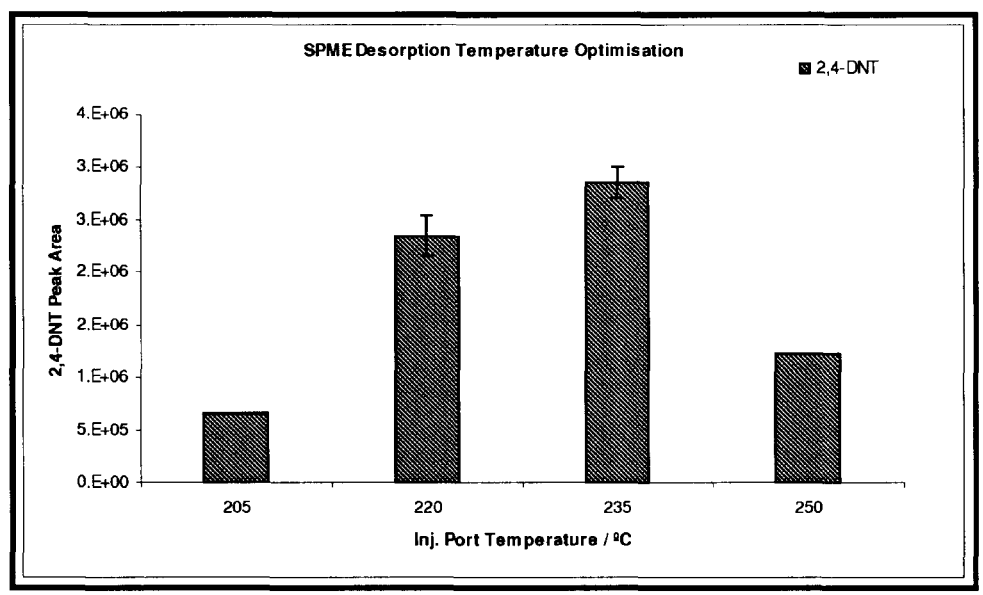
FIG. 10 shows injection port temperature optimization for TNT.
Figure 11:
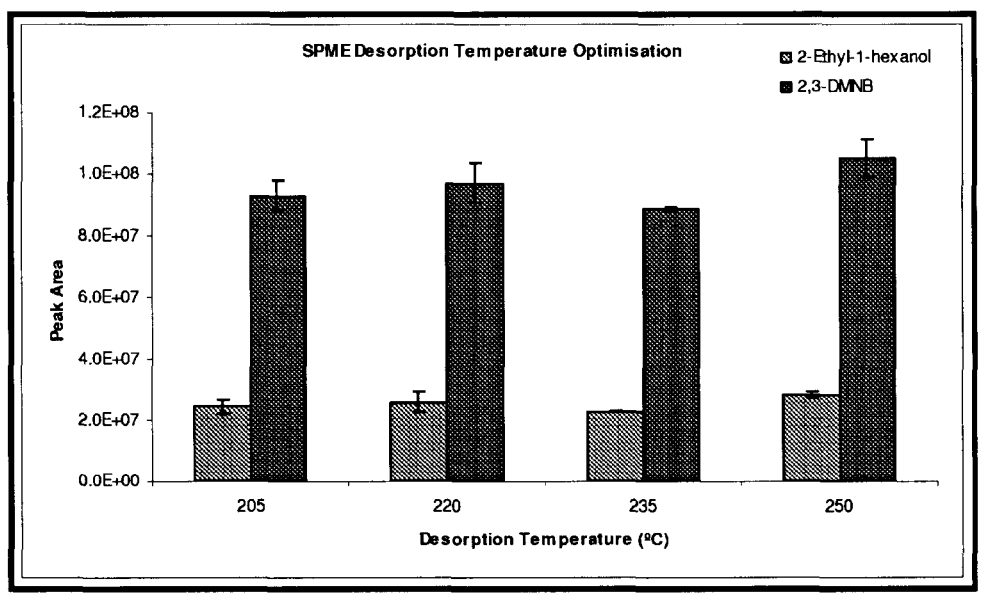
FIG. 11 shows injection port temperature optimization for C-4.
Figure 12:
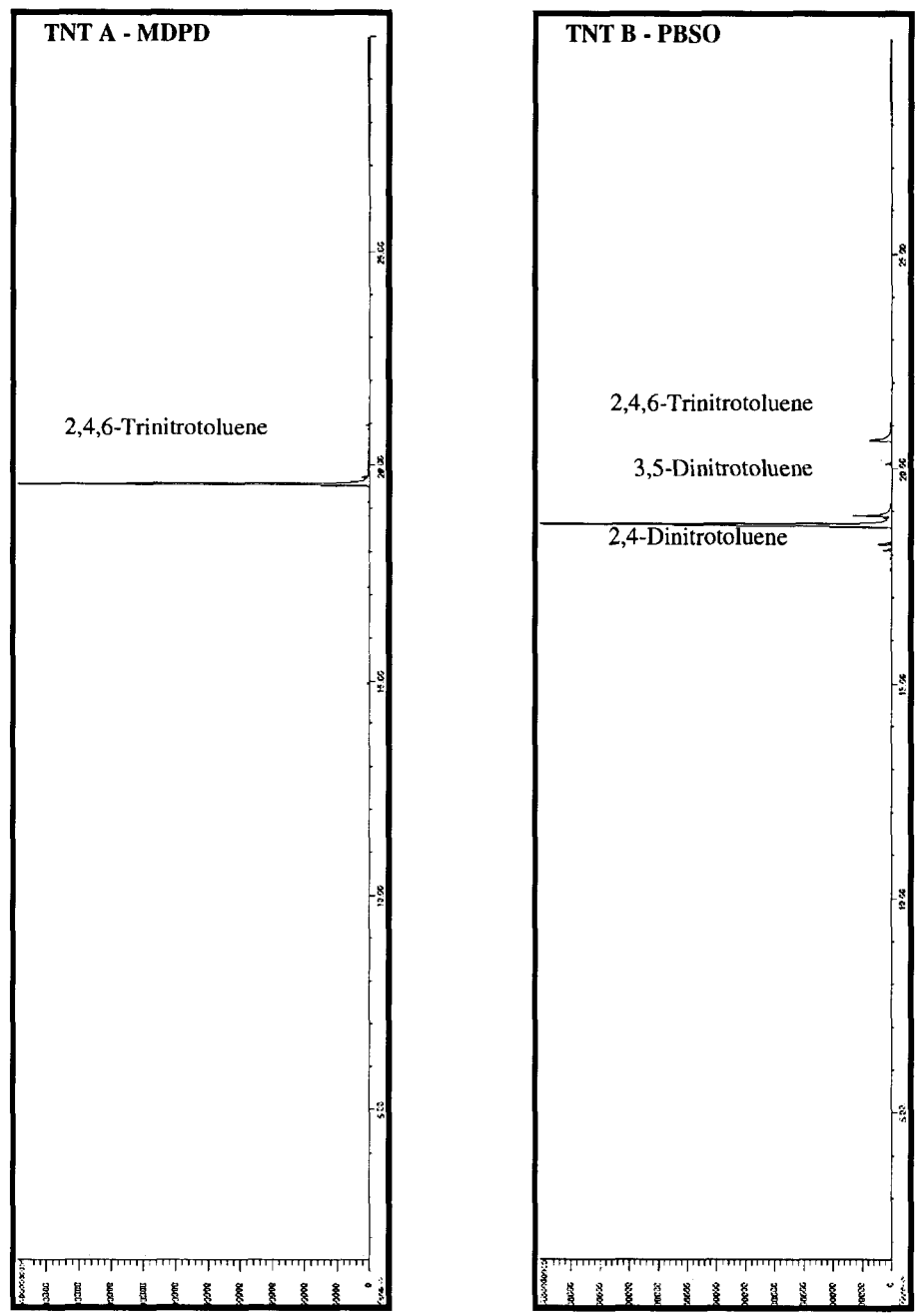
FIG. 12 shows SPME-GC-MS headspace of TNT explosive.
Figure 13:
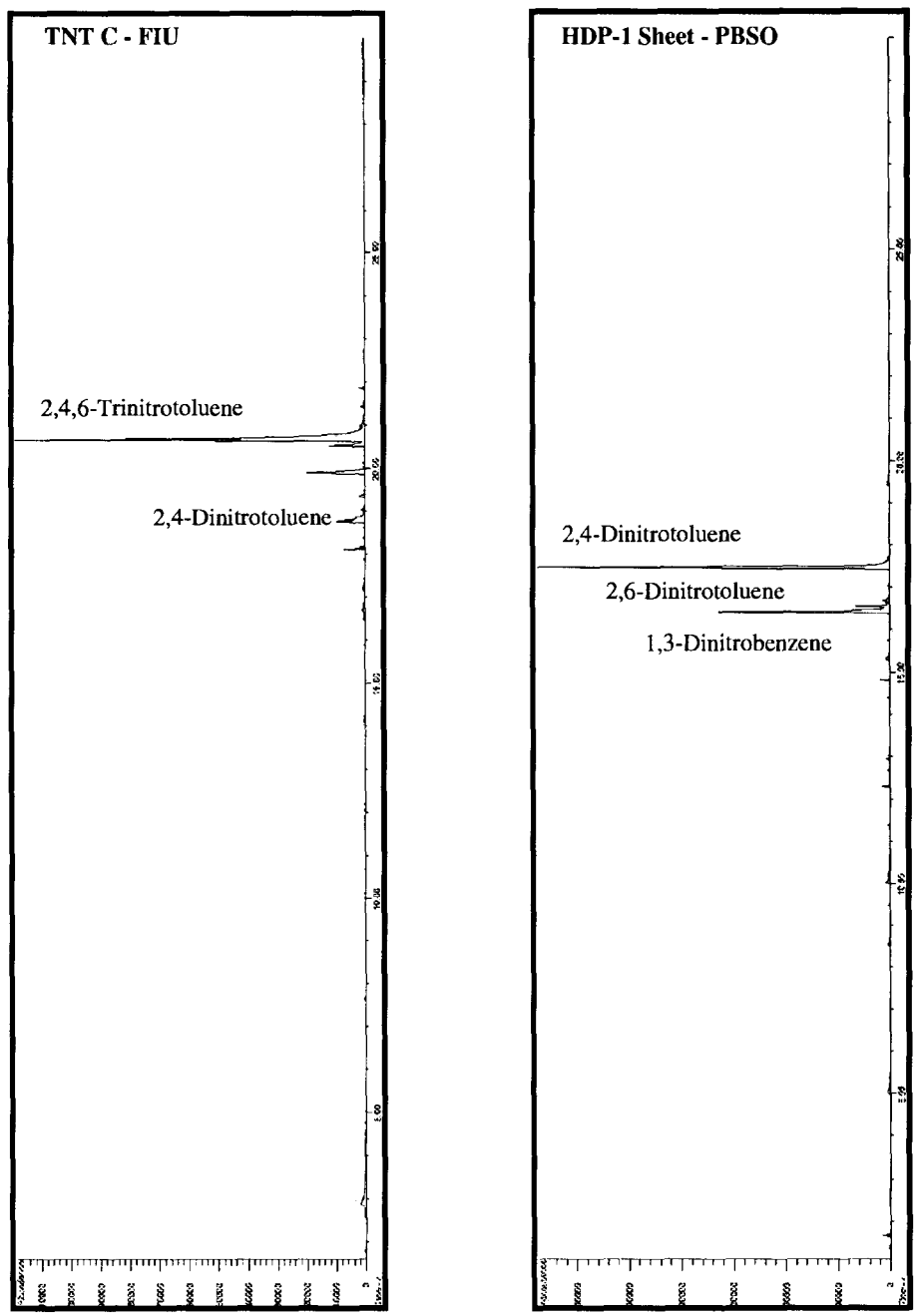
FIG. 13 shows SPME-GC-MS headspace of TNT and HDP-1 Sheet.
Figure 14:
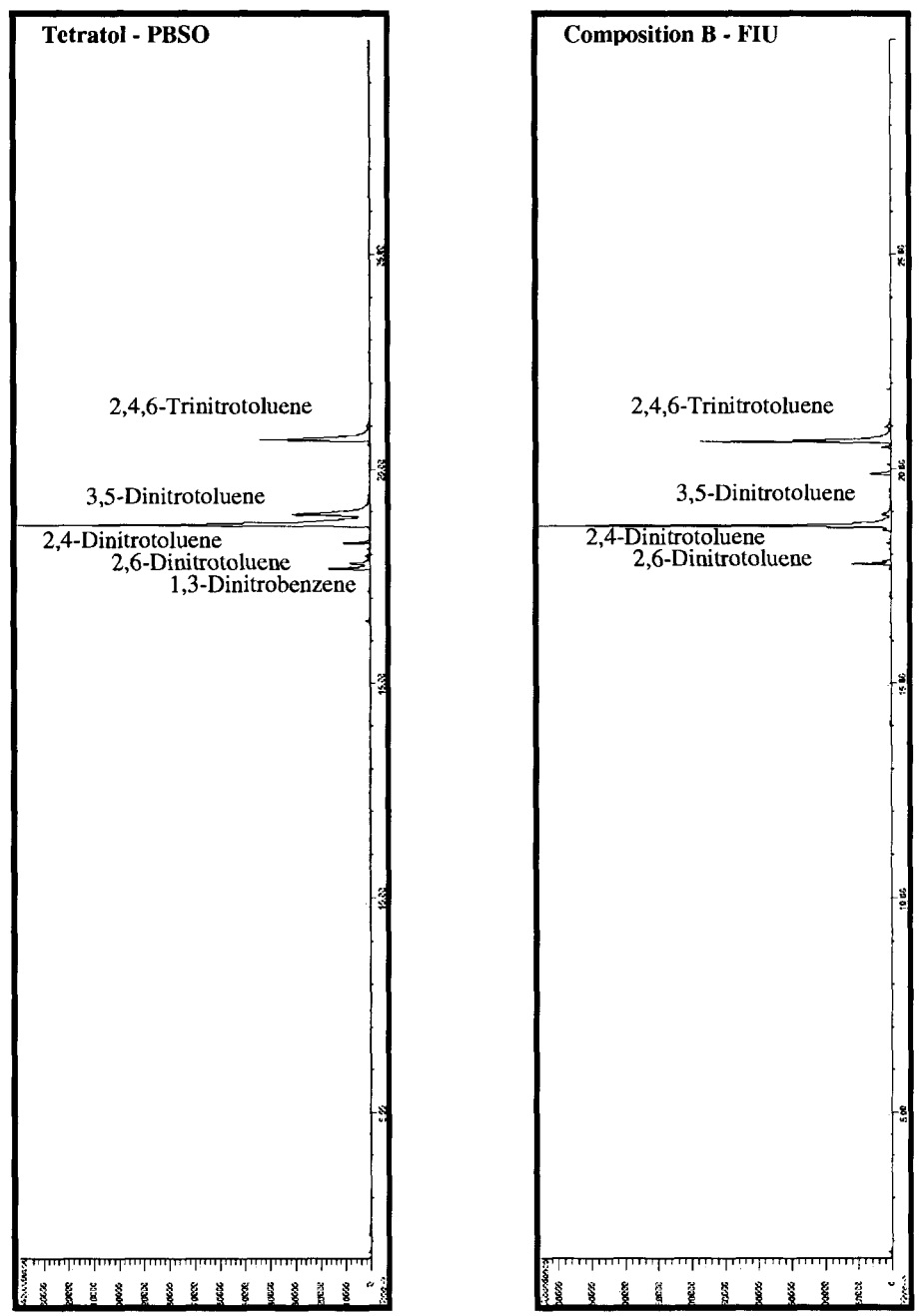
FIG. 14 shows SPME-GC-MS headspace of Tetratol & Composition B.
Figure 15:
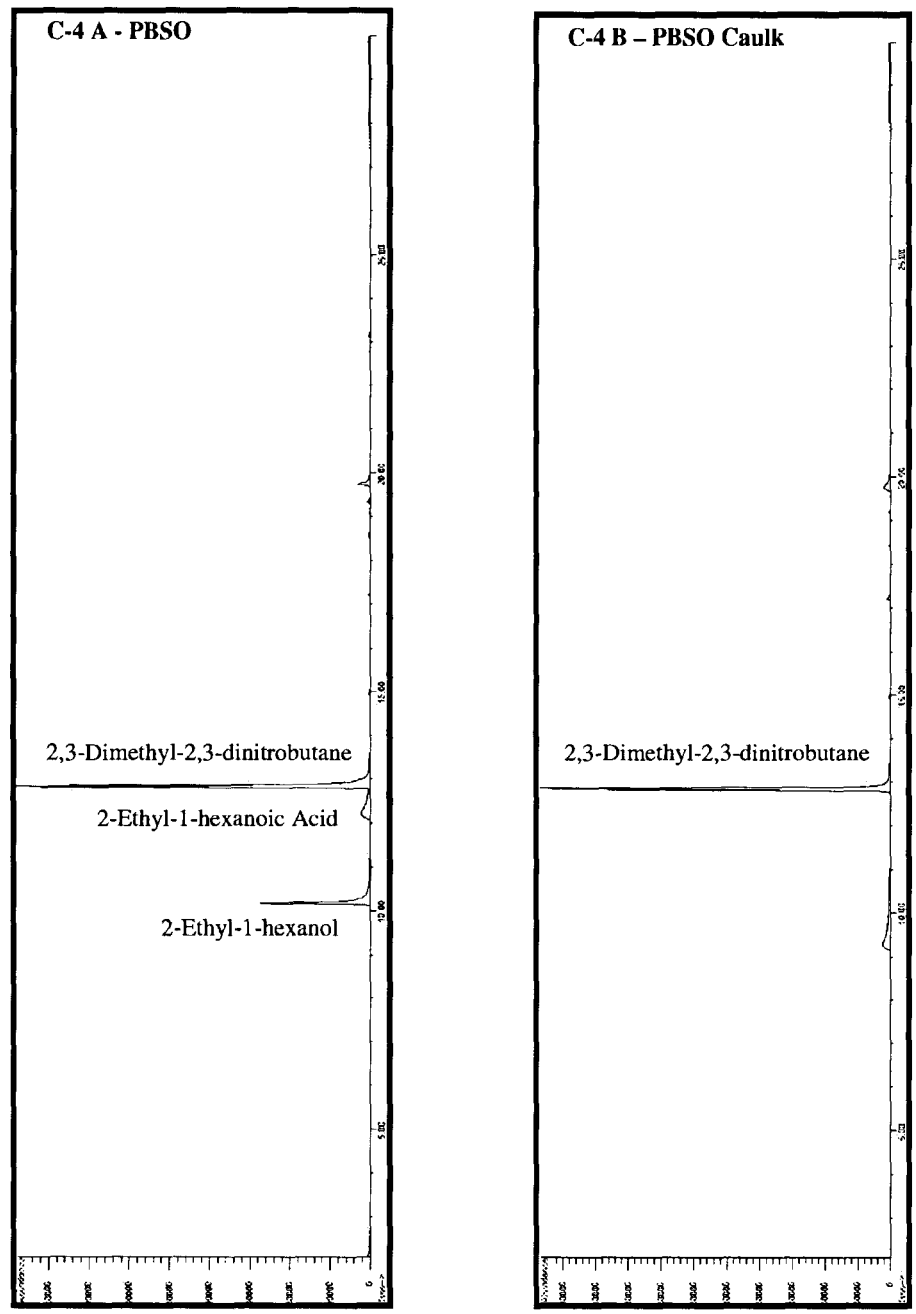
FIG. 15 shows SPME-GC-MS headspace of Composition 4.
Figure 16:
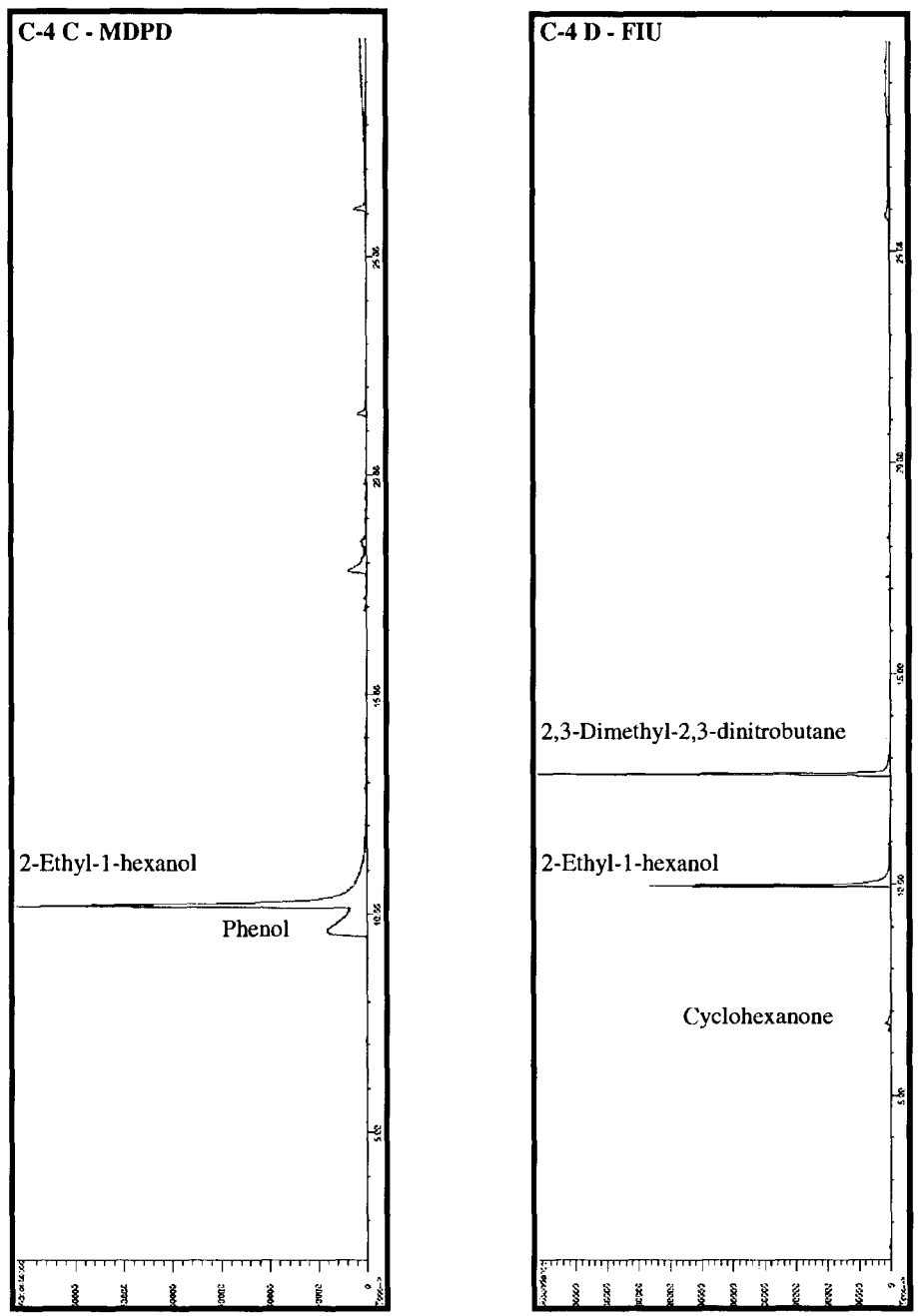
FIG. 16 shows SPME-GC-MS headspace of Composition 4.
Figure 17:
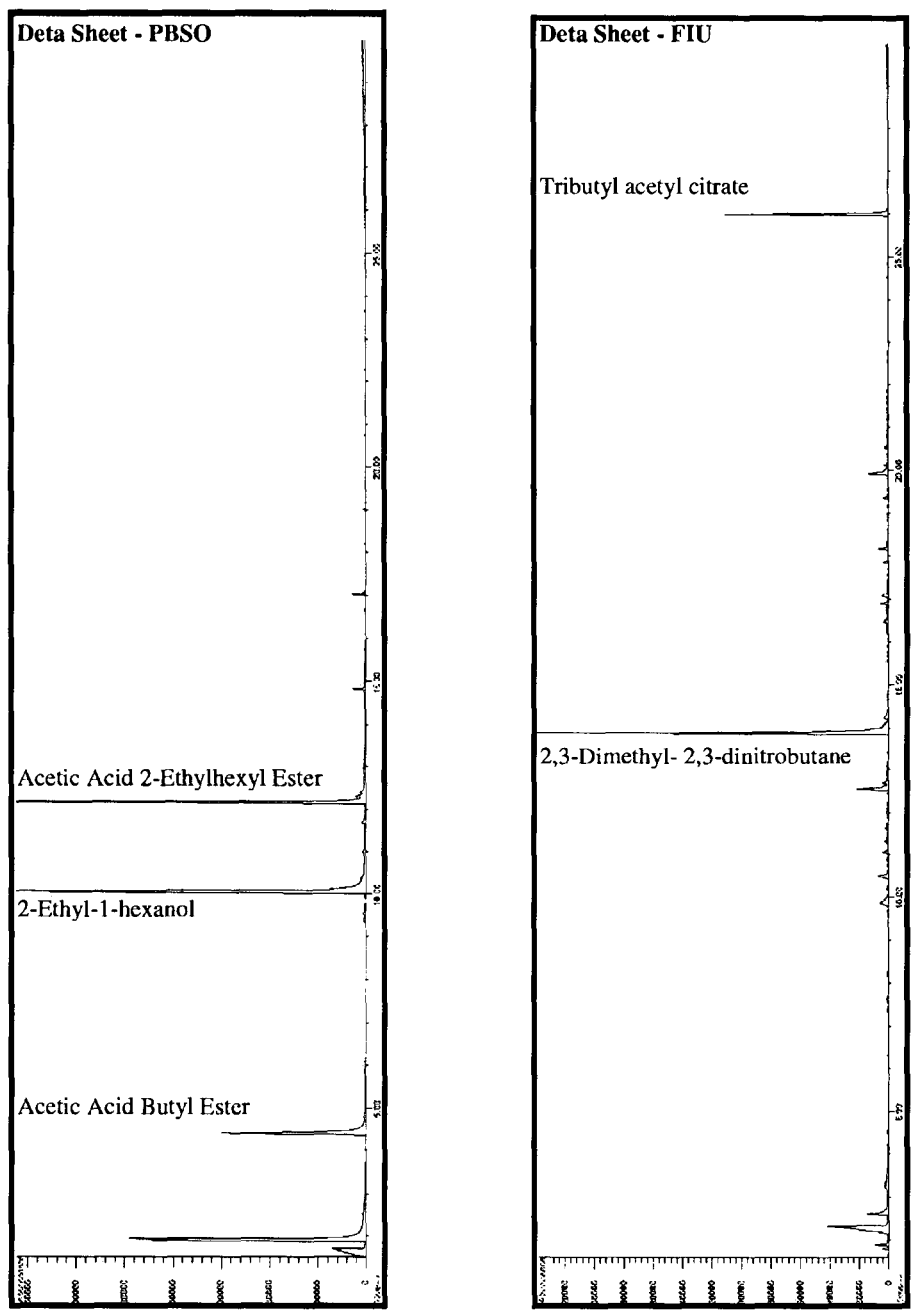
FIG. 17 shows SPME-GC-MS headspace of Deta Sheet.
Figure 18:
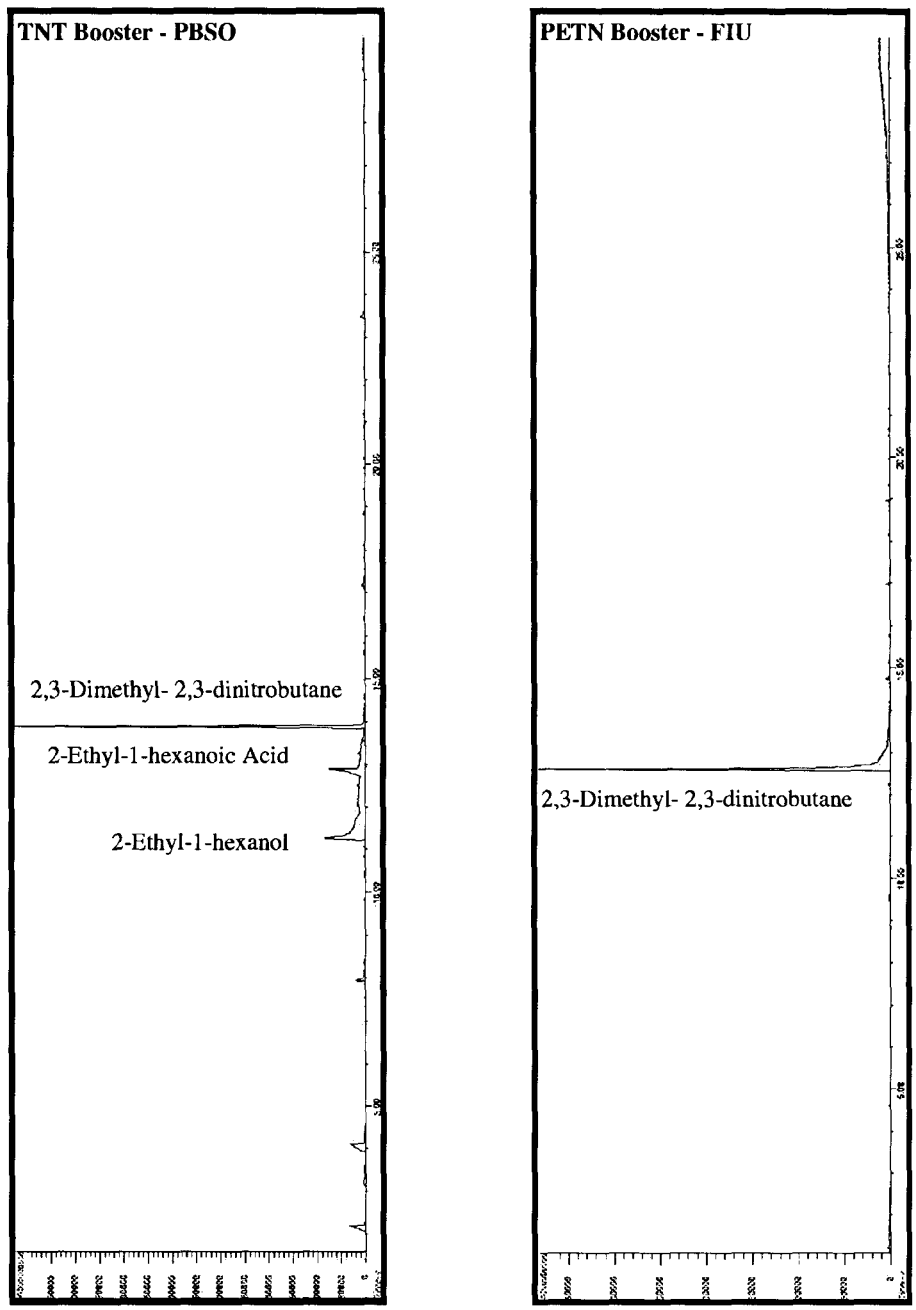
FIG. 18 shows SPME-GC-MS headspace of booster charges.
Figure 20:
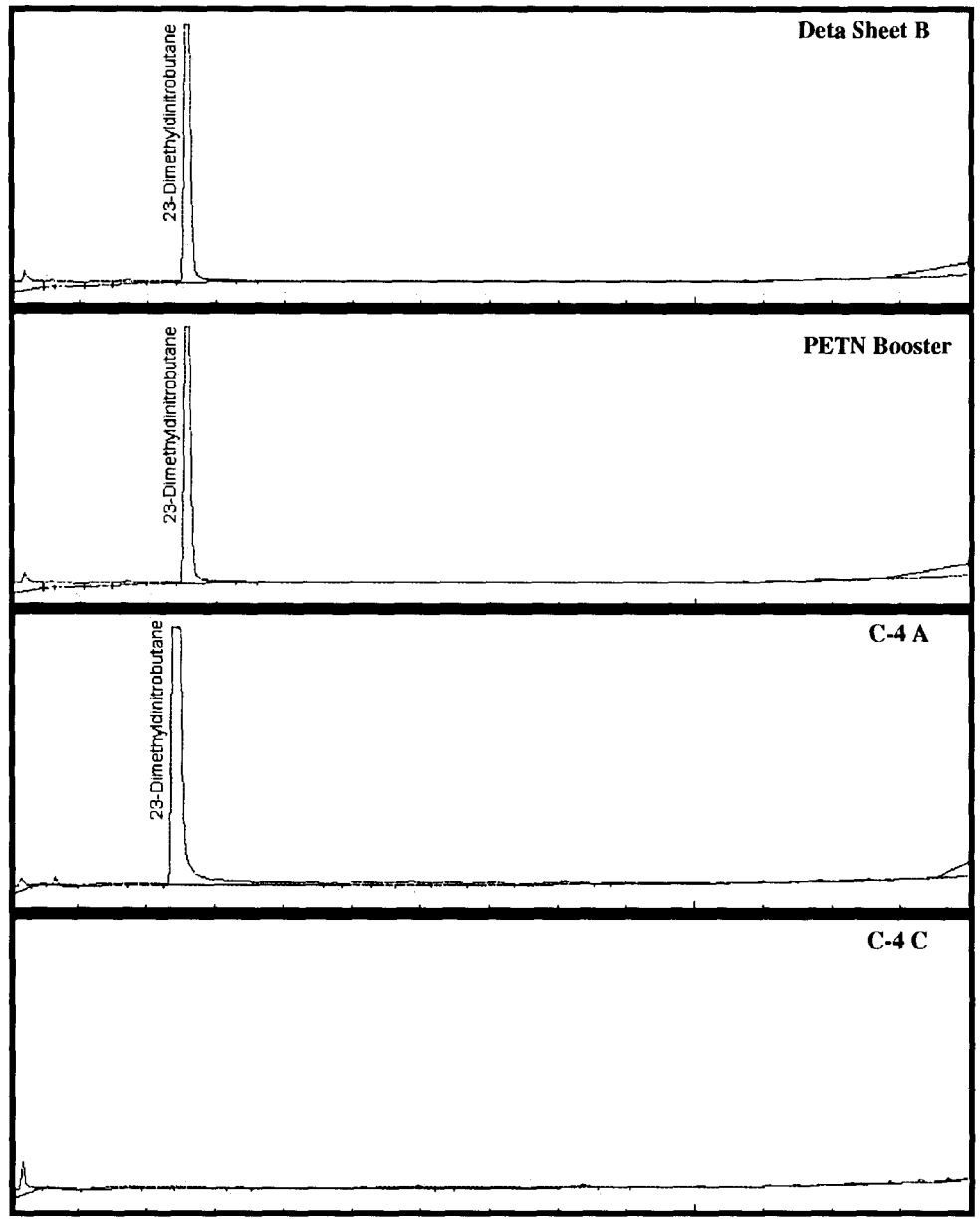
FIG. 20 shows SPME-GC-ECD headspace of plasticized explosives.
Figure 21:
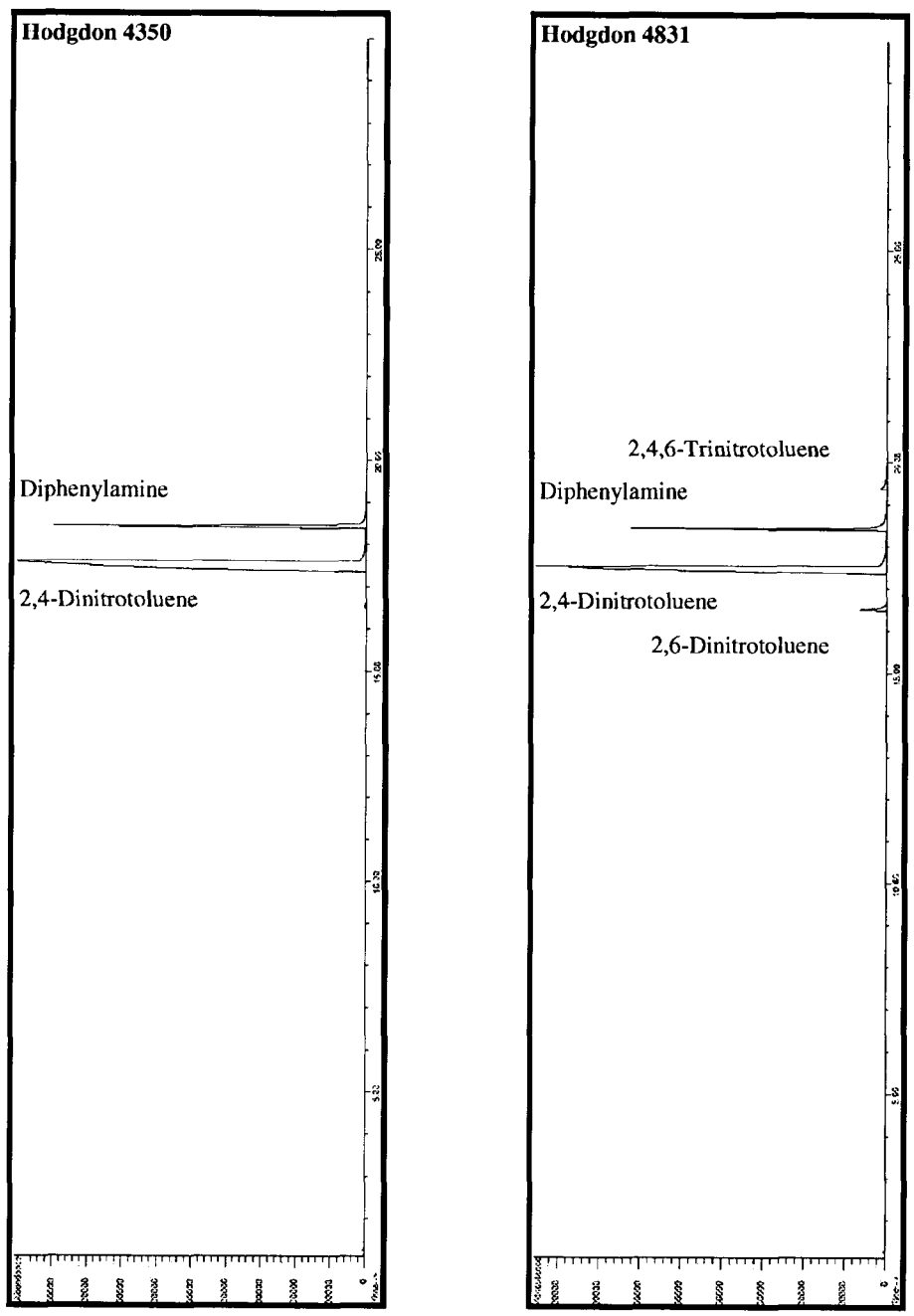
FIG. 21 shows SPME-GC-MS headspace of Hodgdon single based powders.
Figure 22:
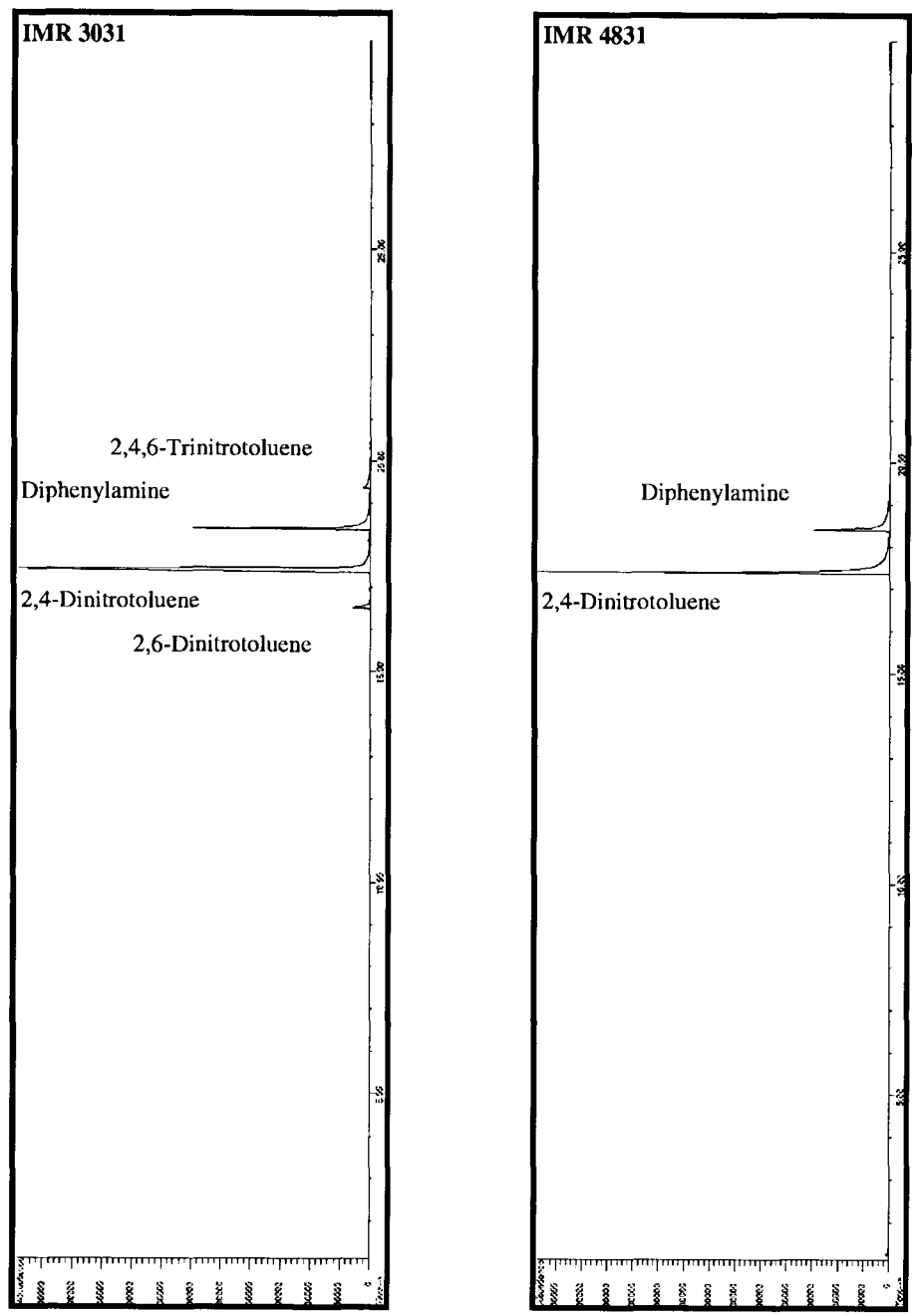
FIG. 22 shows SPME-GC-MS headspace of IMR single based powders.
Figure 23:
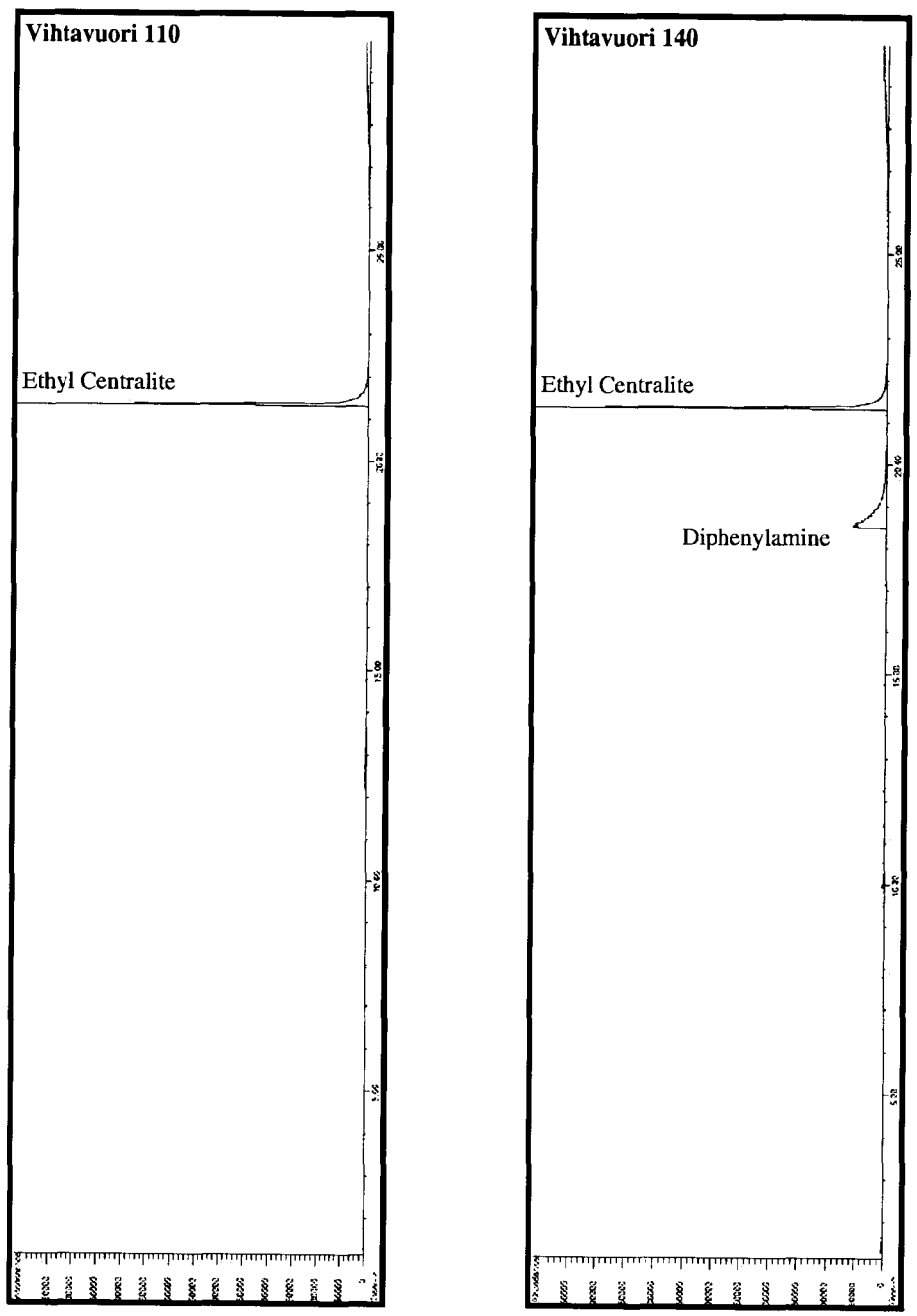
FIG. 23 shows SPME-GC-MS headspace of Vihtavuori single based powders.
Figure 24:
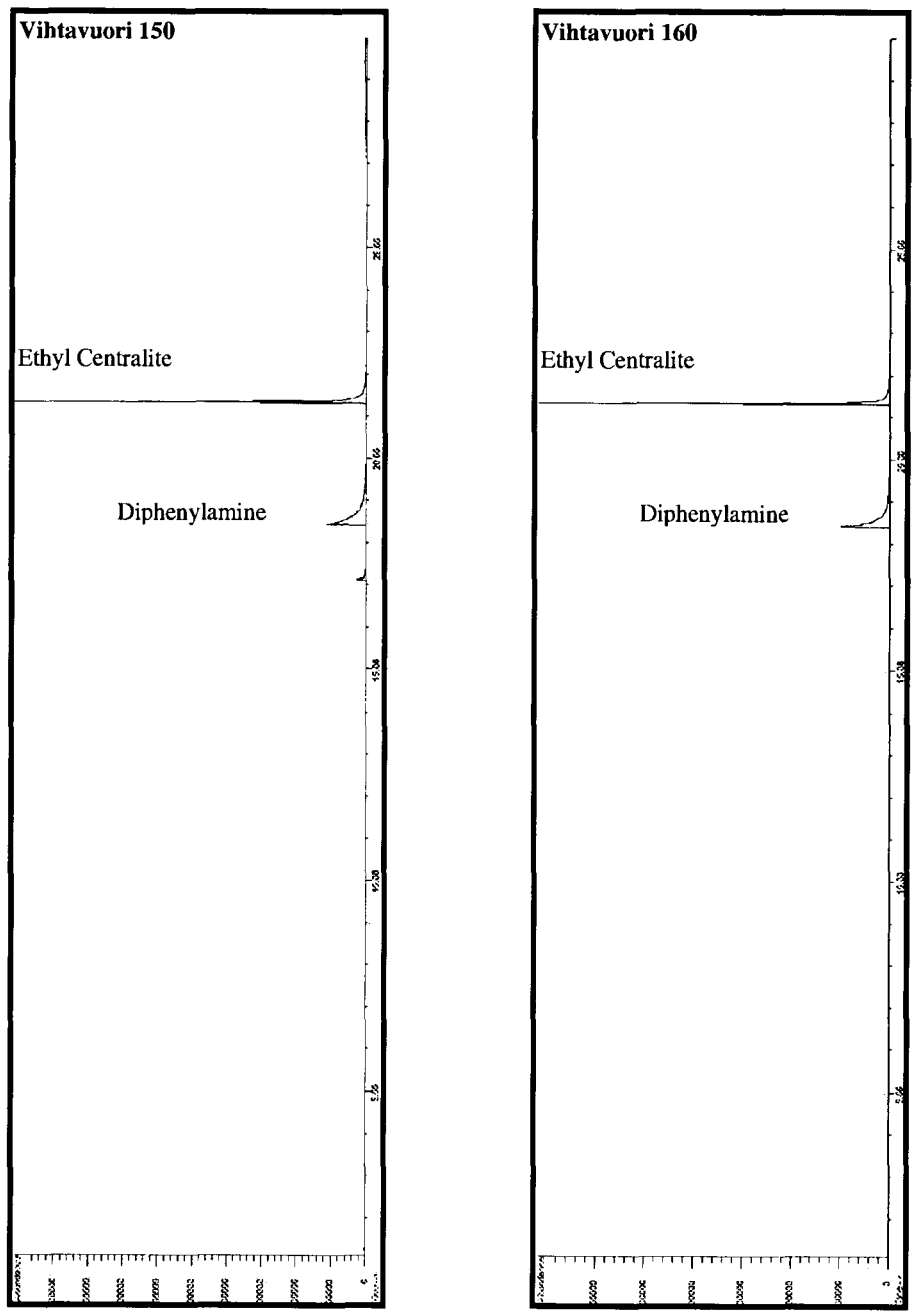
FIG. 24 shows SPME-GC-MS headspace of Vihtavuori single based powders.
Figure 25:
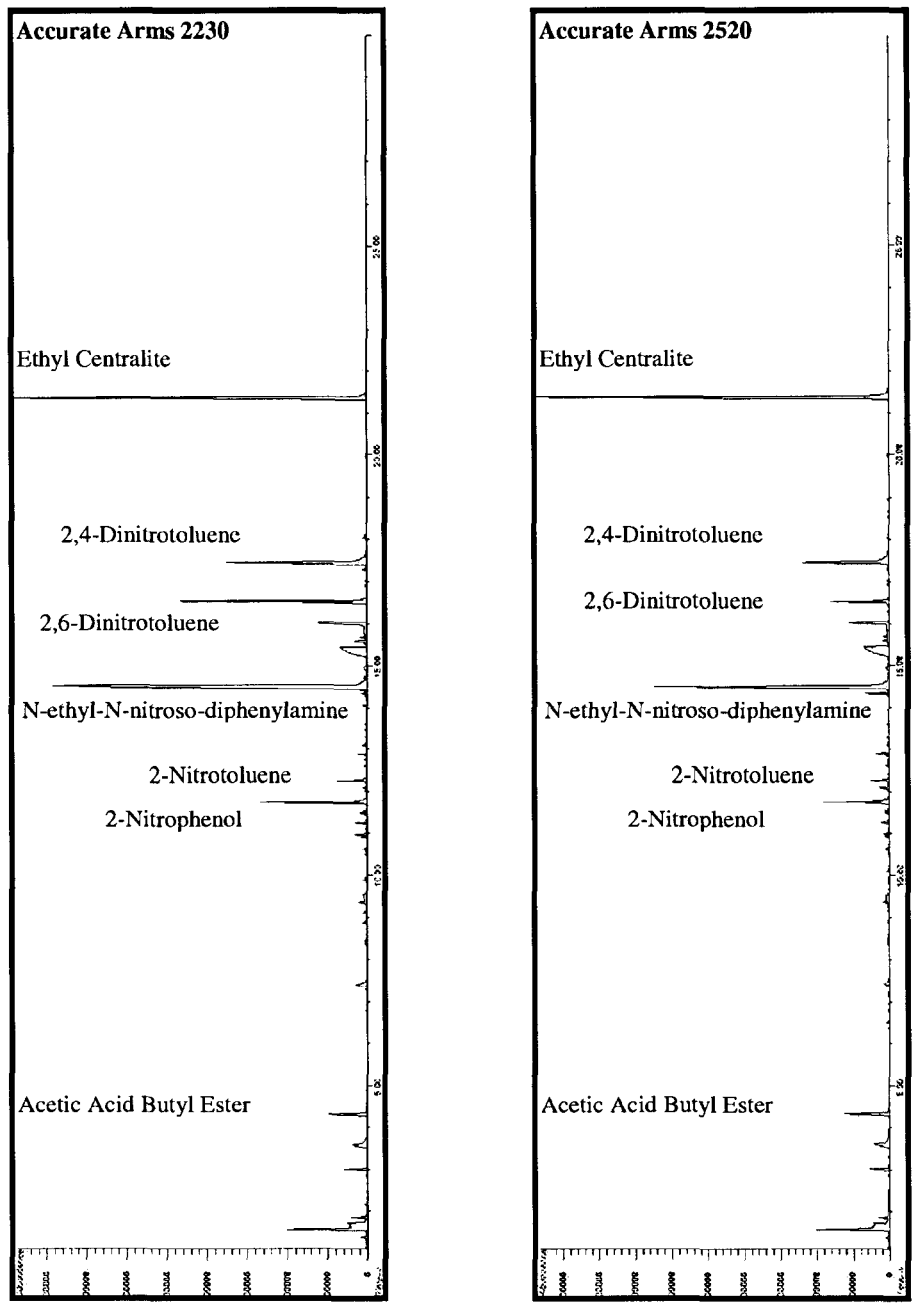
FIG. 25 shows SPME-GC-MS headspace of accurate arms double based powders.
Figure 26:
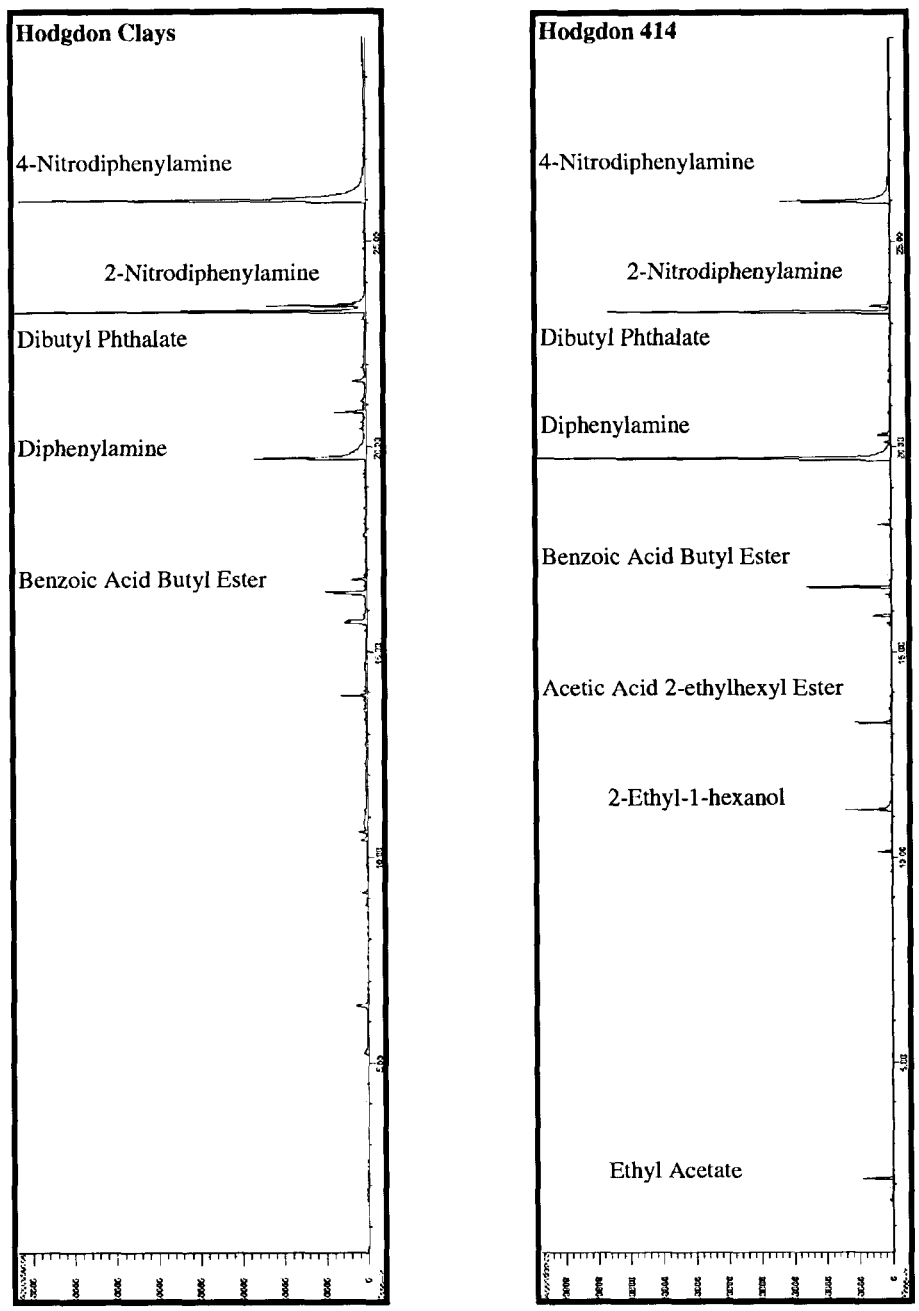
FIG. 26 shows SPME-GC-MS headspace of Hodgdon double based powders.
Figure 27:
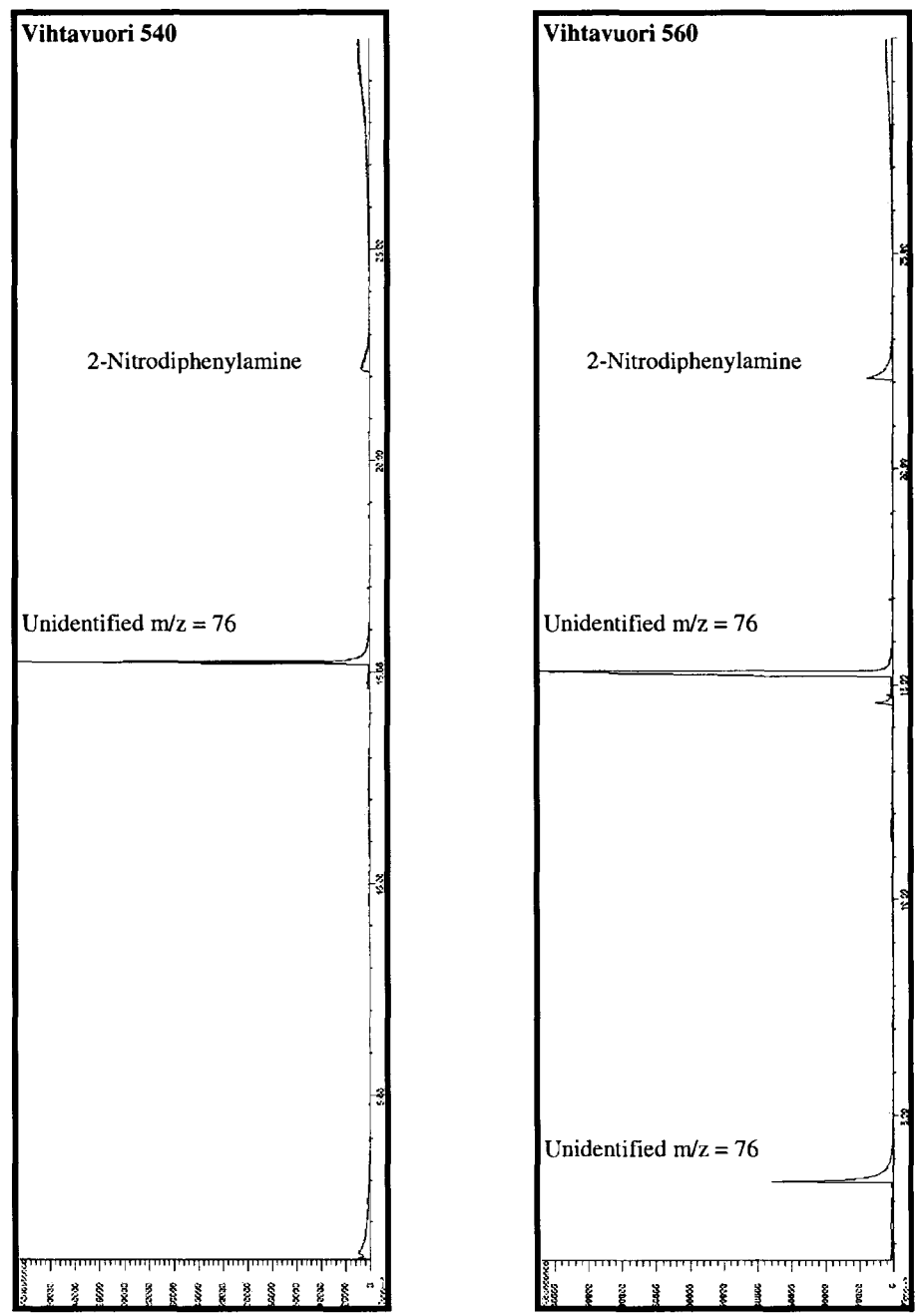
FIG. 27 shows SPME-GC-MS of Vihtavuori double based powders.
Figure 28:
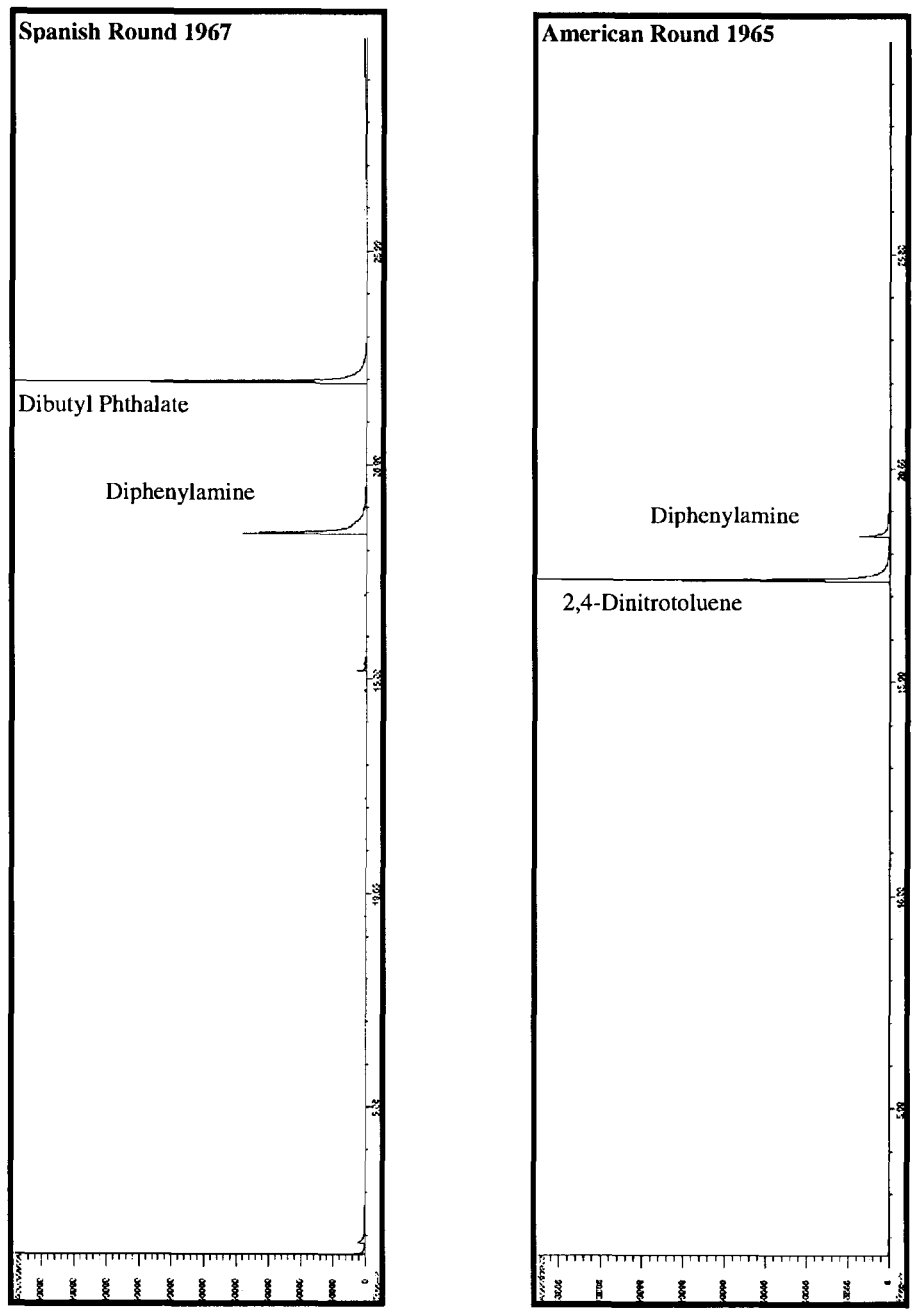
FIG. 28 shows SPME-GC-MS headspace of military rounds.
Figure 29:
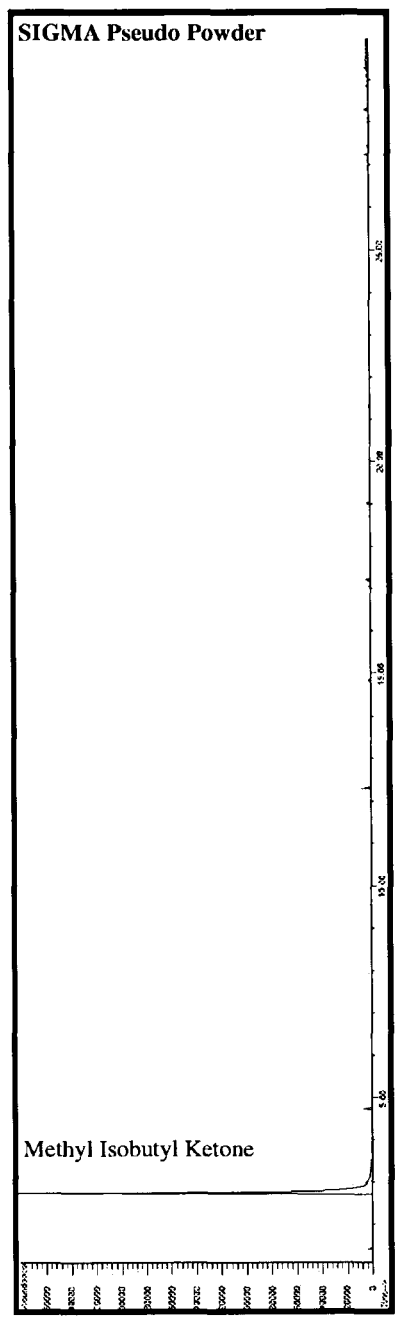
FIG. 29 shows SPME-GC-MS headspace of Sigma Aldrich pseudo powder.
Figure 30:
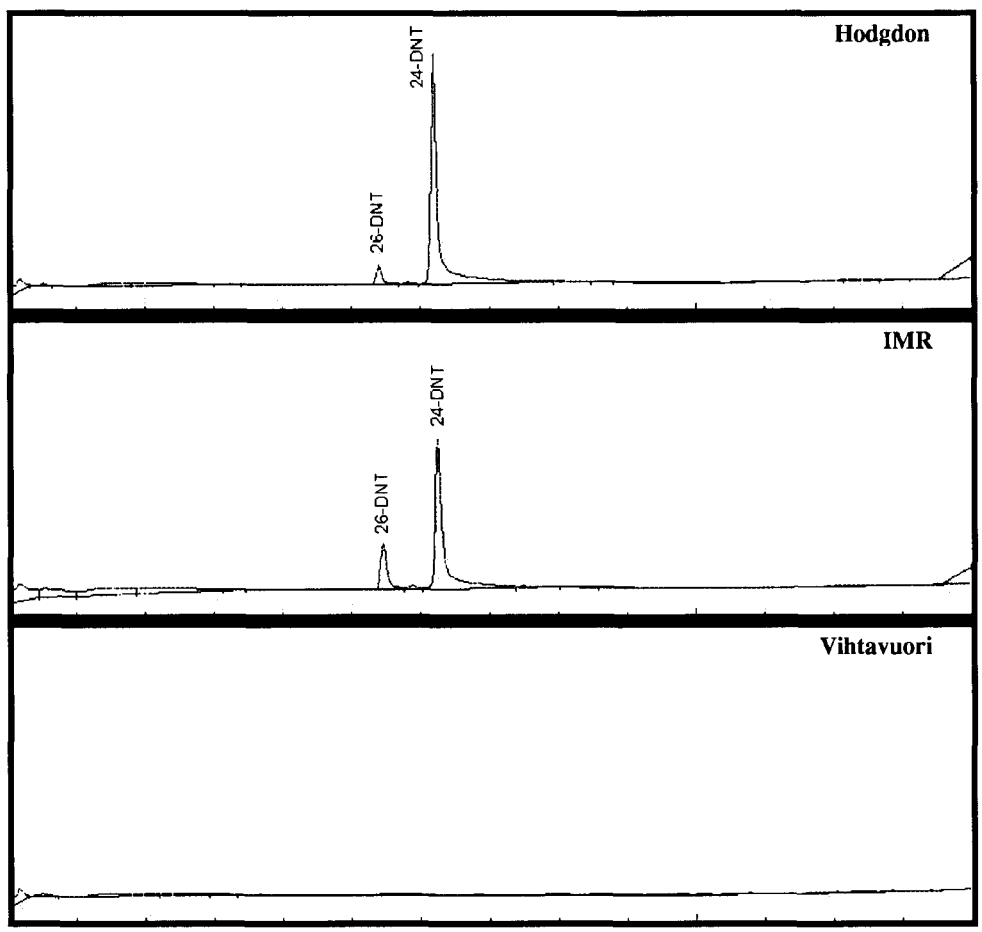
FIG. 30 shows SPME-GC-ECD headspace of single based powders.
Figure 31:
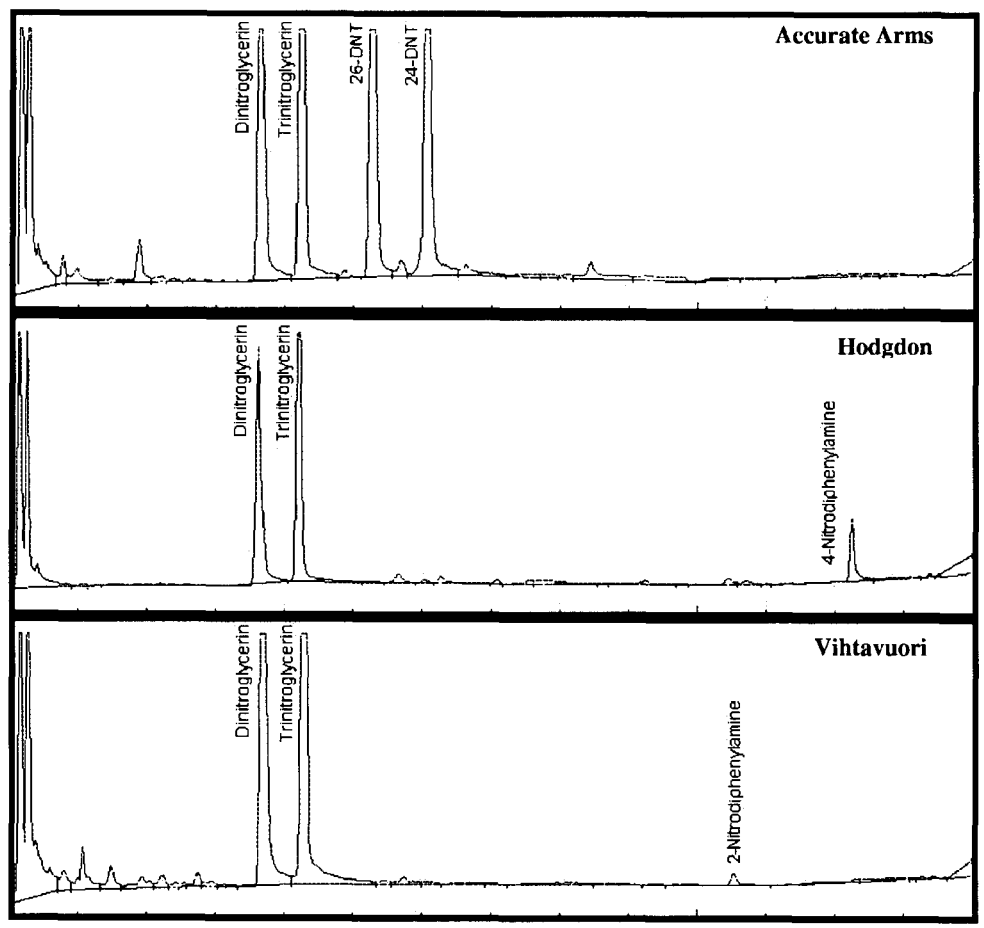
FIG. 31 shows SPME-GC-ECD headspace of double based powders.

Explosive standards were obtained from Cerilliant (Round Rock, Tex.) including EPA method 8330 components (nitrobenzene, 1,3-dinitrobenzene, 1,3,5-trinitrobenzene, 2-nitrotoluene, 3-nitrotoluene, 4-nitrotoluene, 2,4-dinitrotoluene, 2,6-dinitrotoluene, 2,4,6-trinitrotoluene, RDX, HMX and Tetryl) and EDGN, Trinitroglycerin and PETN.

Explosive training aid samples were sampled from local and state law enforcement agencies, including Miami Dade Police Department Bomb Squad, Florida International University Police Department K9 Unit, Palm Beach County Sheriff's Office Bomb Squad and K9 Division, and Florida Highway Patrol K9 Division.

NESTT Training Aids were purchased from Ray Allen Manufacturing Company (Colorado Springs, Colo.). Trinitroglycerin was in the form of a package of trinitroglycerin tablets (25×0.4 mg dose).

Selected smokeless powders were purchased from a local outdoor & hunting store. Smokeless powder samples were also donated from rifle patrons at a South Florida gun range.

Laboratory Supplies

Headspace vials (4 ml and 10 ml) fitted with phenolic plastic caps and a PTFE/silicon septum, Solid Phase Microextraction fibres and fibre holders, ABC autosampler vials (2 ml) were purchased from Supelco (Bellefonte Pa.).

Other Supplies

Steel quart and gallon sized paint cans were obtained from All American Containers (Miami, Fla.). Metal electrical junction boxes, 4"×4"×2" were purchased from a local hardware store. Sterile cotton gauze, 2"×2", was purchased from Independent Medical Co-op (Daytona Beach, Fla.).

Plastic heat seal bags were obtained in 1.5, 2.0, 3.0 and 4.0 mil Low Density Polyethylene, 2.0 mil Polypropylene, and Cellophane chemistries. Aluminised Kapak bags were purchased separately from Kapak (St Louis Minn.).

Explosive Headspace Analysis

Sample Preparation

Explosive samples ranging from 0.25 g to 1.0 g of explosive were placed inside 10 ml glass vials from Supelco and capped with Silica/PTFE septa. Smokeless powder samples ranged from 2.0 g to 3.0 g were prepared in a similar fashion. The NESTT aids were measured out to 3.0 g and again placed inside a 10 ml glass vial, and capped.

For extractions performed at room temperature, the explosive samples were stored on the laboratory bench, and a clamp stand used to support the SPME fibre holder above the vial. The SPME holsters with the variation needle were set to 2.4 cm, which permitted approximately 2 cm of fibre to enter the headspace of the vial, preventing contact between the fibre and the sample.

Extractions performed at elevated or depressed temperatures were performed in hot water, or iced water baths respectively. The hot water bath was constructed from a beaker of water resting on a hot plate. A thermometer was used to monitor the bath temperature, and polystyrene beads placed on the surface of the water bath to minimalise evaporation. The water temperature was observed prior to introducing the explosives, to ensure that a steady temperature was achieved. The ice water bath was constructed from an insulated polystyrene foam container filled with ice and water. Again a thermometer was used to monitor bath temperature.

In both cases a clamp stand was used to support the thermometer, to hold the vial in the water bath, and to support the SPME holster.

Gas Chromatography—Mass Spectrometry (GC-MS)

The headspace of the sample was then extracted using the SPME fibre. The fibre was inserted through the septum and exposed approximately 1.0 cm above the sample within the closed vial for the allotted time, prior to immediate GC analysis.

The general volatiles SPME-GC-MS method used a 70 um StableFlex™ Carbowax®/Divinylbenzene (CW/DVB) SPME fibre from Supelco (Bellefonte, Pa.) to sample the headspace at ambient temperature with injections into a Supelco® SPME liner at 235° C. The SPME exposure time was optimized to 30 minutes for the high explosives and 15 hours for the low explosive powders. The GC-MS used was the Agilent 6890-5973 combination running Chemstation software. The column used was an HP5 30 m, 0.25 mm i.d., 25 μm film thickness column also obtained from Agilent. The injection port was held at 220° C., with a 5 minute SPME desorption. The oven program was a 40° C. hold for 5 minutes followed by a 10° C./minute ramp to 280° C., with a 1 minute hold at 280° C. The carrier gas was helium at 1.0 ml/minute. The MS was operated in Electron Ionization (EI) full scan mode from 50 amu to 500 amu, with a 1 minute solvent delay.

Gas Chromatography—Electron Capture Detector (GC-ECD)

The explosive specific SPME-GC-ECD method used a 100 um Polydimethylsiloxane (PDMS) SPME fibre from Supelco with an exposure time of 5 minutes with injections into a 1 mm Restek® deactivated liner at 235° C. The GC used was an Agilent 5890 with ECD. The column employed was a 6.0 m 0.53 mm i.d., 1.5 μm film thickness Restek (Bellefonte, Pa.) Rtx®-TNT column, a specialist column for explosives analysis. The injection port was held at 250° C. with a 1 second desorption. The oven program began with a 1 minute hold at 80° C., followed by 10° C./minute ramp to 180° C. This was followed by a 30° C./minute ramp to 300° C. and finished with a 3 minute hold at 300°. The carrier was Helium at 15 ml/minute with a Nitrogen 60 ml/minute makeup in the ECD. The detector was held at 330° C. with anode purge.

Canine Field Trials

Active Odor Determinations

Having confirmed the multiple presences of certain suspected odor chemicals, field trials were arranged with local law enforcement agencies that were operating trained and certified explosives detection canines. The odor chemicals were prepared as acetonitrile solutions. The acetonitrile was obtained from Fisher Scientific (Pittsburgh, Pa.) and the odor chemicals ordered from Sigma Aldrich (Milwaukee, Wis.). Solutions at 1000 and 100,000 ppm (mg/L) were prepared. 100 μl aliquots of the solutions cold then be used to apply 0.1 mg and 10 mg respectively, of the odor chemical to test substrates. The 100 μl of acetonitrile was shown to evaporate within 90 minutes leaving a residue of the odor compound. Typical odor delivery substrates were 125 mm filter paper, or 5.1 cm×5.1 cm gauze sponge heat sealed within a 2 mil low-density polyethylene (LDPE) bag. Negative controls were applied, including the acetonitrile solvent and uncontaminated filter papers & gauze.

The odor aids were presented to the canines in metal electrical boxes that had been previously cleaned with soap, then rinsed with water and baked at 200° C. overnight. The odor chemicals detected were then presented to the canines in an "odor line-up" of hide boxes. The electrical boxes were placed 1.5 m apart along a floor surface and presented to the canines. The detection canines would then walk the boxes, with the handlers ensuring that the canines detailed each box with a sniff directly above it. The handlers were not informed of the content of the electrical boxes, and there was no specific marking to indicate the contents. One box contained the suspected odor chemical, other boxes contained distracters or negative controls including the acetonitrile solvent.

A positive control, usually actual explosive material provided by the police agency, was presented separately, also in a hide box. The order of the hides, to contain the blank/test odor/controls, was randomised to prevent assumption or guessing from the handlers.

45 certified police detection canines participated in this study, although actual numbers at each field test ranged from four to fourteen on any given day. Each canine was assigned a three digit identification to assure anonymity in reporting the results.

NESTT Aid Evaluation

The complete range of NESTT aids (including the blank distracters) were obtained and placed in the same metal hide boxes used in the field trials above. Again, negative (the blank distracter) and positive (real explosive) controls were made available separately.

Explosive Mimic Aids

Dissipation & Permeation of Odor Compounds

Having identified several chemicals as potential target odors for explosives detection canines, attention was focused towards developing a method of controlled delivery of the odor to the canines during training. Initial compounds utilized were 2,4-dinitrotoluene, reported as a vapour target for TNT explosive, and 2-ethyl-1-hexanol, a target for C-4 and other plasticized explosives.

10% solutions of 2,4-dinitrotoluene and 2-ethyl-1-hexanol in acetonitrile were prepared, and 100 µl of the solutions spiked onto a 2"×2" sterile cotton gauze. The gauze was left to sit for 90 minutes to allow the acetonitrile solvent to evaporate to dryness. The gauze was then heat sealed inside 3"×3" plastic bags of different polymer chemistry, and monitored gravimetrically over time. The plotted results of mass loss over time allowed calculation of diffusion rates of the odor compounds through the plastic membranes.

COMPS Explosive Aids—Silica Model

The Controlled Odor Mimic Permeation System (COMPS) TNT mimic was produced by diluting 2,4-dinitrotoluene with 400 mesh silica powder to 5% w/w. 5.0 g of 2,4-dinitrotoluene was powdered in a mortar and pestle to reduce particle size and added to 95 g of silica. The powders were mixed in a large vessel using a magnetic stirrer bar for 1 hour. The resulting mixture was then weighed out into 25 g portions, which were packaged and heat sealed within 2.0 mil LDPE bags. The training aids made using the LDPE bags were then stored in a sealed paint can and transferred to the trainer for use in the field testing. All preparation was conducted wearing nitrile gloves to avoid human scent contamination of the aids.

COMPS Explosive Aids—Cotton Gauze Model

The odor compounds chosen for version 1 are listed in Table 93. 10.0 mg of each chemical was deposited on individual cotton gauze and sealed in permeable polymers for clean, controlled delivery.

The cotton gauze aids were prepared in a similar fashion to the dissipation study in 0.10% w/v solutions of the odor chemicals were prepared in acetonitrile. 100 µl of the solutions were then spiked onto sterile cotton gauze, and left to sit for 90 minutes to allow the solvent residue to evaporate. The blank control distracters were prepared using 100 µl of the acetonitrile solvent.

For larger concentration of odor compounds, the amount of 10% w/v solution was increased, and the evaporation time adjusted accordingly. For very large amounts, or for liquid odor compounds, the chemical cold be measured or weighed directly onto the gauze.

The 3.0 mil LPDE bags were used, to exploit the permeation of odor through the plastic which retaining a durability. The prepared aid was then stored and heat sealed within an aluminised Kapak bag. All preparation was performed wearing nitrile gloves.

Solid Phase Microextraction (SPME) Optimisation

Fibre Chemistries

Optimisation of the fibres suitable for Gas Chromatography (those stable to the high temperatures of the injection port) was performed. From the recommended applications in Table 13 it follows that those fibres suited for odors and flavours (DVB/CAR on PDMS) and volatiles (PDMS and PDMS/DVB) may be best suited to the analysis of the chemical headspace of explosives, although all fibre chemistries were tested. The headspaces of TNT and C-4 samples, were extracted in triplicate using the selection of fibres.

The exposure time utilised was 15 minutes and the injection port temperature set to 235° C. The general volatiles method detailed in paragraph [0092] was used, such that the only variable observed was the specific fibre chemistries.

Table 15 and Table 16 present the peak areas of the odor chemicals extracted for TNT (2,4-dinitrotoluene and 2,4,6-trinitrotoluene) and C-4 (2-ethyl-1-hexanol and 2,3-dimethyl-dinitrobutane) respectively. The standard deviation between the triplicate extractions for each odor compound/SPME chemistry is denoted by the error bars.

It can be shown that whilst the PDMS and PDMS/DVB exhibited the most efficient extraction of the TNT odor compounds, the PDMS was not so suited to the C-4 headspace. Conversely, the DVB/CAR/PDMS and PA performed poorly for TNT odor yet gave large peaks for the C-4 sample.

Certain fibre chemistries such as 7um PDMS and CAR/PDMS did not extract certain odor compounds for C-4 and TNT respectively. The CW/DVB performed well for both the TNT and C-4 samples. Additionally the reproducibility of the CW/DVB was observed to be better than that of the other fibres, denoted by the smaller deviation between samples. The CW/DVB was chosen as the best universal fibre for the GC-MS method. This study was in good agreement with a previous optimisation conducted during an earlier project, which concluded that CW/DVB and PDMS were the best suited fibres for explosive headspace extraction, in laboratory and field environments respectively [46]. An additional benefit of the CW/DVB fibre chemistry is its short conditioning time of 30 minutes at 220° C., compared with other fibres that can extend to 4 hours at 320° C. (DVB/CAR/PDMS).

Exposure Times

Headspace SPME sampling involves a three-way equilibrium between the concentrations of the target analytes in the sample, the sample headspace, and the SPME fibre surface. Frequently the headspace collection is performed at non-equilibrium conditions, whereby the exposure time of the SPME fibre is insufficient to achieve equilibrium, however detectable levels of analyte are observed. The concentration of analyte upon the fibre surface increases steadily, proportional to the length of exposure up to a certain maximum point; at which point the concentration can then be seen to reduce before achieving equilibrium. Headspace SPME is also competitive, with headspace components vying for a limited space on the fibre surface. Smaller, lighter volatiles absorb/adsorb fastest, with the larger, less volatiles compounds following at a slower rate. Longer exposure times will thus favour the heavier analytes, whereas shorter exposures will favour lighter elements of the headspace.

Studies with TNT explosive revealed that maximum extraction was obtained after 120 minutes, after which analyte concentrations were observed to drop off. Examination of the peak shapes during GC data analysis reveal peak tailing at longer exposure times, as a result of overloading or slower thermal desorption. It was chosen that an exposure time of 30 minutes was sufficient to provide useful headspace data for the explosive samples; however longer exposures of 60 to 180 minutes cold be used for samples that did not exhibit abundant headspace chemistries. Extractions of 18 hours were also considered for explosives with low vapour pressures, although overloading of the more volatile components was observed in such circumstances.

Exposure Temperature

The exposure temperature of the headspace extraction clearly has the potential to affect the profile and peak abundance of chemicals collected. A short study to confirm this expectation was performed using an inert TNT training aid from NESTT. Headspace samples were collected at 0° C., 25° C., 50° C., 75° C. and 100° C., using a CW/DVB fibre, with exposure times of 1 and 30 minutes. The GC-MS general volatiles method was used. As expected, the ratio of 2,4-DNT/2,4,6-TNT was reduced as the less volatile 2,4,6-trinitrotoluene was heated and volatilised, as visualised in Table 18 and Table 19.

With the exception of the 50° C. sample, which was indicative of the competitive extraction of heavier analytes over longer exposures, very little difference was noted in the ratios from the one and 30 minute samples. For the main study, the exposure temperature was set simply to room temperature, considered to be ~20° C., to achieve the realism of the average environment that an explosives detection canine might be working in.

Desorption Temperature

The injection port of the Gas Chromatograph is responsible for the thermal desorption of the analytes from the SME fibre. The operating range of the Carbowax/Divinylbenzene fibre is 200° C.-250° C. with 30 minute exposures of C-4 and TNT explosive at room temperature were compared in triplicate, at a range of injection port temperatures including 205° C., 220° C., 235° C. and 250° C.

For the TNT samples, a difference in injection port temperature was noted, with an increase in 2,4-dinitrotoluene peak areas as the injection port temperature increased from 205° C. to 235° C., followed by a sharp drop in peak area at 250° C. It is proposed that the more efficient thermal desorption is countered by the thermal degradation before the analytes exit the separation column.

There was very little difference in peak area for both the 2-ethyl-1-hexanol and the 2,3-dimethyl-2,3-dinitrobutane in the headspace of the C-4 explosive, however the reproducibility of the peak areas for the 235° C. was significantly better than the other exposure temperatures.

An injection port temperature of 235° C. was chosen as the optimal temperature for the SPME-GC-MS method, balancing thermal desorption and thermal degradation.

Explosive Headspace

High Explosives

The analysis of the High Explosives covered TNT and Cast Explosives, Polymer Bonded (plastic) Explosives, and PETN Detonation Cords. The Cast Explosives are commonly based around TNT and other aromatic nitrates whereas the Plastic Explosives generally involve the nitramine or nitrate ester explosives such as RDX and PETN.

Three samples of TNT, plus one sample each of HDP-1 Sheet, Composition B and a Cast Primer Charge, used as canine training aids, were sampled from local law enforcement agencies, including Miami Dade Police Department (MDPD), Palm Beach Sheriff's Office (PBSO) and Florida International University Public Safety (FIU). The odor headspaces, analyzed by SPME-GC-MS, shown in Table 22, Table 23 and Table 24 were shown to contain the parent explosive 2,4,6-trinitrotoluene in every sample, often in addition to 2,4-dinitrotoluene (5/6), 2,6-dinitrotoluene (3/6), 3,5-dinitrotoluene (3/6) and 1,3-dinitrobenzene (2/6) in several of the samples.

The frequency of occurrence of the odor compounds is summarised in Table 29. Incidentally, the Cast Primer was analyzed for content and shown to be Tetratol, a combination of TNT and Tetryl, but no Tetryl was observed in the headspace.

Eight samples of Polymer Bonded Explosive sampled from local and state agencies were also prepared for analysis; two Flex-X Deta Sheet samples, four Composition 4 (C-4) samples, and one each of PETN Booster and TNT Booster charges.

Following SPME-GC-MS headspace analysis, no parent explosives, such as the RDX in the C-4 or PETN in the booster, were observed in the headspaces, as presented in Table 25, Table 26, Table 27 and Table 28. 2-ethyl-1-hexanol (a common additive to plastic explosives) was detected in five of the eight samples.

Other chemicals detected included the detection marker 2,3-dimethyl-2,3-dinitrobutane or DMNB (6/8), and 2-ethylhexanoic acid (2/8). Cyclohexanone, phenol, acetic acid butyl ester, acetic acid 2-ethylhexyl ester and citric acid tributylacetyl ester were all detected in one of the 8 samples, and as such were not considered common odors. Cyclohexanone, a common recrystalisation solvent used in RDX synthesis, has been reported as a common headspace component of C-4 in previous publications [47], but is more commonly observed in fresh samples of C-4 than aged samples, due to its volatility. Although labelled as TNT based booster, no TNT or other aromatic nitrates were detected in the headspace of the sample.

The Polymer Bonded Explosives were also analyzed using the SPME-GC-ECD method to ensure that the parent explosives, if present in the headspace, were not being lost due to the GC-MS conditions. SPME exposure was shortened to five seconds to prevent excessive overloading of the more sensitive detector. Similar headspace signatures were seen employing SPME-GC-EDC. No parent explosives (TNT, PETN and RDX respectively) were observed in the headspace of the TNT or PETN booster, and the C-4 or Deta Sheet samples, and similarly no 2,3-dimethyl-2,3-dinitrobutane was detected in the headspace of the untagged Deta Sheet and C-4 samples.

No volatile organic chemicals were detected in the headspace of the PETN detonation cords. Even by increasing the SPME exposure time to 18 hours did not result in a successful identification of any potential headspace component Smokeless Powders Headspace analysis of the single based powders from Hodgdon Powder Company, IMR Powder Company and Vihtavuori, revealed a headspace chemistry that was remarkably constant for each manufacturer; however variance was observed between manufacturers. Hodgdon and IMR Powder Companies recently merged, which may explain the similarity between headspace components.

Results, presented in Table 31, Table 32, Table 33, and Table 34, reveal the common occurrence of diphenylamine in most single-based powders, in addition to the presence of either 2,4-dinitrotoluene or ethyl centralite in high abundance in the headspace. The range of chemicals detected was in good agreement with a qualitative analysis recently published following an international inter-laboratory "round-robin" study [48].

Sigma Aldrich markets a "pseudo-powder" explosive training aid, and this was analysed in the same manner. The headspace of Sigma's pseudo aid was shown to contain only methyl isobutyl ketone, which was not observed in real powder samples. Table 42 summarises the odor chemicals observed for the single based powders.

The SPME-GC-MS method did not reveal the presence of nitroglycerins in the headspace, but this was to be expected as a result of thermal degradation during the analysis. 2,4-dinitrotoluene, 2,6-dinitrotoluene and ethyl centralite were observed in the headspace of Accurate Arms powders, but not the other two brands analysed. 2-nitrodiphenylamine was observed in both the Hodgdon and Vihtavuori powders, in addition to 4-nitrodiphenylamine observed in Hodgdon brand only. Other compounds including 2-nitrotoluene, 2-nitrophenol and even 2-ethyl-1-hexanol (observed in most plasticized explosive headspaces) were observed in selected powders. Table 43 summarises the chemicals observed in the headspaces.

Nitroglycerins were observed in the headspace of double-based powders from all companies, when analysed by SPME-GC-ECD. Additionally, dinitrotoluenes were observed in the Accurate Arms powders, and nitrodiphenylamines were observed in the Hodgdon and Vihtavuori samples.

The combination of SPME-GC-MS and SPME-GC-ECD provided complementary information with ethyl centralite and diphenylamine/nitrodiphenylamine seen as major components using MS detection whereas ECD highlighted the presence of nitroglycerins and nitrotoluenes.

The most commonly observed headspace chemicals across all powders were 2,4-dinitrotoluene, ethyl centralite and diphenylamine. Additionally, trinitroglycerin was observed for the double-based powders. It follows that shared odor compounds between smokeless powders and high explosives exist; namely the commonality of 2,4-dinitrotoluene between the powders and TNT based explosives, and trinitroglycerin between the double-based powders and dynamites/water-gels. These results raise significant apprehension regarding the scientific soundness of the choice of smokeless powders used in training explosives detection canines.

There is potential to use certain powder brands as odor sources for training on high explosives, however further research and a field trial including the training of explosive detection canines on smokeless powders only, are required before this hypothesis may be confirmed. Conversely, the commonality of the odor between certain powders and high explosives may also present detection problems. If the smokeless powder chosen as a training aid is double-based, the canine is presented with an odor containing trinitroglycerin, which should already be learnt from dynamite. Thus there is no new odor for the canine to imprint. Should a single based powder containing 2,4-dinitrotoluene be chosen, the commonality of the odor with TNT explosives will raise a similar problem.

NESTT Aid Evaluations

Non explosive training aids are marketed for use in areas where the use of live explosives is not practical and to potentially provide more consistency in the odor chemicals used in training. The leading line of non-explosive training aids is the NESTT (Non-Hazardous Explosives for Security Training and Testing) range from Van Aken International (Rancho Cucamonga, Calif.). Purified explosives are diluted to 4-8% by silica granules or petrolatum jelly. The complete range of NESTT aids (including the blank distracters) were obtained and analyzed by SPME-GC-MS and SPME-GC-ECD.

Figure 34:
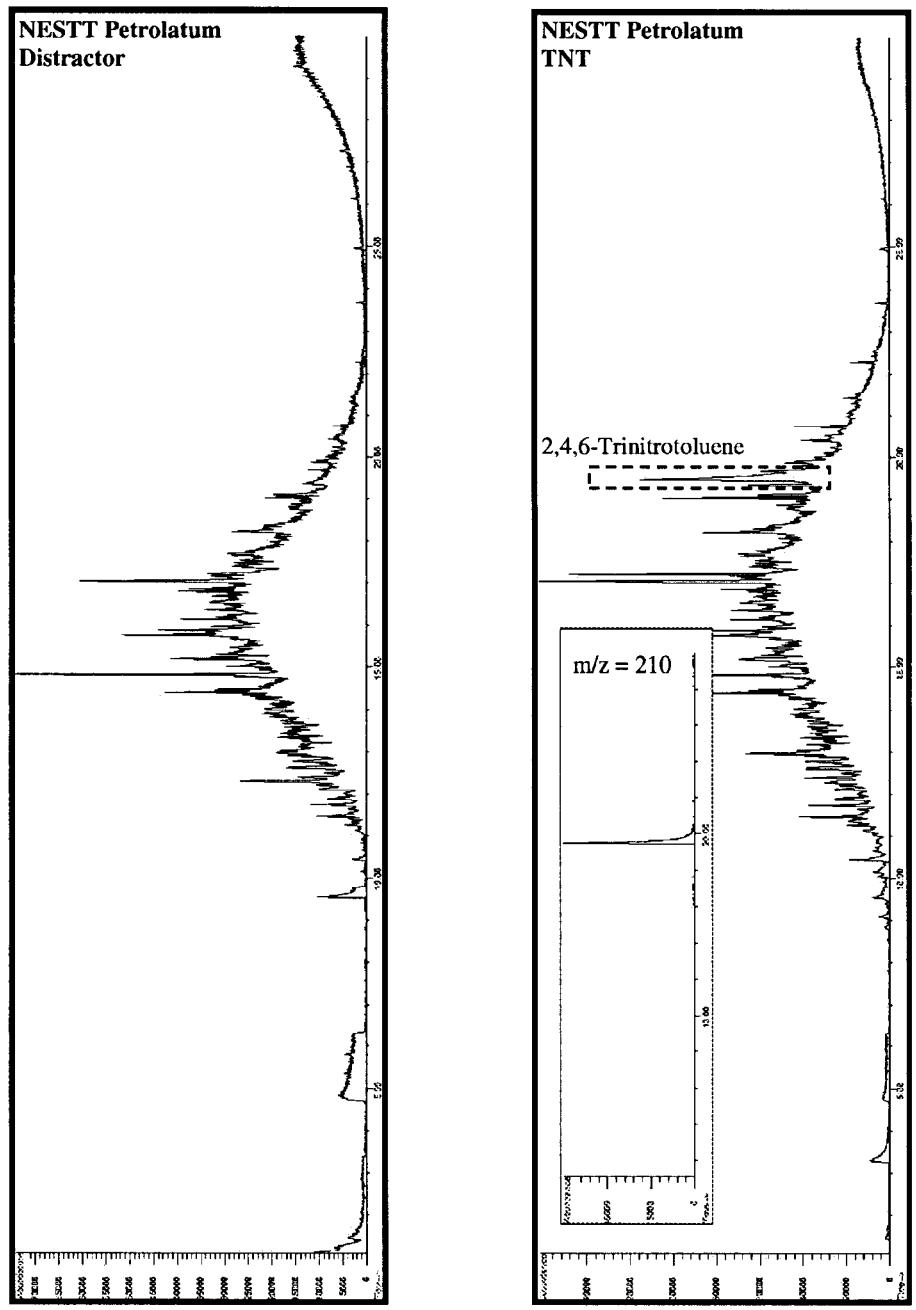
FIG. 34 shows SPME-GC-MS headspace of NESTT petrolatum training aids.
Figure 35:
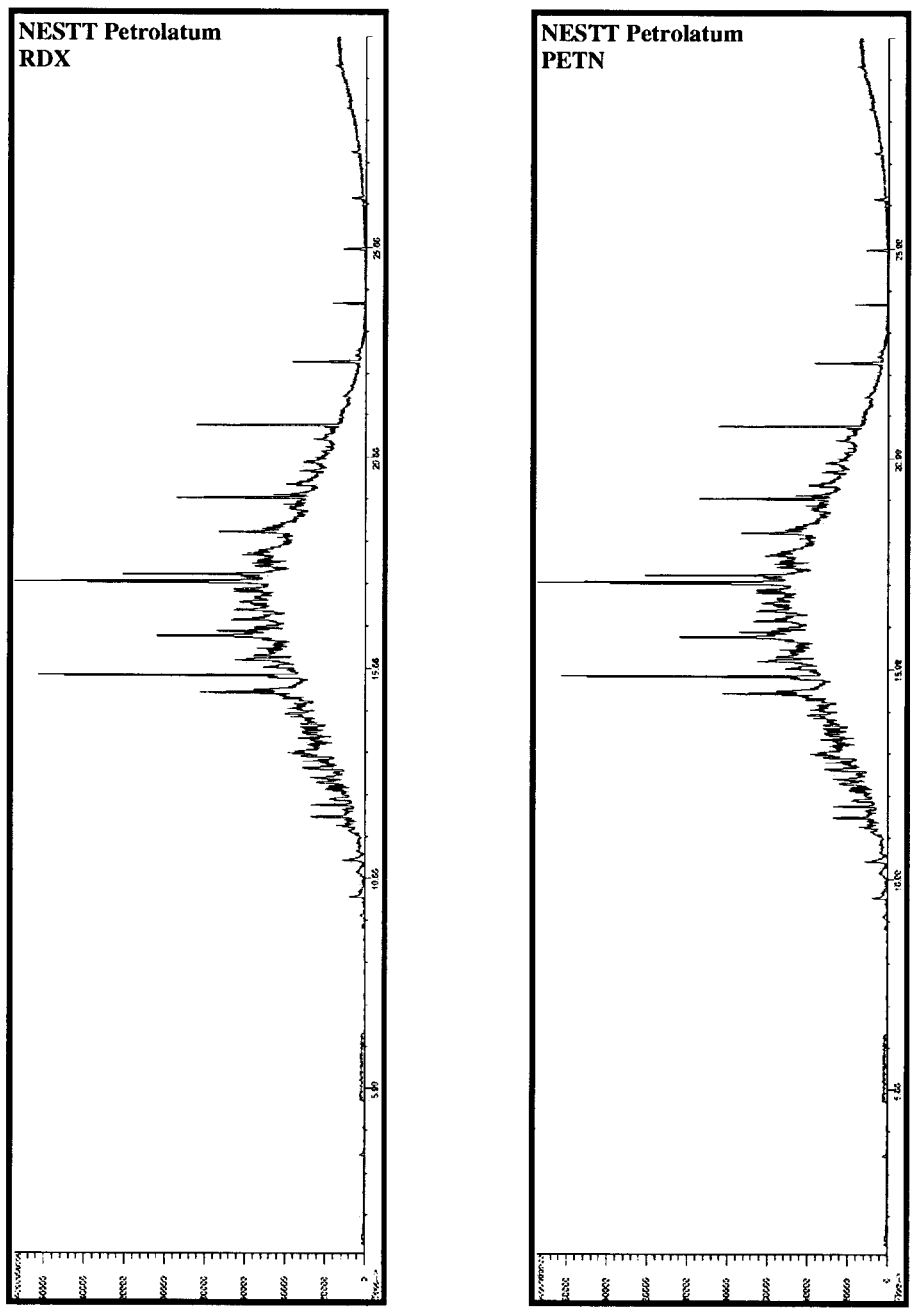
FIG. 35 shows SPME-GC-MS headspace of NESTT petrolatum training aids.
Figure 36:
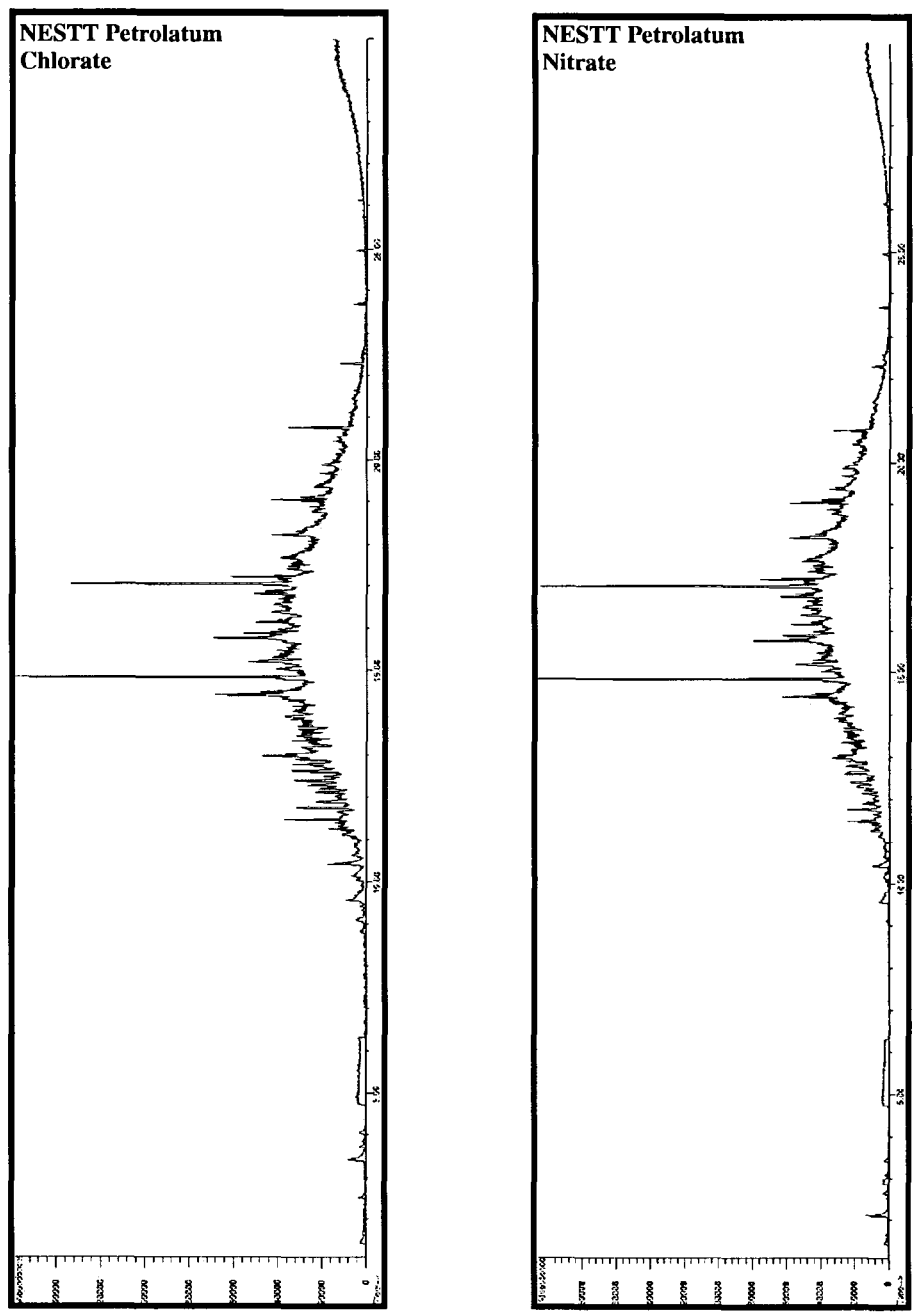
FIG. 36 shows SPME-GC-MS headspace of NESTT petrolatum training aids.
Figure 37:
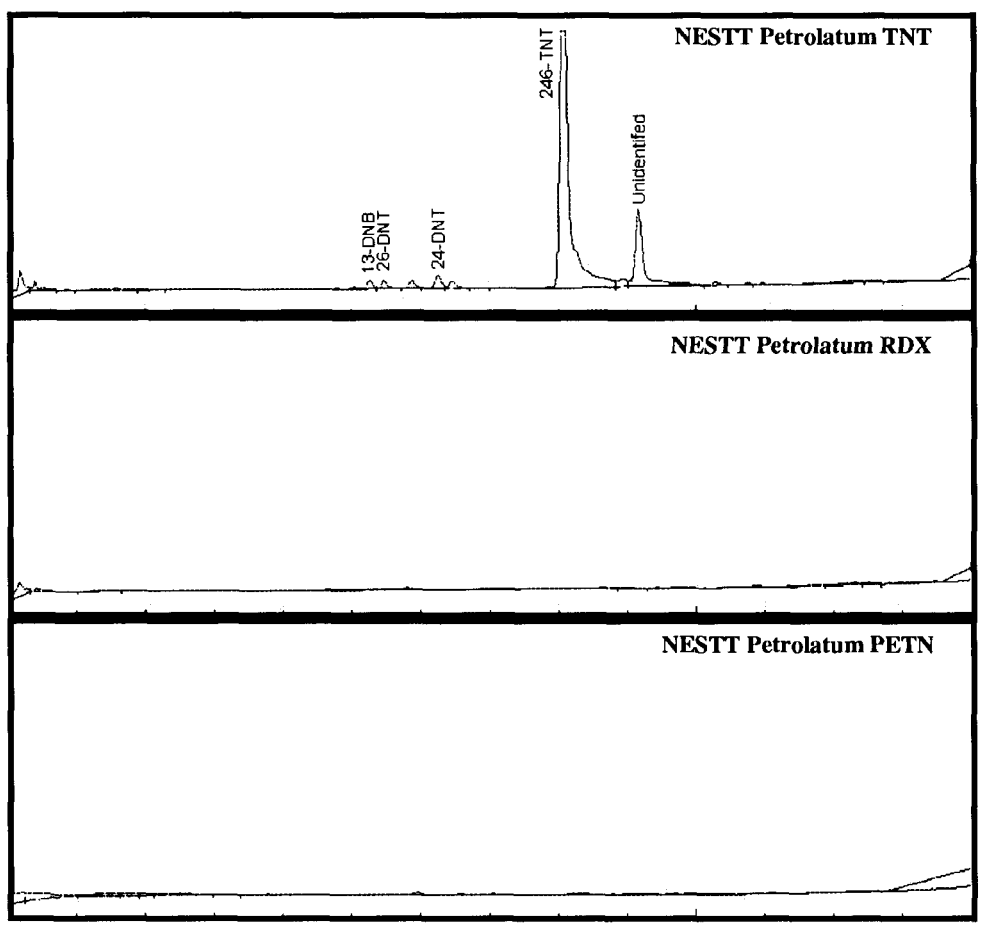
FIG. 37 shows SPME-GC-ECD headspace of NESTT petrolatum training aids.
Figure 38:
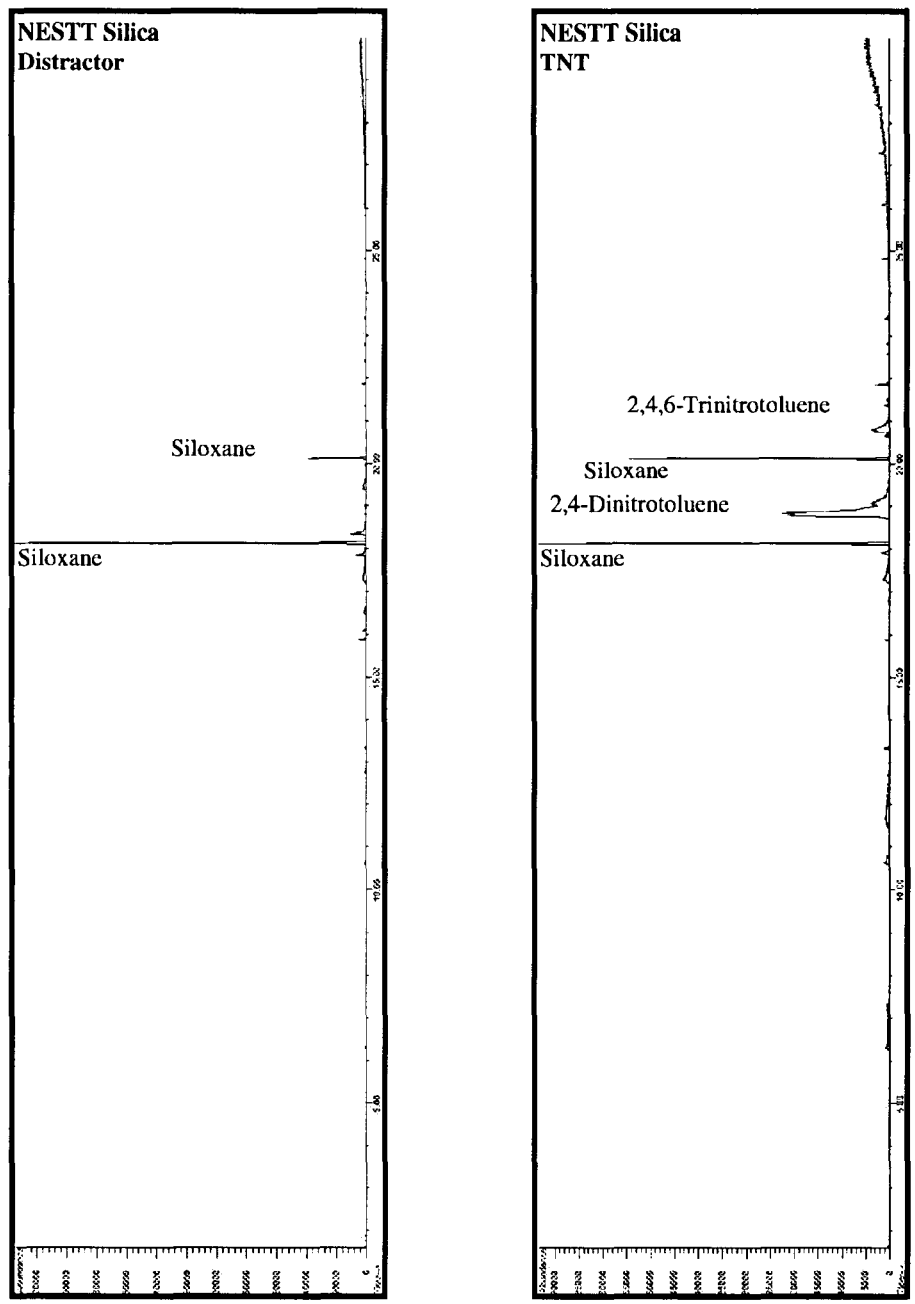
FIG. 38 shows SPME-GC-MS headspace of NESTT silica training aids.
Figure 39:
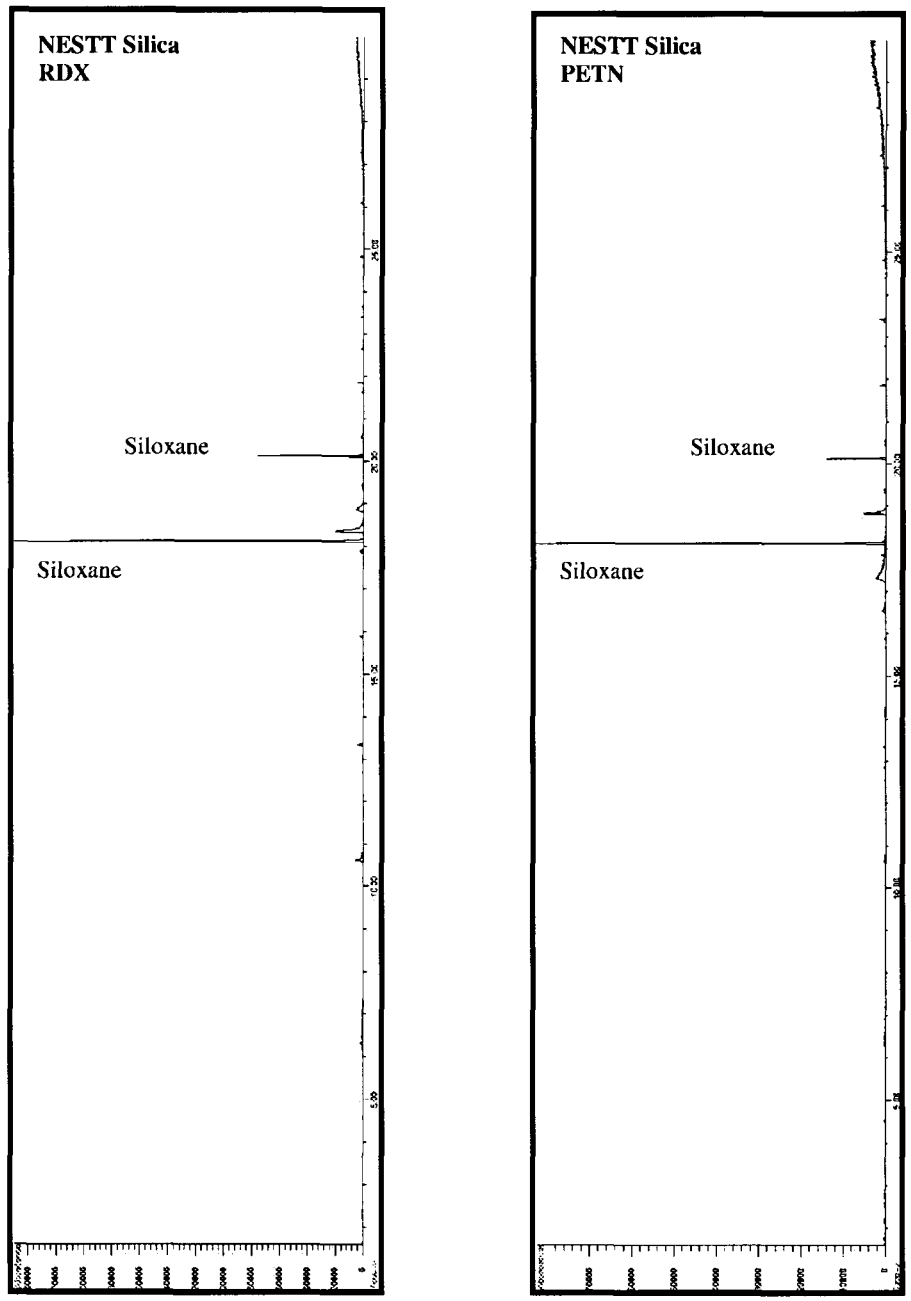
FIG. 39 shows SPME-GC-MS headspace of NESTT silica training aids.
Figure 40:
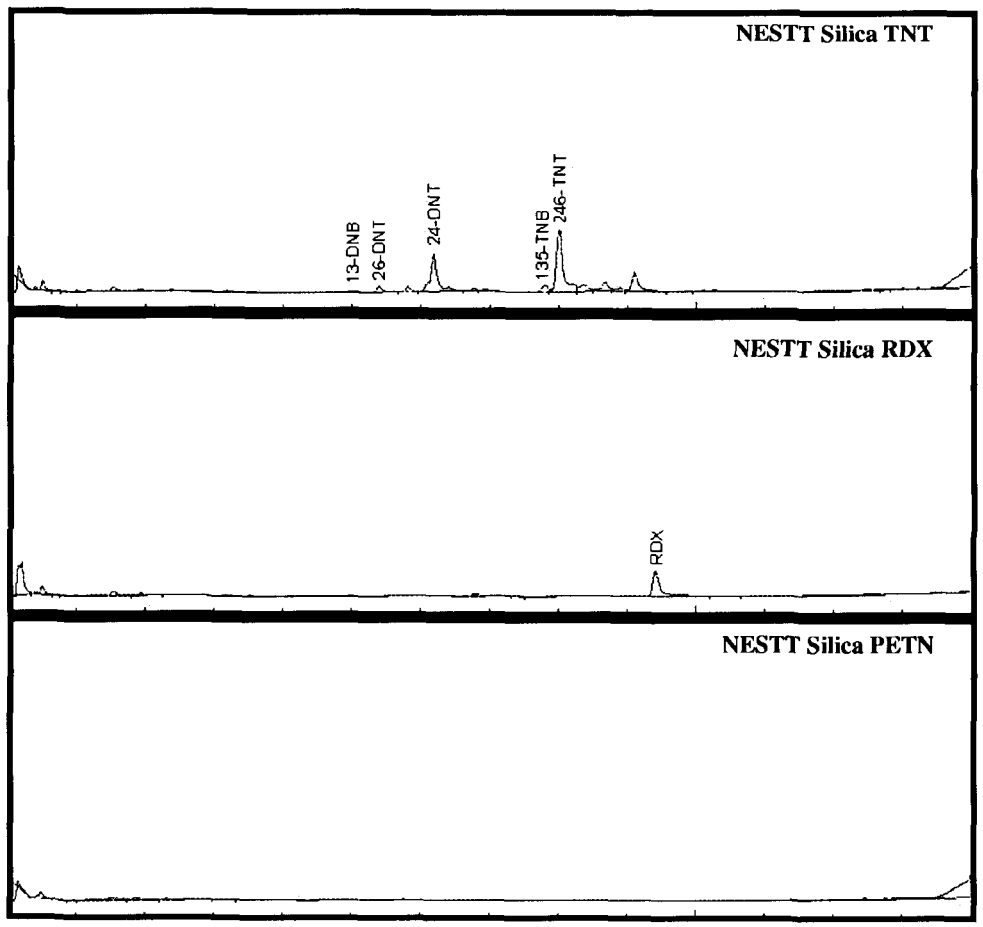
FIG. 40 shows SPME-GC-ECD headspace of NESTT silica training aids.
Figure 41:
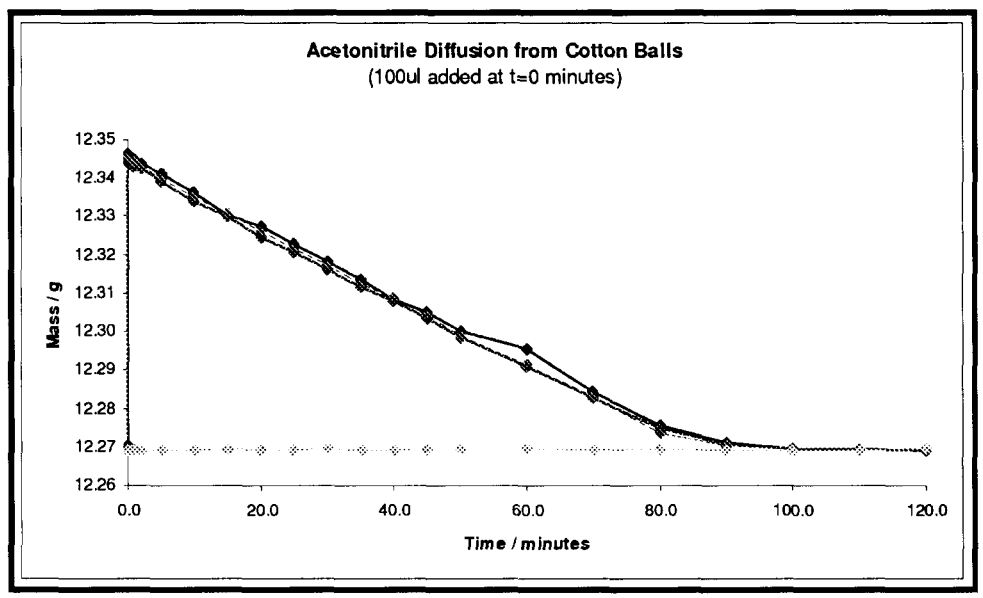
FIG. 41 shows evaporation of Acetonitrile from cotton.
Figure 42:
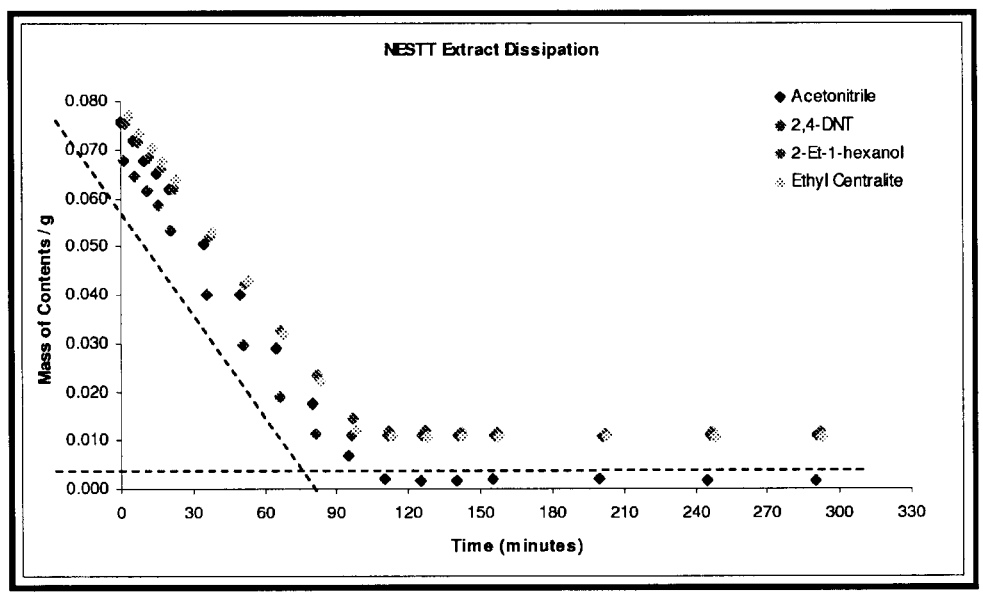
FIG. 42 shows evaporation of Acetonitrile to deliver odor compounds.
Figure 43:
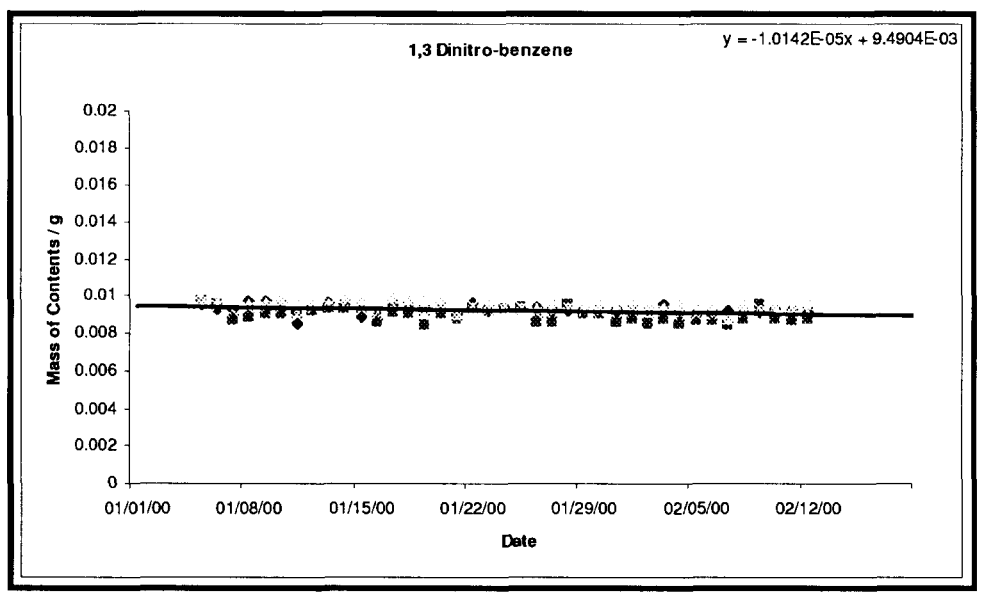
FIG. 43 shows permeation of 1,3-Dinitrobenzene through LDPE.
Figure 44:
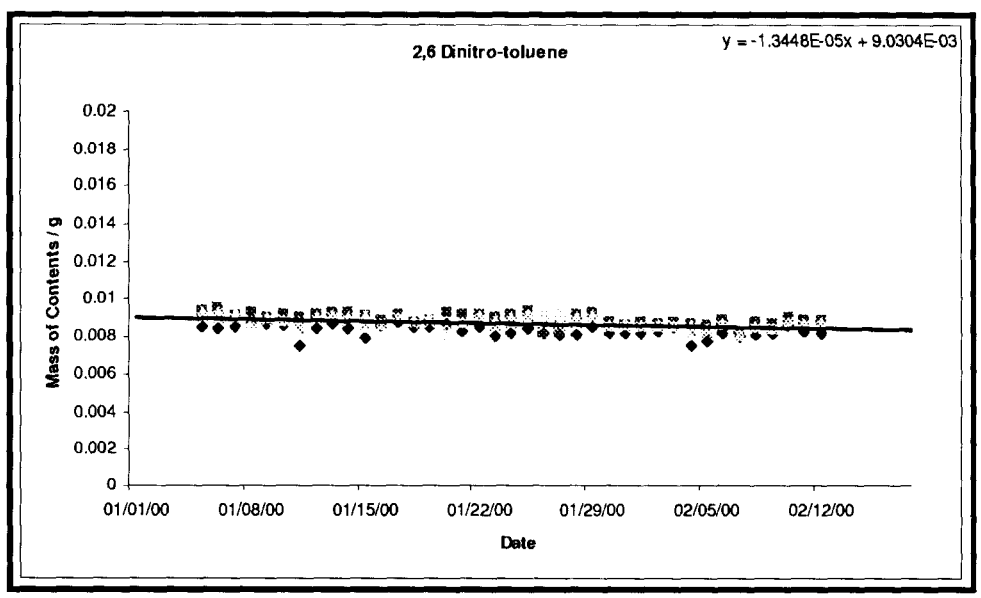
FIG. 44 shows permeation of 2,6-Dinitrotoluene through LDPE.
Figure 45:
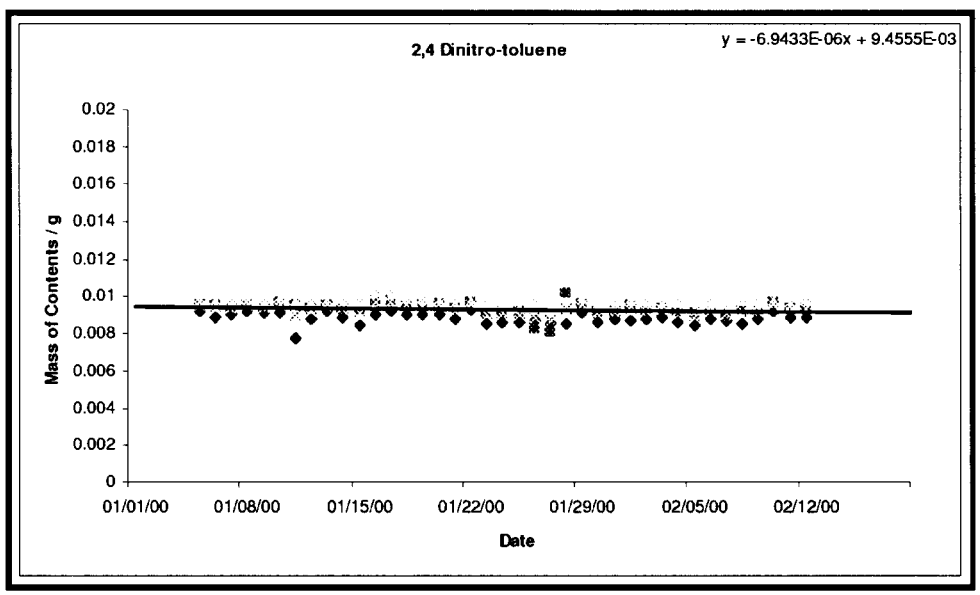
FIG. 45 shows permeation of 2,4-Dinitrotoluene through LDPE.
Figure 46:
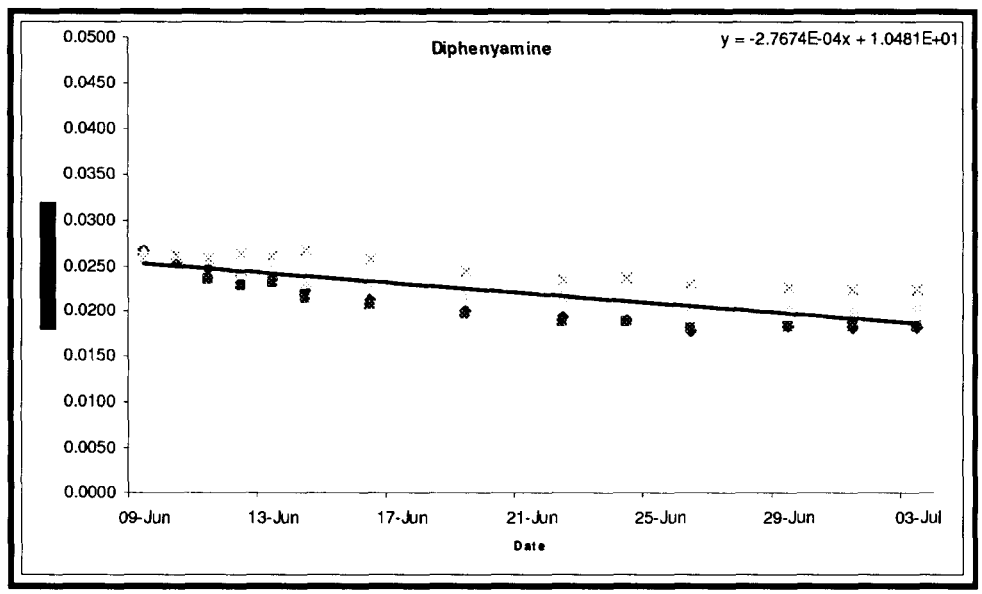
FIG. 46 shows permeation of Diphenylamine through LDPE.
Figure 47:
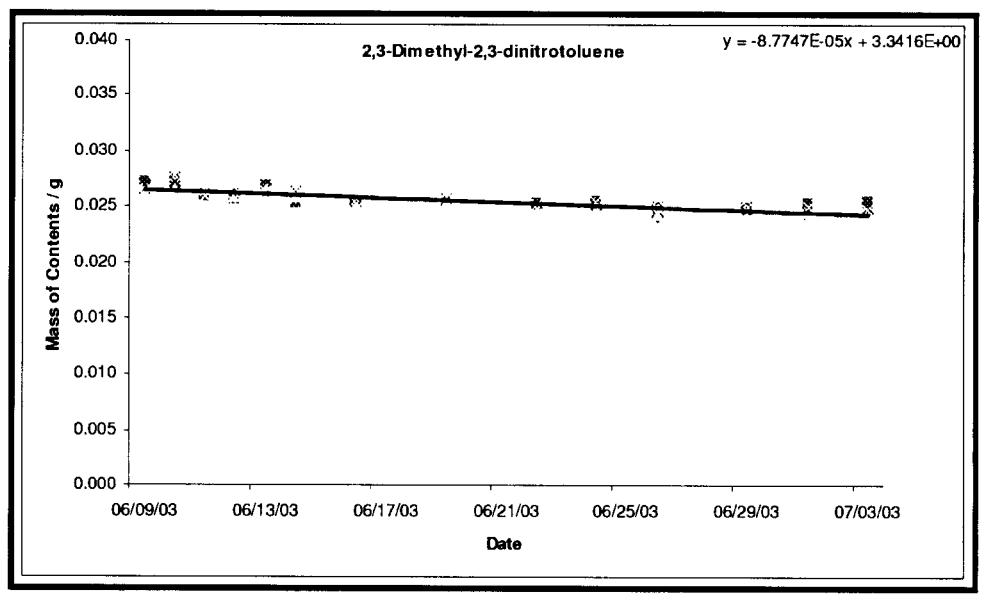
FIG. 47 shows permeation of 2,3-Dimethyl-2,3-dinitrobutane through LDPE.
Figure 48:
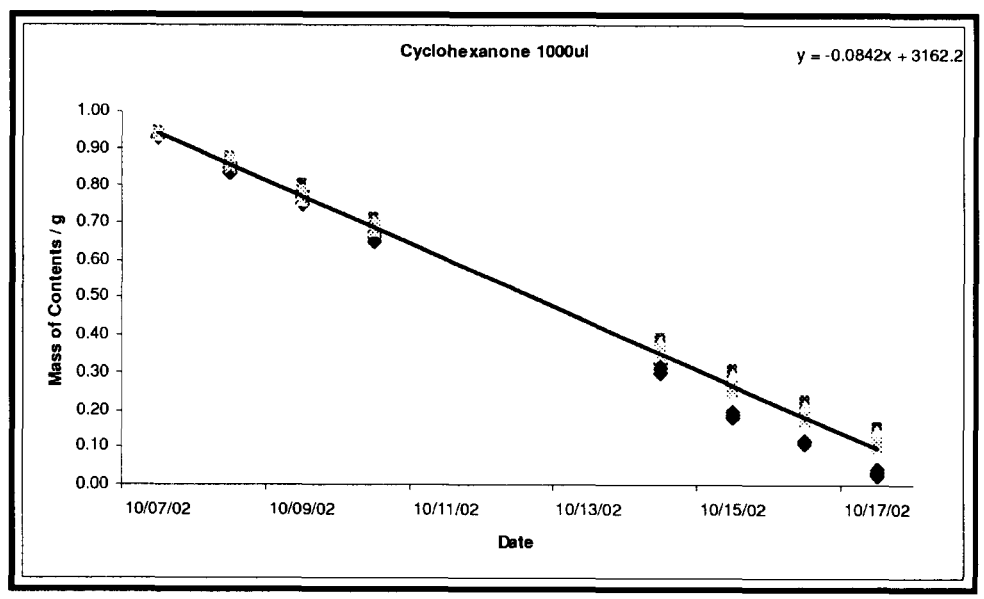
FIG. 48 shows permeation of Cyclohexanone through LDPE.
Figure 49:
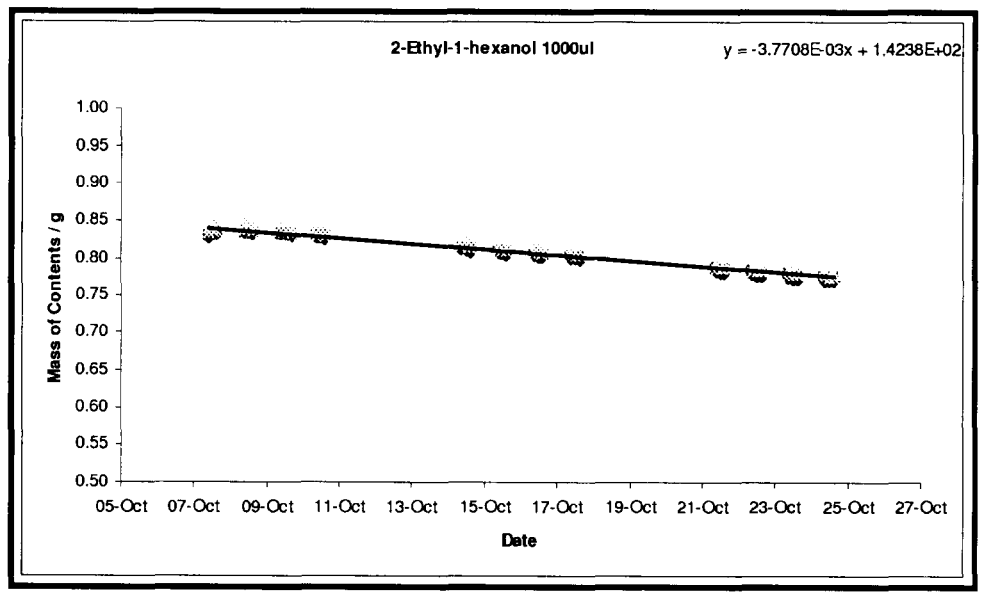
FIG. 49 shows permeation of 2-Ethyl-1-hexanol through LDPE.
Figure 51:
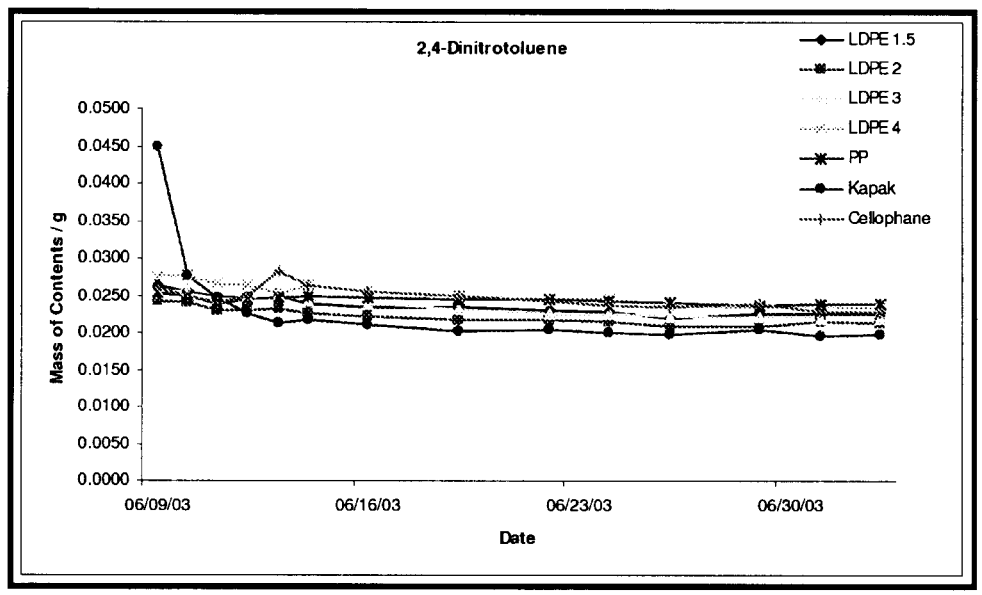
FIG. 51 shows permeation of 2,4-Dinitrotoluene through different plastics.
Figure 52:
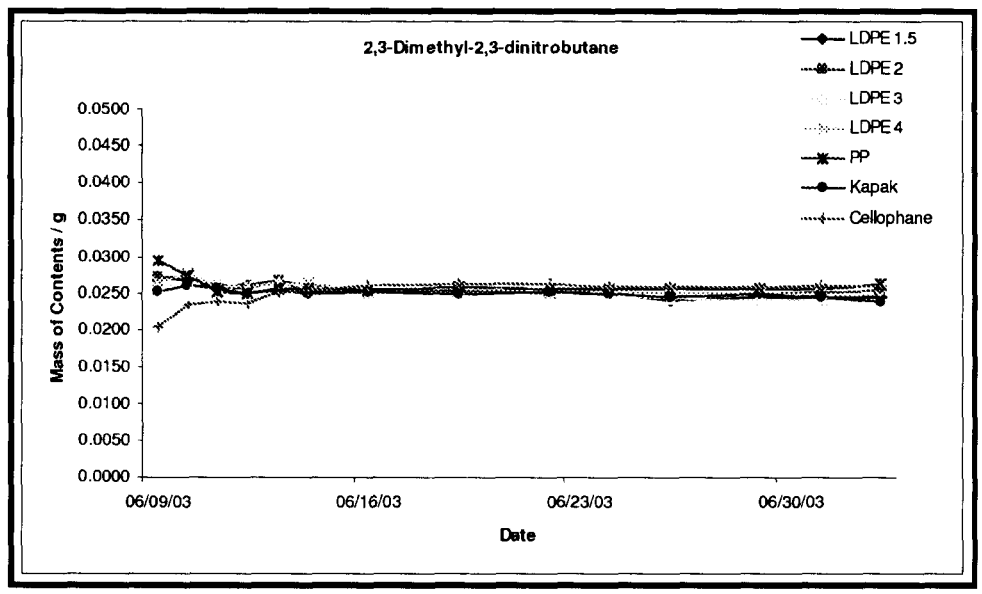
FIG. 52 shows permeation of 2,3-Dimethyl-2,3-dinitrobutane through different plastics.
Figure 53:
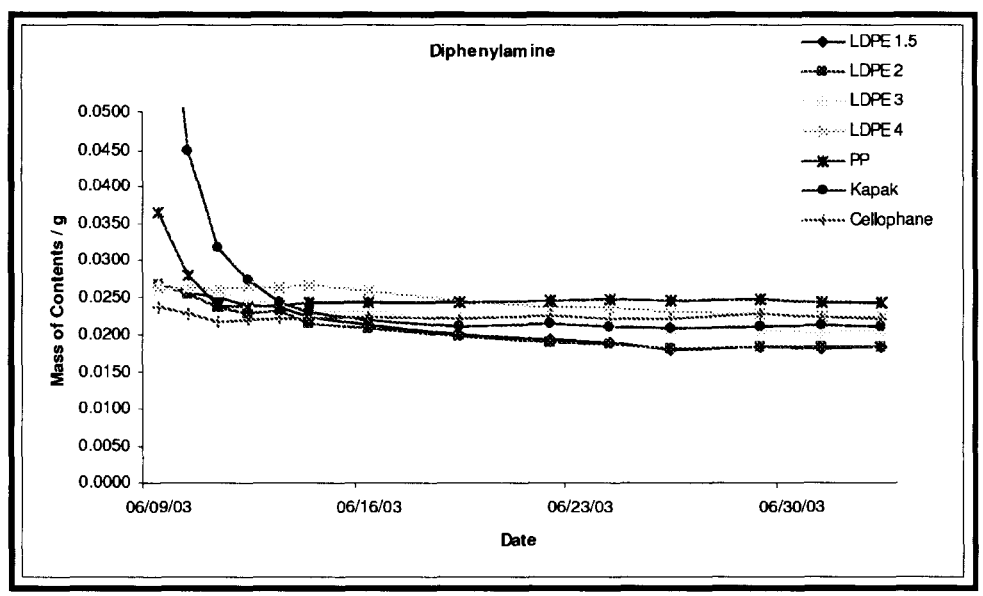
FIG. 53 shows permeation of Diphenylamine through different plastics.
Figure 54:
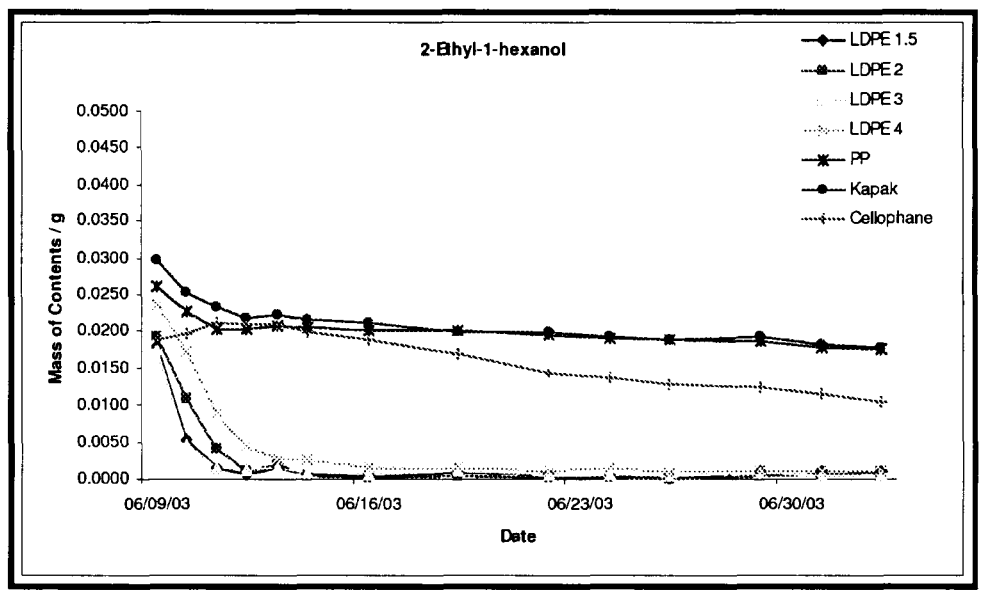
FIG. 54 shows permeation of 2-Ethyl-1-hexanol through different plastics.
Figure 55:
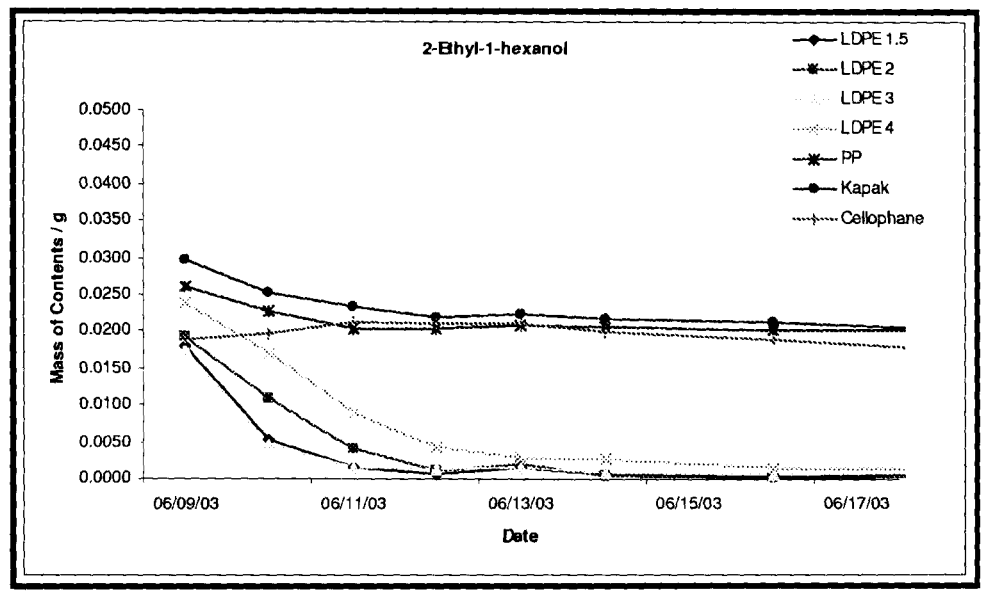
FIG. 55 shows permeation of 2-Ethyl-1-hexanol through different plastics.
Figure 56:
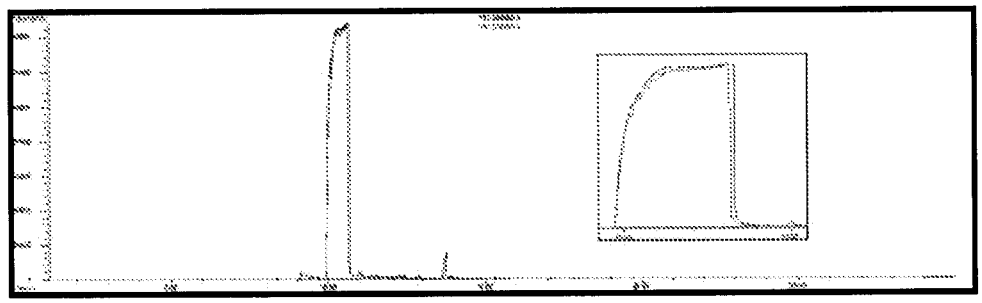
FIG. 56 shows comparative headspace of inner and outer bags in C-4 mimic aid.
Figure 57:
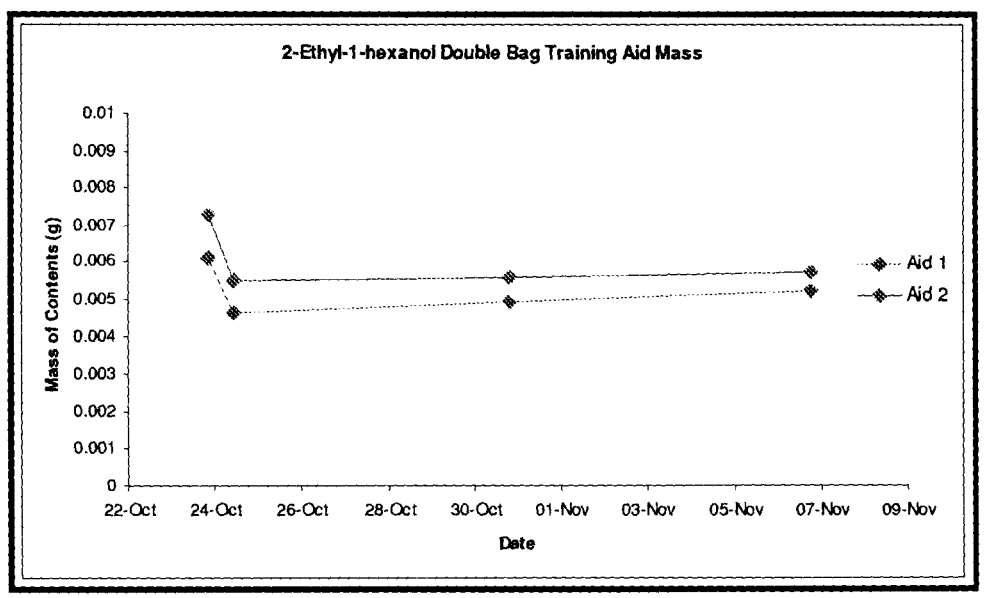
FIG. 57 shows mass observation of C-4 mimic aid.

The SPME-GC-MS method showed a large unresolved complex hydrocarbon mixture for the petrolatum jelly aids in FIG. 34, FIG. 35 and FIG. 36, and only through selected ion monitoring at m/z=210 cold the 2,4,6-trinitrotoluene be detected in the TNT aid. No other parent explosives were detected in the petrolatum aids.

Table 47 gives the SPME-GC-ECD headspace for the same NESTT samples. The hydrocarbon background was not detected by the ECD, and resultantly, 1,3-dinitrobenzene, 2,6-dinitrotoluene and 2,4-dinitrotoluene were also detected in the headspace of the TNT aid. Again, no RDX or PETN were detected using the ECD method in the headspaces of the respective aids.

SPME-GC-MS headspace analysis, shown in Table 48 and Table 49, of the silica based aids gave a similar range of results to the petrolatum based aids. Only the TNT aid contained the target explosive, 2,4,6-trinitrotoluene, in addition to 2,4-dinitrotoluene. Although clear of the petrolatum background, a significant presence of siloxane compounds was present throughout the headspace samples, although it cold not be determined of this was from the silica training aid, the SPME fibre or the column stationary phase. Additionally, 2,4-bis-(1,1-dimethylethyl)-phenol was observed in the blank, RDX and inorganic salt samples.

The SPME-GC-ECD method for the silica aids revealed the presence of 1,3-dinitrobenzene, 2,6-dinitrotoluene and 1,3,5-trinitrobenzene in addition to the nitroaromatics observed in the SPME-GC-MS headspace. Table 50 also shows that the RDX aid did produce a small peak of the parent explosive, although given the vapour pressure of RDX, it is more likely that this was due to dusting of the silica matrix than a true vapour headspace. Table 51 details the headspace components observed for the petrolatum and silica NESTT aids.

TABLE 51

Summary of headspace chemicals for NESTT Training Aids

| | | NESTT Blank | NESTT TNT | NESTT RDX | NESTT PETN | NESTT ClO$_4^-$ | NESTT NO$_3^-$ |
|---|---|---|---|---|---|---|---|
| Petrolatum Based | Unresolved Hydrocarbons | X | X | X | X | X | X |
| | 1,3-Dinitrobenzene | | X | | | | |
| | 2,6-Dinitrotoluene | | X | | | | |
| | 2,4-Dinitrotoluene | | X | | | | |
| | 2,4,6-Trinitrotoluene | | X | | | | |
| Silica Based | Silica/Siloxanes | X | X | X | X | X | X |
| | 2,4-bis-(1,1-dimethylethyl)-phenol | X | | X | | X | X |
| | 1,3-Dinitrobenzene | | X | | | | |
| | 2,6-Dinitrotoluene | | X | | | | |
| | 2,4-Dinitrotoluene | | X | | | | |
| | 1,3,5-Trinitrobenzene | | X | | | | |
| | 2,4,6-Trinitrotoluene | | X | | | | |
| | RDX | | | X | | | |

Active Odor Determination

The common odor chemicals observed in the SPME-GC headspace analysis of the high, low and pseudo explosives were presented individually, and combined, to previously trained and certified explosives detection canines. The hypothesis that stands is; should a trained and certified explosives detection canine alert to a sample, believing that sample to be an explosive, then the chemical contained in that sample (with the required controls in place) may be considered an active explosive odor. A sample to which the canine does not alert may be considered an inactive odor, but it should be noted that an inactive odor might still have the potential to enhance an active odor's potency.

Active Odor
canine alerts to a container containing only one chemical odor believing there to be an explosive present Inactive Odor
chemicals to which the canines show no interest
may still have the potential to enhance the odor signature when combined with active odors A canine "alert" is defined as a change in behaviour of the canine, recognised by the handler. For most explosives detection canines, this indicated by the dog sitting or lying down by the hide. A "non-alert" is when the canine is seen to sniff but walk away of his/her own accord to search another item. A canine "interest" fills the gap between alert and non alert, and is defined by the canines investigating but not alerting, such that the handler has to pull the dog off the item being searched, after dog has had sufficient time to alert/walk away.

High Explosives 2,4,6-Trinitrotoluene

Table 53 lists a field experiment comparing 100 ug of 2,4,6-trinitrotoluene with 100 ug of 1:1 (i.e. 2×50 ug) 2,4-dinitrotoluene+2,4,6-trinitrotoluene and also 100 ug of 1:1:1 (3×33.3 ug) 1,3-dinitrobenzene+2,4-dinitrotoluene+2,4,6-trinitrotoluene. The pure 2,4,6-TNT reported 5/12 alerts, versus 2/12 for the binary mixture and 4/5 for the tertiary mixture. Unlike 2,4-dinitrotoluene which observed an increase in alert responses when combined with another nitrotoluene, the 2,4,6-trinitrotoluene observed a decline. When factoring in the interest responses however, all mixtures reported higher overall canine response than the individual components.

Interestingly, 100 ug of pure TNT received fewer positive responses that 100 ug of commercial TNT, suggesting that a contaminant in the commercial product increased the ease of detection. A later study using 5.0 mg of 2,4,6-trinitrotoluene reported 0/9 alerts (Table 54).

2,4-Dinitrotoluene 2,4-Dinitrotoluene, observed in TNT and Cast Explosives in addition to most smokeless powders, was tested at levels from 10.0 mg to 1.25 g. Response to the odor chemical was varied across all concentrations, however better results were generally observed at the higher concentrations. 100 ug of 2,4-dinitrotoluene was presented in the comparative study in Table 53 with other nitroaromatics, reporting only 1/11 alerts but 5/11 interests. A 5.0 mg sample was offered in a following study but reported 0/9 alerts in a generally poor field test.

2,4-Dinitrotoluene was also tested with the low explosive odors, and 1.0 g was presented to several canines, reported in Table 64, which surprisingly also reported no positive responses. At the time of the field testing, the canines in question were known to be training regularly with an alleged TNT aid, which did not have the usual characteristic odor, which raises concern regarding the canines' capability towards TNT explosive at the time of the field work.

Later testing with 1.25 g of 2,4-dinitrotoluene reported 7/10 alerts and 2/10 interests, described in Table 91 during mimic aid testing, discussed supra under Explosive mimic Aids.

Other Nitroaromatics

Other nitroaromatics tested included 2-nitrotoluene and 1,3-dinitrobenzene, the former observed in some smokeless powders in addition to its use as a tagging agent, and the latter observed in some cast explosive products.

2-Nitrotoluene was tested against the range of nitroaromatics in the field trial presented in Table 54, where 1/8 dogs alerted and 2/8 showed interest towards 2-nitrotoluene, in preference over 1,3-dinitrobenzene, 2,4-dinitrotoluene and 2,4,6-trinitrotoluene during the same test. In later studies, 0.5 µl of 2-nitrotoluene elicited 2/10 alerts (Table 58) whilst 25.0 µl was 0/12 alerts and only 1/12 interests reported.

1,3-Dinitrobenzene was presented individually and in combination with 2,4-dinitrotoluene and 2,4,6-trinitrotoluene, presented in Table 53. 100 ug of 1,3-dinitrobenzene reported 3/11 alerts and 1/11 interests, and whilst in a 1:1:1 combination with 2,4-dinitrotoluene and 2,4,6-trinitrotoluene, reported 4/11 alerts and 4/11 interests. A similar combination of 2,4-dinitrotoluene and 2,4,6-trinitrotoluene without the 1,3-dinitrobenzene, reported 2/11 alerts and 6/11 interests. A later study of 1,3-dinitrobenzene reported 0/9 responses to 5.0 mg (Table 54).

2-Ethyl-1-hexanol

2-Ethyl-1-hexanol, present in the headspace of 5/8 plasticized explosives, in addition to occasional smokeless powders, was tested on several occasions. Most success was observed at delivery levels of 5.0 mg which received 8/9 alerts and 1/9 interest, reported in Table 57. Aids containing 0.5 μl 10.0 μl and 25.0 μl were also tested with 2/10, 7/10 and 2/12 alerts respectively, and 0/2, 3/10, and 5/12 interest responses given in Table 58, Table 59 and Table 60. Clearly delivery levels around 5.0 mg/10.0 μl elicit the best response from the canines, receiving an alert or interest from every canine.

The 0.5 μl aid appeared to be below the level of detection for most canines; whereas the 25 μl aid may have resulted in saturation of the odor, making it difficult for the canines to trace the aid to source. A detection level study was also performed for 2-ethyl-1-hexanol, and whilst most dogs alerted to 1-10 mg of 2-ethyl-1-hexanol, one dog did give an alert to 10 ng of the odor compound, seen in Table 61.

Cyclohexanone

Present often only in fresh C-4, cyclohexanone was presented to the canines in various quantities. An early field test in Table 52, presented 1.0 g sealed inside an LDPE bottle, to which 2/6 canines alerted to and a further 2/6 showed interest. In later studies, significantly lower amounts were presented, sealed within the 2.0 mil LDPE bags. At 0.5 μl there were 0/10 alerts and the same result was observed for 10.0 μl, albeit one canine did give an interest, as indicated in Table 58 and Table 59 respectively. At 25 μl, 1/12 canines alerted and a further 2/12 showed interest in Table 60. A previous study, using canines trained under behavioural laboratory conditions with dilution olfactometry, indicated that cyclohexanone and 2-ethyl-1-hexanol may be odor signature chemicals for C-4 explosive [10].

2,3-Dimethyl-dinitrobutane

The federal tagging agent 2,3-dimethyl-2,3-dinitrobutane was not well received by the majority of the canine population tested. On three separate field trials, there was not one alert to the 2,3-dimethyl-2,3-dinitrobutane source. In two separate tests, 5.0 mg was presented, with 2/11 interest and 0/9 interest reported in Table 55 and Table 57 respectively. On a different day, 100.0 ug was presented to the canines with only 1/7 interests reported in Table 56. Nevertheless, 2,3-dimethyl-2,3dinitrobutane should be included in a training aid selection due to its sole application in the tagging of low vapour pressure explosives.

TABLE 52

Field Testing Results of Odor Compounds

| Hide Content | No Alert | Interest | Alert | % Alert |
|---|---|---|---|---|
| Scratch Box containing 100 μl Acetonitrile on Cotton in LDPE | 106, 112, 113, 114, 115, 116 | — | — | — |
| Scratch Box containing 2-Ethyl-1-hexanol 1.0 g on Cotton in LDPE | 113 | 106 | 112, 114, 115, 116 | 66.7% |
| Scratch Box containing Nitromethane 1.0 g on Cotton in LDPE | 112 | 106, 113, 114 | 115, 116 | 33.3% |
| Scratch Box containing Cyclohexanone 1.0 g on Cotton in LDPE | 114 | 106, 112, 115 | 113, 116 | 33.3% |
| Scratch Box containing NESTT RDX 10.0 g Silica in Tin | — | 114 | 106, 112, 113, 115, 116 | 83.3% |
| Scratch Box containing 100 μl Acetonitrile on Cotton in LDPE | 106, 112, 113, 114, 115, 116 | — | — | — |
| Scratch Box containing 1,3-Dinitrobenzene (100 μl at 1000 ppm Acetonitrile) on Cotton in LDPE | — | 106, 113, 114 | 112, 115, 116 | 50.0% |
| Scratch Box containing 2,4-Dinitrotoluene (100 μl at 1000 ppm Acetonitrile) on Cotton in LDPE | — | 106, 112, 114 | 113, 115, 116 | 50.0% |
| Scratch Box containing 2,4,6-Trinitrotoluene (100 μl at 1000 ppm Acetonitrile) on Cotton in LDPE | 113, 114 | 106, 112 | 115, 116 | 33.3% |
| Scratch Box containing NESTT TNT 10.0 g Silica in Tin | — | — | 106, 112, 113, 114, 115, 116 | 100.0% |

TABLE 53

Field Testing Results of Odor Compounds

| Hide Content | No Alert | Interest | Alert | % Alert |
|---|---|---|---|---|
| Scratch Box containing 100 μl Acetonitrile on Cotton in Open Vial | 101, 102, 103, 104, 105, 106, 107, 108, 109, 110 | — | 111 | 9.1% |
| Scratch Box containing 1,3-Dinitrobenzene (100 μl at 1000 ppm Acetonitrile) on Cotton in Open Vial | 101, 102, 103, 104, 105, 107, 110 | 106 | , 108, 109, 111 | 27.3% |
| Scratch Box containing 2,4-Dinitrotoluene (100 μl at 1000 ppm Acetonitrile) on Cotton in Open Vial | 102, 104, 105, 108, 111 | 101, 103, 106, 109, 110 | 107 | 9.1% |
| Scratch Box containing 2,4,6-Trinitrotoluene (100 μl at 1000 ppm Acetonitrile) on Cotton in Open Vial | 101, 102, 104, 105, 107 | 106 | 103, 108, 109, 110, 111 | 45.4% |
| Scratch Box containing 100 μl Acetonitrile on Cotton in Open Vial | 101, 102, 103, 104, 105, 106, 107, 108, 109, 110 | — | 111 | 9.1% |
| Scratch Box containing 2,4-DNT + 2,4,6-TNT (2 × 50 μl at 1000 ppm Acetonitrile) on Cotton in Open Vial | 101, 109, 111 | 102, 104, 105, 106, 107, 110 | 103, 108 | 18.2% |
| Scratch Box containing 1,3-DNB + 2,4-DNT + 2,4,6-TNT (3 × 33 μl at 1000 ppm Acetonitrile) on Cotton in Open Vial | 109, 110, 111 | 102, 104, 107, 108 | 101, 103, 105, 106 | 36.4% |
| Scratch Box containing 100 μl Acetonitrile on Cotton in Open Vial | 102, 103, 104, 105, 106, 107, 108, 109, 110, 111 | 101 | — | — |
| Scratch Box containing TNT Explosive (100 μl at 1000 ppm Acetonitrile) on Cotton in Open Vial | 102, 104, 108 | 105, 106, 109, 110 | 101, 103, 107, 111 | 36.4% |
| Scratch Box containing NESTT TNT 10.0 g Silica in Tin | 102, 104, 105 | 106 | 101, 103, 107, 108, 109, 110, 111 | 63.6% |

TABLE 54

Field Testing Results of Odor Compounds

| Hide Content | No Alert | Interest | Alert | % Alert |
|---|---|---|---|---|
| Empty Quart Can | 101, 108, 109, 110, 113, 117, 118, 119, 121 | — | — | — |
| Quart Can containing 50 μl Acetonitrile on Cotton | 101, 108, 109, 110, 113, 117, 118, 119, 121 | — | — | — |
| Empty Quart Can | 101, 108, 109, 110, 113, 117, 118, 119, 121 | — | — | — |
| Quart Can containing 2-Nitrotoluene (50 μl at 10% w/v Acetonitrile) onCotton | 109, 110, 117, 118, 121 | 101, 108, 119 | 113 | 11.1% |
| Empty Quart Can | 101, 108, 109, 110, 113, 117, 118, 119, 121 | — | — | — |
| Quart Can containing 1,3-Dinitrobenzene (50 μl at 10% w/v Acetonitrile) on Cotton | 101, 108, 109, 110, 113, 117, 118, 119, 121 | — | — | — |
| Empty Quart Can | 101, 108, 109, 110, 113, 117, 118, 119, 121 | — | — | — |
| Quart Can containing 2,4-Dinitrotuluene (50 μl at 10% w/v Acetonitrile) on Cotton | 101, 108, 109, 110, 113, 117, 118, 119, 121 | — | — | — |
| Empty Quart Can | 101, 108, 109, 110, 113, 117, 118, 119, 121 | — | — | — |
| Quart Can containing 2,4,6-Trinitrotoluene (50 μl at 10% w/v Acetonitrile) on Cotton | 101, 108, 109, 110, 113, 117, 118, 119, 121 | — | — | — |
| Empty Quart Can | 101, 108, 109, 110, 113, 117, 118, 119, 121 | — | — | — |

TABLE 55

Field Testing Results of Odor Compounds

| Hide Content | No Alert | Interest | Alert | % Alert |
|---|---|---|---|---|
| Electrical Box containing 50 μl Acetonitrile on Cotton in open Vial | 103, 108, 109, 111, 116, 118, 119, 121, 124, 126, 127 | — | — | — |

TABLE 55-continued

Field Testing Results of Odor Compounds

| Hide Content | No Alert | Interest | Alert | % Alert |
|---|---|---|---|---|
| Electrical Box containing Ethyl Centralite (50 µl at 10% w/v Acetonitrile) on Cotton in Open Vial | 103, 108, 109, 111, 116, 118, 119, 121, 124, 126, 127 | — | — | — |
| Empty Electrical Box | 103, 108, 109, 111, 116, 118, 119, 121, 124, 126, 127 | — | — | — |
| Electrical Box containing 2,3-Dimethyldinitrobutane (50 µl at 10% w/v Acetonitrile) on Cotton in Open Vial | 103, 108, 109, 111, 116, 118, 119, 126, 127 | 121, 124 | — | — |
| Empty Electrical Box | 103, 108, 109, 111, 116, 118, 119, 121, 124, 126, 127 | — | — | — |
| Electrical Box containing 4.0 g PETN Plastic Explosive (no 2-ethyl-1-hexanol in headspace) | 103, 108, 109, 111, 118, 119, 124, 127 | 121 | 116, 126 | 18.2% |

TABLE 56

Field Testing Results of Odor Compounds

| Hide Content | No Alert | Interest | Alert | % Alert |
|---|---|---|---|---|
| Empty Quart Can | 102, 104, 108, 109, 113, 116, 119 | — | — | — |
| Quart Can containing 100 µl Acetonitrile on Cotton in Open Vial | 102, 104, 108, 109, 113, 116, 119 | — | — | — |
| Quart Can containing Cotton in Open Vial | 102, 104, 108, 109, 113, 116, 119 | — | — | — |
| Quart Can containing Diphenylamine (100 µl at 1000 ppm Acetonitrile) on Cotton in Open Vial | 104, 109, 113, 116, 119 | 108 | 102, | 14.3% |
| Empty Quart Can | 102, 104, 108, 109, 113, 116, 119 | — | — | — |
| Empty Quart Can | 104, 108, 109, 113, 116, 119 | — | 102, | 14.3% |
| Quart Can containing 2,3-Dimethyl-2,3-dinitrobutanee (100 µl at 1000 ppm Acetonitrile) on Cotton in Open Vial | 104, 108, 109, 113, 116, 119 | 102, | — | — |
| Empty Quart Can | 102, 104, 108, 109, 113, 116, 119 | — | — | — |
| Empty Quart Can | 102, 104, 108, 109, 113, 116, 119 | — | — | — |
| Quart Can containing C-4 Explosive 0.25 g in Open Vial | 104, | — | 102, 108, 109, 113, 116, 119 | 85.7% |

TABLE 57

Field Testing Results of Odor Compounds

| Hide Content | No Alert | Interest | Alert | % Alert |
|---|---|---|---|---|
| Empty Quart Can | 101, 103, 106, 110, 113, 116, 117, 118, 119 | — | — | — |
| Quart Can containing 50 µl Acetonitrile on Cotton in Open Vial | 101, 103, 106, 110, 113, 116, 117, 118, 119 | — | — | — |
| Quart Can containing Cotton in Open Vial | 101, 103, 106, 110, 113, 116, 117, 118, 119 | — | — | — |
| Quart Can containing Diphenylamine (50 µl at 10% w/v Acetonitrile) on Cotton in Open Vial | 101, 103, 106, 110, 113, 116, 117, 118 | 119 | — | — |

TABLE 57-continued

Field Testing Results of Odor Compounds

| Hide Content | No Alert | Interest | Alert | % Alert |
|---|---|---|---|---|
| Empty Quart Can | 101, 103, 106, 110, 113, 116, 117, 118, 119 | — | — | — |
| Quart Can containing 2-Ethyl-1-hexanol (50 μl at 10% w/v Acetonitrile) on Cotton in Open Vial | — | 117 | 110, 101, 103, 116, 106, 113, 119, 118 | 88.9% |
| Empty Quart Can | 101, 103, 106, 110, 113, 116, 117, 118, 119 | — | — | — |
| Quart Can containing 2,3-Dimethyldinitrobutane (50 μl at 10% w/v Acetonitrile) on Cotton in Open Vial | 101, 103, 106, 110, 113, 116, 117, 118, 119 | — | — | — |
| Empty Quart Can | 101, 103, 106, 110, 113, 116, 117, 118, 119 | — | — | — |
| Quart Can containing TNT Aid | — | — | 110, 101, 103, 116, 106, 113, 119, 117, 118 | 100.0% |

TABLE 58

Field Testing Results of Odor Compounds

| Hide Content | No Alert | Interest | Alert | % Alert |
|---|---|---|---|---|
| Electrical Box containing Cotton in 2.0 mil LDPE | 103, 108, 109, 111, 113, 115, 116, 119, 126, 128 | — | — | — |
| Electrical Box containing Cyclohexanone 0.5 μl on Cotton in 2.0 mil LDPE | 103, 108, 109, 111, 113, 115, 116, 119, 126, 128 | — | — | — |
| Empty Electrical Box | 103, 108, 109, 111, 113, 115, 116, 119, 126, 128 | — | — | — |
| Electrical Box containing 2-Ethyl-1hexanol 0.5 μl on Cotton in 2.0 mil LDPE | 108, 111, 113, 115, 116, 119, 126, 128 | — | 103, 109 | 20.0% |
| Empty Electrical Box | 103, 108, 109, 111, 113, 115, 116, 119, 126, 128 | — | — | — |
| Electrical Box containing 2-Nitrotoluene 0.5 μl on Cotton in 2.0 mil LDPE | 108, 111, 113, 115, 116, 119, 126, 128 | — | 103, 109 | 20.0% |

TABLE 59

Field Testing Results of Odor Compounds

| Hide Content | No Alert | Interest | Alert | % Alert |
|---|---|---|---|---|
| Electrical Box containing Gauze in 2 mil LDPE | 108, 109, 110, 112, 113, 115, 116, 119, 127, 132 | — | — | — |
| Electrical Box containing Cyclohexanone (10 μl) on Gauze in 2 mil LDPE | 108, 109, 110, 112, 113, 116, 119, 127, 132 | 115 | — | — |
| Empty Electrical Box | 108, 109, 110, 112, 113, 115, 116, 119, 127, 132 | — | — | — |
| Electrical Box containing 2-Ethyl-1-hexanol (10 μl) on Gauze in 2 mil LDPE | — | 108, 109, 127 | 110, 112, 113, 115, 116, 119, 132 | 70.0% |

TABLE 60

| Field Testing Results of Odor Compounds | | | | |
|---|---|---|---|---|
| Hide Content | No Alert | Interest | Alert | % Alert |
| Electrical Box containing Cotton in 2.0 mil LDPE | 106, 107, 109, 113, 116, 118, 119, 124, 125, 126, 127, 129 | — | — | — |
| Electrical Box containing Cyclohexanone 25 μl on Cotton in 2.0 mil LDPE | 107, 109, 113, 118, 124, 125, 127 | 116, 119, 126, 129 | 106, | 8.3% |
| Empty Electrical Box | 106, 107, 109, 113, 116, 118, 119, 124, 125, 126, 127, 129 | — | — | — |
| Electrical Box containing 2-Ethyl-1hexanol 25 μl on Cotton in 2.0 mil LDPE | 107, 124, 125, 126, 129 | 109, 113, 116, 118, 127 | 106, 119, | 16.6% |
| Empty Electrical Box | 106, 107, 109, 113, 116, 118, 119, 124, 125, 126, 127, 129 | — | — | — |
| Electrical Box containing 2-Nitrotoluene 25 μl on Cotton in 2.0 mil LDPE | 106, 107, 109, 113, 118, 119, 124, 125, 126, 127, 129 | 116 | — | — |

TABLE 61

| Field Testing Results of Odor Compounds | | | | |
|---|---|---|---|---|
| Hide Content | No Alert | Interest | Alert | % Alert |
| Electrical Box containing 100 μl Acetonitrile On Cotton | 101, 103, 106, 108, 109, 111, 116, 117, 123, 124, 125, 126, 127, 128, 129 | — | — | — |
| Empty Electrical Box | 101, 103, 106, 108, 109, 111, 116, 117, 123, 124, 125, 126, 127, 128, 129 | — | — | — |
| Electrical Box containing 100 pg 2-Ethyl-1-hexanol (100 μl at 1 ppb Acetonitrile) on Cotton | 101, 103, 106, 108, 109, 111, 116, 117, 123, 124, 125, 126, 127, 128, 129 | — | — | — |
| Electrical Box containing 1 ng 2-Ethyl-1-hexanol (100 μl at 10 ppb Acetonitrile) on Cotton | 101, 103, 106, 108, 109, 111, 116, 117, 123, 124, 125, 126, 127, 128, 129 | — | — | — |
| Electrical Box containing 10 ng 2-Ethyl-1-hexanol (100 μl at 100 ppb Acetonitrile) on Cotton | 101, 106, 108, 109, 111, 116, 117, 123, 124, 125, 126, 127, 128, 129 | — | 103 | 6.7% |
| Electrical Box containing 100 ng 2-Ethyl-1-hexanol (100 μl at 1 ppm Acetonitrile) on Cotton | 101, 106, 108, 109, 111, 116, 117, 123, 124, 125, 126, 127, 128, 129 | — | 103 | 6.7% |
| Electrical Box containing 1 ug 2-Ethyl-1-hexanol (100 μl at 10 ppm Acetonitrile) on Cotton | 101, 106, 108, 109, 111, 116, 117, 123, 124, 125, 126, 127, 128, 129 | — | 103 | 6.7% |
| Electrical Box containing 10 ug 2-Ethyl-1-hexanol (100 μl at 100 ppm Acetonitrile) on Cotton | 101, 106, 108, 109, 111, 116, 117, 123, 124, 125, 126, 127, 128, 129 | — | 103 | 6.7% |
| Electrical Box containing 100 ug 2-Ethyl-1-hexanol (100 μl at 1000 ppm Acetonitrile) on Cotton | 101, 106, 108, 109, 111, 116, 123, 124, 125, 126, 127, 128, 129 | — | 103, 117 | 13.3% |
| Electrical Box containing 1 mg 2-Ethyl-1-hexanol (100 μl at 10,000 ppm Acetonitrile) on Cotton | 101, 106, 108, 109, 111, 116, 123, 124, 125, 126, 127, 128, 129 | — | 103, 117 | 13.3% |
| Electrical Box containing 10 mg 2-Ethyl-1-hexanol (100 μl at 100,000 ppm Acetonitrile) on Cotton | 101, 109, 111, 116, 123, 124, 125 | 108, 127, 128 | 103, 106, 117, 126, 129 | 33.3% |

Smokeless Powders

Whilst it is a common low explosive odor, 2,4-dinitrotoluene was tested previously for the high explosives, and thus there was little benefit of testing it again by itself for the low explosives. Trinitroglycerin, diphenylamine, ethyl centralite and 2-nitrodiphenylamine were chosen for the activity testing based upon the headspace chemistries observed previously in Smokeless Powders.

Trinitroglycerin

The canines were presented with a package of heart medication that contained trinitroglycerin. A bottle of 25×0.4 mg tablets was opened and presented to the canines as an additional item during the field trial in Table 63. 3/12 canines alerted and 3/12 gave an interested response to the medication that contained a total mass of 10.0 mg trinitroglycerin.

Diphenylamine

As the most common low explosive odor, diphenylamine was included in some of the early "screening" field trials alongside the high explosives. The first trial used 100 ug of diphenylamine in Table 56, which warranted 1/7 alerts and 1/7 further interests. Increasing the sample size to 5.0 mg in Table 57 did not support a detection level theory, as the canines' responses dropped to 1/9 interests. Following review of manufacturer's safety data sheets, diphenylamine and 2,4-dinitrotoluene were combined in a 1:5 w/w ratio to mimic Hodgdon brand single based power, but this first mimic produced 0/10 responses, shown in Table 62.

Ethyl Centralite

Ethyl centralite was observed in both single and double based powders. A 5.0 mg sample shown in Table 63 produced a 2/12 alert response and a further 1/12 interest. Previously, an increased the sample size of 10.0 mg in Table 64 did not reflect the success of the subsequent activity determination, with the canines responses at 0/6 alerts. Given that ethyl centralite is present in smokeless powders at ~1-3%, the 1.0 g sample also presented in Table 64 is representative of ~35-100 g of powder explosive, however again there were 0/6 alerts.

2-Diphenylamine

Present only in select double based powders, 2-nitrodiphenylamine is less commonly observed than either diphenylamine or ethyl centralite. In two field tests, presenting 5.0 mg and 10.0 mg of the chemical to the canines; neither test resulted in any response from the canines. It is highly probable therefore, that either (i) 2-dinitrodiphenylamine is too uncommon an odor to be chosen by the canines as an active odor, (ii) there are other more common odors such as 2,4-dinitrotoluene and trinitroglycerin present in most powders that negate the requirement for the canines to 'learn' a new odor, or (iii) the canines used in this study had simply not been trained on any powder brands that contain 2-nitrodiphenylamine.

The wide variability of observed odor chemical signatures for smokeless powders and the variability in the smokeless powders used in the training of the canines tested may preclude the identification of active odor chemical(s) for low explosives.

TABLE 62

Field Testing Results of Odor Compounds

| Hide Content | No Alert | Interest | Alert | % Alert |
|---|---|---|---|---|
| Empty Electrical Box | 108, 109, 110, 113, 116, 117, 118, 119, 121, 122 | — | — | — |
| Electrical Box containing 2,4-DNT + Diphenylamine 0.225 g and 0.045 g solids in Open Vial | 1108, 109, 110, 113, 116, 117, 118, 119, 121, 122 | — | — | — |
| Empty Electrical Box | 1108, 109, 110, 113, 116, 117, 118, 119, 121, 122 | — | — | — |
| Electrical Box containing H4350 Smokeless 3.0 g solid in Open Vial | 1108, 109, 110, 113, 117, 118, 119, 121, 122 | 116 | — | — |

TABLE 63

Field Testing Results of Odor Compounds

| Hide Content | No Alert | Interest | Alert | % Alert |
|---|---|---|---|---|
| Empty Electrical Box | 101, 108, 109, 110, 112, 115, 117, 119, 126, 127, 128, 130 | — | — | — |
| Electrical Box containing 50 μl Acetonitrile on Gauze in 2.0 mil LDPE | 101, 108, 109, 110, 112, 115, 117, 119, 126, 127, 128, 130 | — | — | — |
| Electrical Box containing 2-Nitrodiphenylamine (50 μl at 10% w/v Acetonitrile) on Gauze in 2.0 mil LDPE | 101, 108, 109, 110, 112, 115, 117, 119, 126, 127, 128, 130 | — | — | — |

TABLE 63-continued

Field Testing Results of Odor Compounds

| Hide Content | No Alert | Interest | Alert | % Alert |
|---|---|---|---|---|
| Electrical Box containing Ethyl Centralite (50 μl at 10% w/v Acetonitrile) on Gauze in 2.0 mil LDPE | 101, 109, 110, 115, 119, 126, 127, 128, 130 | 108 | 117, 112 | 16.7% |
| Electrical Box containing Trinitroglycerin Tablets 25 × 0.4 mg in 2.0 mil LDPE | 108, 109, 112, 119, 126, 127 | 117, 101, 115 | 110, 128, 130 | 25.0% |

TABLE 64

Field Testing Results of Odor Compounds

| Hide Content | No Alert | Interest | Alert | % Alert |
|---|---|---|---|---|
| Electrical Box containing 50 μl Acetonitrile on Cotton | 106, 108, 109, 110, 113, 118 | — | — | — |
| Empty Electrical Box | 106, 108, 109, 110, 113, 118 | — | — | — |
| Electrical Box containing 2-Nitrodiphenylamine (100 μl at 10% w/v Acetonitrile) on Cotton | 106, 108, 109, 110, 113, 118 | — | — | — |
| Empty Electrical Box | 106, 108, 109, 110, 113, 118 | — | — | — |
| Electrical Box containing Ethyl Centralite (100 μl at 10% w/v Acetonitrile) on Cotton | 106, 108, 109, 110, 113, 118 | — | — | — |
| Empty Electrical Box | 106, 108, 109, 110, 113, 118 | — | — | — |
| Electrical Box containing 2,4-Dinitrotoluene (100 μl at 10% w/v Acetonitrile) on Cotton | 106, 108, 109, 113, 118 | 110 | — | — |
| Empty Electrical Box | 106, 108, 109, 110, 113, 118 | — | — | — |
| Electrical Box containing 2,4-Dinitrotoluene 1.0 g Solid | 106, 108, 109, 110, 113, 118 | — | — | — |
| Electrical Box containing Ethyl Centralite 1.0 g Solid | 106, 108, 109, 110, 113, 118 | — | — | — |

NESTT Aid Evaluations

The complete range of NESTT aids (including the blank distracters) were obtained and placed in the same metal hide boxes used in the field trials above. Again, negative controls (the blank distracter) and positive controls (real explosive) were made available separately. The dogs had difficulty in locating the NESTT aids in several separate tests.

Silica NESTT

In early field work, the NESTT Silica TNT and RDX aids had been used as positive controls during TNT and plasticised explosive odor chemical studies, and so whilst they were run blind to the canines, the dog handlers did know the contents. In the true double blind studies that followed, listed in Table 65, no canines alerted to any of the NESTT aids, although one individual did show interest in the Nitrate and RDX aids.

Petrolatum NESTT

With the same population of canines as the silica aid tests above, the petrolatum based aids gave similarly poor results in Table 66 and Table 67, with no positive alerts, and only one interest response towards the distractor and the RDX aid. A different sample set of canines in Table 68 gave a more positive response to the TNT aid (2/4) and the RDX aid (1/4 alert and 1/4 interest), however there were also alerts to the blank distractor (2/4) which negates any meaningful result from the field work.

Effectiveness of NESTT

These results demonstrate a lack of consistency in the results when using NESTT aids and that the mode of delivery may play an important role in the available odor of these aids. The results are not surprising, however, when comparing the odor signatures seen for the NESTT aids and live explosive samples. For example, the C-4 samples tested showed 2-ethyl-1-hexanol as the dominant odor chemical while the only chemical seen in the NEST RDX aid was RDX and only in the headspace of the silica aid. It is possible that canines trained to alert to the NESTT aid may also locate the C-4 samples containing RDX, using a different odor chemical which is present in a significantly lower quantity, and may have limited availability depending on the packaging of the explosive.

TABLE 65

Field Testing Results of NESTT Aids

| Hide Content | No Alert | Interest | Alert | % Alert |
|---|---|---|---|---|
| Quart Can containing NESTT Distractor 5 g Silica in Open Vial | 101, 103, 108, 109, 112, 113, 116, 117, 118, 119 | — | — | — |
| Empty Quart Can | 101, 103, 108, 109, 112, 113, 116, 117, 118, 119 | — | — | — |
| Quart Can containing NESTT Chlorate 5 g Silica in Open Vial | 101, 103, 108, 109, 112, 113, 116, 117, 118, 119 | — | — | — |
| Quart Can containing NESTT Nitrate 5 g Silica in Open Vial | 101, 103, 108, 109, 112, 113, 116, 117, 118, 119 | 116 | — | — |
| Empty Quart Can | 101, 103, 108, 109, 112, 113, 116, 117, 118, 119 | 116 | — | — |
| Quart Can containing ½ lb Deta Sheet | — | — | 101, 103, 108, 109, 112, 113, 116, 117, 118,, 119 | 100% |
| Empty Quart Can | 101, 103, 108, 109, 112, 113, 116, 117, 118, 119 | — | — | — |
| Quart Can containing NESTT PETN 5 g Silica in Open Vial | 101, 103, 108, 109, 112, 113, 116, 117, 118, 119 | — | — | — |
| Empty Quart Can | 101, 103, 108, 109, 112, 113, 116, 117, 118, 119 | — | — | — |

TABLE 65-continued

Field Testing Results of NESTT Aids

| Hide Content | No Alert | Interest | Alert | % Alert |
|---|---|---|---|---|
| Quart Can containing NESTT RDX 5 g Silica in Open Vial | 101, 103, 108, 109, 112, 113, 117, 118,, 119 | 116 | — | — |
| Empty Quart Can | 101, 103, 108, 109, 112, 113, 116, 117, 118, 119 | — | — | — |
| Quart Can containing NESTT TNT 5 g Silica in Open Vial | 101, 103, 108, 109, 112, 113, 116, 117, 118, 119 | — | — | — |

TABLE 66

Field Testing Results of NESTT Aids

| Hide Content | No Alert | Interest | Alert | % Alert |
|---|---|---|---|---|
| Quart Can containing NESTT Distractor 3 g Petrolatum Jelly in Open Vial | 101, 102, 103, 106, 109, 108, 110, 111, 112, 113, 116, 117 | — | — | — |
| Empty Quart Can | 101, 102, 103, 106, 109, 108, 110, 111, 112, 113, 116, 117 | — | — | — |
| Quart Can containing NESTT Chlorate 3 g Petrolatum Jelly in Open Vial | 101, 102, 103, 106, 109, 108, 110, 111, 112, 113, 116, 117 | — | — | — |
| Quart Can containing NESTT Nitrate 3 g Petrolatum Jelly in Open Vial | 101, 102, 103, 106, 109, 108, 110, 111, 112, 113, 116, 117 | — | — | — |
| Empty Quart Can | 101, 102, 103, 106, 109, 108, 110, 111, 112, 113, 116, 117 | — | — | — |
| Quart Can containing NESTT PETN 3 g Petrolatum Jelly in Open Vial | 101, 102, 103, 106, 109, 108, 110, 111, 112, 113, 116, 117 | — | — | — |
| Quart Can containing NESTT RDX 3 g Petrolatum Jelly in Open Vial | 101, 102, 103, 106, 109, 108, 110, 111, 113, 116, 117 | 112 | — | — |
| Quart Can containing NESTT TNT 3 g Petrolatum Jelly in Open Vial | 101, 102, 103, 106, 109, 108, 110, 111, 112, 113, 116, 117 | — | — | — |
| Empty Quart Can | 101, 102, 103, 106, 109, 108, 110, 111, 112, 113, 116, 117 | — | — | — |
| Quart Can containing 3' of 100 grain Det. Cord Aid | — | 102 | 101, 103, 106, 109, 108, 110, 111, 112, 113, 116, 117 | 91.7% |

TABLE 67

Field Testing Results of NESTT Aids

| Hide Content | No Alert | Interest | Alert | % Alert |
|---|---|---|---|---|
| Electrical Box containing NESTT Distractor 20 g Petrolatum Jelly in Open Tin | 109, 110, 113, 115, 116, 118, 127, 128 | 102 | — | — |
| Electrical Box containing NESTT PETN 20 g Petrolatum Jelly in Open Tin | 102, 109, 110, 113, 115, 116, 118, 127, 128 | — | — | — |
| Empty Electrical Box | 102, 109, 110, 113, 115, 116, 118, 127, 128 | — | — | — |
| Electrical Box containing NESTT RDX 20 g Petrolatum Jelly in Open Tin | 102, 109, 110, 113, 115, 116, 118, 127, 128 | — | — | — |
| Empty Electrical Box | 102, 109, 110, 113, 115, 116, 118, 127, 128 | — | — | — |
| Electrical Box containing NESTT TNT 20 g Petrolatum Jelly in Open Tin | 102, 109, 110, 113, 115, 116, 118, 127, 128 | — | — | — |

TABLE 68

Field Testing Results of NESTT Aids

| Hide Content | No Alert | Interest | Alert | % Alert |
|---|---|---|---|---|
| Empty Scratch Box | 136, 137, 138, 139 | — | — | — |
| Scratch Box containing NESTT Distractor 20 g Petrolatum Jelly in Open Tin | 137, 139 | — | 136, 138 | 50.0% |
| Scratch Box containing NESTT TNT 20 g Petrolatum Jelly in Open Tin | 137, 139 | — | 136, 138 | 50.0% |
| Scratch Box containing NESTT RDX 20 g Petrolatum Jelly in Open Tin | 138, 139 | 137 | 136 | 25.0% |
| Scratch Box containing NESTT PETN 20 g Petrolatum Jelly in Open Tin | 136, 137, 138, 139 | — | — | — |
| Scratch Box containing Assorted Distractors Rubber hose, tennis ball, kong, PVC pipe and canvas & Ziploc bag | 136, 137, 138, 139 | — | — | — |
| Scratch Box containing C-4 Explosive 454 g solid in LDPE | — | — | 136, 137, 138, 139 | 100% |
| Scratch Box containing Black Powder 454 g powder in can | 137 | — | 136, 138, 139 | 75.0% |

Overall Canine Performance

The benefit of assigning each canine a particular identification number goes beyond providing anonymity to the canines and their handlers. In addition to producing statistical success rates on individual odors, the performance of the individual canines can also be tracked. Data regarding the breed, age and length of service of the canines, in addition to their original training cold also be used to draw hypotheses and conclusions, and to establish trends for further confirmation.

The tables list the canines reference numbers against their responses to the training aids or odor chemicals as a fraction. The numerator lists the total number of alerts or interest, whilst the denominator reports the total number of hides. For example:

A canine has been presented 2,4-dinitrotoluene five times; twice it has alerted, once it has shown interest and twice it gave no alert. Its overall performance is reported as 3/5 or 60.0%.

The decision was made to report an interest as an alert, because an interest is indicative of the canine's uncertainty regarding the odor; an uncertainty in the explosives detection field which is preferable to err on the side of caution. The reflectance of the interest in the field work is to promote further study to determine a clear activity/inactivity resolution.

Real Explosives

The dogs were not regularly assessed on their ability to locate real explosive, given their certifications and current operational status. Additionally, the performance of many of the canines was observed at regular training periods, during which must of the field work was conducted. There were certain times that a real explosive was a formal hide in a field test however, and these are the explosives listed in Table 69.

The overall canine population's performance on both the TNT and Deta-sheet was 100% (10/10 for each) location of the training aid. The ability to locate Detonation Cord was also highly proficient at 83.3% (10/12). The Black Powder response seems low at 75.0% (3/4) but this is the result of only four canines, and should therefore be taken with a pinch of salt.

The C-4/Plastic Explosives result was low at 62.5% (14/23), originally raising serious concerns regarding the usability of the data. However a closer study of the training records not only explains this result but provides further useful observations. The low detection rate is explained by the choice of plastic explosives. The first run used traditional C-4 explosive with a detection rate of 91.7% (11/12), whereas the latter run used a rarer PETN based plastic explosive.

The PETN explosive was chosen because it was uncommon, and the only plastic explosive analysed whose headspace did NOT contain 2-ethyl-1-hexanol. Unsurprisingly given the field data on the activity of 2-ethyl-1-hexanol, the detection rate of the PETN plastic explosive was only 27.3% (3/11). Whilst this raises concern regarding the detection capabilities towards the PETN based plastic explosive, it does support the observed field data that 2-ethyl-1-hexanol plays a significant role in the chemical odor of plasticized explosives.

TABLE 69

Individual Canine Performance on Real Explosives

| Dog Number | TNT | C-4/ Plastic Explosive | Deta Sheet | Black Powder | Detonation Cord | Blank/ Negative |
|---|---|---|---|---|---|---|
| 101 | 2/2 | | 1/1 | | 1/1 | 1/29 |
| 102 | | 1/1 | | | 1/1 | 1/14 |
| 103 | 1/1 | 0/1 | 1/1 | | 1/1 | 0/26 |
| 104 | | 0/1 | | | | 0/10 |
| 105 | | | | | | 0/3 |
| 106 | 1/1 | | | | 1/1 | 0/27 |
| 107 | | | | | | 0/6 |
| 108 | | 1/2 | 1/1 | | 1/1 | 0/46 |
| 109 | | 1/2 | 1/1 | | 1/1 | 0/53 |
| 110 | 1/1 | | | | 1/1 | 0/36 |
| 111 | | 0/1 | | | 1/1 | 2/14 |
| 112 | | | 1/1 | | 1/1 | 0/17 |
| 113 | 1/1 | 1/1 | 1/1 | | 1/1 | 0/48 |
| 114 | | | | | | 0/2 |
| 115 | | | | | | 0/12 |
| 116 | 1/1 | 2/2 | 1/1 | | 0/1 | 0/40 |
| 117 | 1/1 | | 1/1 | | 0/1 | 1/31 |
| 118 | 1/1 | 1/2 | 1/1 | | | 0/43 |
| 119 | 1/1 | 1/2 | 1/1 | | | 0/42 |
| 120 | 2/2 | 1/1 | | | | 20/28 |
| 121 | | 1/1 | | | | 0/13 |
| 122 | | | | | | 0/3 |
| 123 | | | | | | 0/2 |
| 124 | | 0/1 | | | | 0/8 |
| 125 | | | | | | 0/5 |
| 126 | | 1/1 | | | | 0/16 |
| 127 | | 0/1 | | | | 0/17 |
| 128 | | | | | | 0/10 |
| 129 | | | | | | 0/7 |
| 130 | | | | | | 0/5 |
| 131 | | | | | | 0/5 |
| 132 | | | | | | 0/5 |
| 133 | | | | | | 0/2 |
| 134 | | | | | | 0/0 |
| 135 | | | | | | 0/0 |
| 136 | | 1/1 | | | 1/1 | 0/2 |
| 137 | | 1/1 | | | 0/1 | 0/2 |
| 138 | | 1/1 | | | 1/1 | 0/2 |
| 139 | | 1/1 | | | 1/1 | 0/2 |
| 140 | | | | | | 4/6 |

TABLE 69-continued

| | | Individual Canine Performance on Real Explosives | | | | |
|---|---|---|---|---|---|---|
| Dog Number | TNT | C-4/ Plastic Explosive | Deta Sheet | Black Powder | Detonation Cord | Blank/ Negative |
| 141 | | | | | | 4/6 |
| 142 | | | | | | 0/6 |
| 143 | | | | | | 0/4 |
| 144 | | | | | | 0/6 |
| Total | 12/12 | 15/24 | 10/10 | 3/4 | 10/12 | 33/661 |
| | 100% | 62.5% | 100% | 75.0% | 83.3% | 4.99% |
| | | Adjusted Totals removing 120, 140 & 141 | | | | |
| Total | 10/10 | 14/23 | 10/10 | 3/4 | 10/12 | 5/621 |
| | 100% | 60.9% | 100% | 75.0% | 83.3% | 0.81% |

The far right column in each table gives the canines' responses to the blank and negative control containers. A high score here questions the individual canine's ability in the field work, to distinguish explosive odors from background or control odors. Across all canines and all field tests there was a 4.99% (33/661) alert rate to negative or blank containers. This seemed high, but by examining the performance of individual canines, it was highlighted that canines 120, 140 and 141 did not perform satisfactorily.

Canine 120 reported 20/28 false alerts, and canines 140 and 141 both reported 4/6 false alerts. This is tantamount to a 2 in 3 probability of alerting to an empty container or distracting odor. Resultantly, the data from canines 120, 140 and 140 were discounted from the overall statistical data regarding the activity of the odor compounds.

Removing those three canines from the statistics regarding false alerts, it was observed that the overall false alert rate dropped to 0.81% (5/621), a much more acceptable figure. Given the false alert rate of less than 1.00%, there is a strong significance to the overall population's performance on the field testing of odor compound activity.

Explosive Odor Compounds

Table 70 is split into three sections, detailing the odor chemicals detected in TNT & Cast Explosives, Plasticized Explosives and Smokeless Powders.

The canine population responded well to 2-nitrotoluene (21.9%), 1,3-dinitrobenzene (38.5%), 2,4-dinitroltoluene (46.2%) and 2,4,6-trinitrotoluene (50.0%). The alerts to various members of the nitroaromatics family of molecules favoured the di- and tri-nitrotoluenes. From a biological perspective, considering the olfactory system as a target molecule/receptor site mechanism, one may question the difference in molecular shape of dinitrotoluene and trinitrotoluene in the lock and key model. Accordingly, although 2,4,6-trinitrotoluene did exhibit the highest alert/interest result, 2,4-dinitrotoluene was a close second. Its higher volatility and higher commonness amongst explosive products including smokeless powders, and the restricted nature of the parent 2,4,6-trinitrotoluene explosive makes 2,4-dinitrotoluene a viable odor for training aid design.

The odors from plasticized explosives revealed a clear favorite amongst the canines tested for the active odor. There was an excellent response to 2-ethyl-1-hexanol (74.4%), whilst cyclohexanone (27.5%) and 2,3-dimethyl-2,3-dinitrotoluene (12.5%) were less favoured. 2-ethyl-1-hexanol was clearly shown to be the active odor of choice for the majority of the population tested.

Dogs 121-129 had just completed their initial training prior to field testing, imprinted on RDX in place of C-4 explosive, and six were tested on 2-ethyl-1-hexanol immediately after their first exposure to C-4 during training. Of the six dogs tested, 2/6 alerted and 2/6 gave an interest to the 2-ethyl-1-hexanol.

TABLE 70

| | | | | | | | Individual Canine Performance on Odor Chemicals | | | | | |
|---|---|---|---|---|---|---|---|---|---|---|---|---|
| Dog Number | 2- Nitrotoluene | 1,3- Dinitro- benzene | 2,4- Dinitro- toluene | 2,4,6- Trinitro- toluene | Cyclo- hexanone | 2- Ethy-1- hexanol | 2,3- Dimethyl-2,3- dinitrobutane | Diphenyl- amine | 2-Nitro- diphenylamine | Ethyl Centralite | Blank/ Negative |
| 101 | 1/1 | 0/2 | 1/2 | 0/2 | | 1/2 | 0/1 | 0/1 | 0/1 | 0/1 | 1/29 |
| 102 | | 0/1 | 1/1 | 1/1 | | | 1/1 | 1/1 | | | 1/14 |
| 103 | 1/1 | 0/1 | 1/1 | 1/1 | 0/1 | 3/3 | 0/2 | 0/1 | | 0/1 | 0/26 |
| 104 | | 0/1 | 1/1 | 1/1 | | | 0/1 | 0/1 | | | 0/10 |
| 105 | | 0/1 | 1/1 | 1/1 | | | | | | | 0/3 |
| 106 | 0/1 | 2/2 | 2/2 | 2/2 | 2/2 | 4/5 | 0/1 | 0/1 | 0/1 | 0/1 | 0/27 |
| 107 | 0/1 | 0/1 | 1/2 | 0/1 | 0/1 | 0/1 | | | | | 0/6 |
| 108 | 1/2 | 1/2 | 0/3 | 1/2 | 0/2 | 3/4 | 0/2 | 1/1 | 0/2 | 1/3 | 0/46 |
| 109 | 1/4 | 1/2 | 2/5 | 1/2 | 0/3 | 6/7 | 0/4 | 0/1 | 0/4 | 0/5 | 0/53 |
| 110 | 0/1 | 0/2 | 3/5 | 1/2 | 0/1 | 3/3 | 0/1 | 0/1 | 0/2 | 0/2 | 0/36 |
| 111 | 0/1 | 1/1 | 0/1 | 1/1 | 0/1 | 0/2 | 0/1 | | | 0/1 | 2/14 |
| 112 | | 1/1 | 3/3 | 1/1 | 1/3 | 4/4 | 0/1 | | 0/2 | 1/2 | 0/17 |
| 113 | 1/3 | 1/2 | 1/3 | 0/2 | 1/3 | 3/5 | 0/2 | 0/2 | 0/1 | 0/1 | 0/48 |
| 114 | | 1/1 | 1/1 | 0/1 | 0/1 | 1/1 | | | | | 0/2 |
| 115 | 0/1 | 1/1 | 1/1 | 1/1 | 2/3 | 2/3 | | | 0/1 | 0/1 | 0/12 |
| 116 | 1/2 | 1/1 | 1/1 | 1/1 | 2/4 | 6/7 | 0/3 | 0/2 | | 0/1 | 0/40 |
| 117 | 0/1 | 0/1 | 1/3 | 0/1 | | 4/4 | 0/2 | 0/1 | 0/2 | 1/2 | 1/31 |
| 118 | 0/2 | 0/1 | 0/4 | 0/1 | 0/1 | 4/4 | 1/4 | 1/2 | 0/2 | 0/3 | 0/43 |
| 119 | 1/3 | 0/1 | 0/1 | 0/1 | 1/3 | 4/5 | 0/3 | 1/2 | 0/1 | 0/2 | 0/42 |
| 120 | | | 3/4 | | 1/1 | 5/5 | 4/4 | 3/3 | | | 20/28 |

TABLE 70-continued

Individual Canine Performance on Odor Chemicals

| Dog Number | 2-Nitrotoluene | 1,3-Dinitrobenzene | 2,4-Dinitrotoluene | 2,4,6-Trinitrotoluene | Cyclohexanone | 2-Ethy-1-hexanol | 2,3-Dimethyl-2,3-dinitrobutane | Diphenylamine | 2-Nitrodiphenylamine | Ethyl Centralite | Blank/Negative |
|---|---|---|---|---|---|---|---|---|---|---|---|
| 121 | 0/1 | 0/1 | 0/1 | 0/1 | | 1/1 | 1/1 | | | 0/1 | 0/13 |
| 122 | | | | | | 1/1 | | | | | 0/3 |
| 123 | | | | | | 0/1 | | | | | 0/2 |
| 124 | 0/1 | | | | 0/1 | 0/2 | 1/1 | | | 0/1 | 0/8 |
| 125 | 0/1 | | | | 0/1 | 0/2 | | | | | 0/5 |
| 126 | 0/2 | | 1/2 | | 1/2 | 3/4 | 0/2 | | 0/2 | 0/3 | 0/16 |
| 127 | 0/1 | | 0/2 | | 0/2 | 4/4 | 0/2 | | 0/2 | 0/3 | 0/17 |
| 128 | 0/1 | | | | 0/1 | 1/2 | | | 0/1 | 0/1 | 0/10 |
| 129 | 0/1 | | 1/2 | | 1/1 | 3/3 | 0/1 | | 0/1 | 0/1 | 0/7 |
| 130 | | | | | 0/1 | 1/1 | | | 0/1 | 0/1 | 0/5 |
| 131 | | | | | 0/1 | 0/1 | | | 0/1 | 0/1 | 0/5 |
| 132 | | | | | 0/1 | 0/1 | | | 0/1 | 0/1 | 0/5 |
| 133 | | | 0/2 | | | 1/1 | 0/1 | | 0/1 | 0/1 | 0/2 |
| 134 | | | | | | | | | | | 0/0 |
| 135 | | | | | | | | | | | 0/0 |
| 136 | | | | | | | | | | | 0/2 |
| 137 | | | | | | | | | | | 0/2 |
| 138 | | | | | | | | | | | 0/2 |
| 139 | | | | | | | | | | | 0/2 |
| 140 | | | 1/1 | | | 1/1 | 1/1 | 1/1 | 1/1 | 1/1 | 4/6 |
| 141 | | | 1/1 | | | 0/1 | 1/1 | 1/1 | 1/1 | 1/1 | 4/6 |
| 142 | | | 1/1 | | | 0/1 | 1/1 | 1/1 | 0/1 | 1/1 | 0/6 |
| 143 | | | | | | 0/1 | | 1/1 | 0/1 | 1/1 | 0/4 |
| 144 | | | 0/1 | 21/24 | | 1/1 | 0/1 | 1/1 | 0/1 | 1/1 | 0/6 |
| Total | 7/32 | 10/26 | 29/58 | 13/26 | 12/41 | 64/85 | 11/45 | 12/25 | 2/24 | 8/45 | 33/661 |
| | 21.9% | 38.5% | 50.0% | 50.0% | 29.3% | 75.3% | 24.4% | 48.0% | 8.33% | 17.8% | 4.99% |
| Adjusted Totals removing 120, 140 & 141 | | | | | | | | | | | |
| Total | 7/32 | 10/26 | 24/52 | 13/26 | 11/40 | 58/78 | 5/39 | 7/20 | 0/20 | 6/43 | 5/621 |
| | 21.9% | 38.5% | 46.2% | 50.0% | 27.5% | 74.4% | 12.8% | 35.0% | 0.0% | 14.0% | 0.81% |

The role of experience, both of the handler and the canine, can also be shown. Canines 108, 109 and 118 were considered to be three of the most experienced teams. The combined blank negative result for these dogs was 0/142, whilst the 2-ethyl-1-hexanol result was a very promising 13/15 (86.7%).

The few canines that did not respond to the 2-ethyl-1-hexanol did alert to the 2,3-dimethyl-2,3dinitrobutane instead, supporting the hypothesis that different canines may choose different odor chemicals from the same explosive sample. Of course this may also be the result of a training effect, as it was observed that canines 101-133 were training on both tagged and un-tagged explosive, and in the absence of the 2,3-dimethyl-2,3-dinitrobutane tag, and alternative volatile odor may need to be chosen. It was also noted that dogs imprinted on RDX before introduction to Composition 4, showed an increased response to cyclohexanone, which cold be a result of residual traces of the recrystalisation solvent on the RDX tablets used.

The smokeless powder odors were less successful during field testing, than the TNT or plasticized explosives with limited alerts to ethyl centralite (14.0%) and diphenylamine (35.0%) and no positive responses to 2-nitrodiphenylamine (0.0%). Given the variance of headspace compositions observed, as well as the common occurrence of 2,4-dinitrotoluene and trinitroglycerin in many powders, there is a high probability that most of the smokeless powder "odors" may actually be those of high explosives instead. Nevertheless, there are single based powders that do not contain 2,4-dinitrotoluene, which will have an odor signature different to any high explosive, and training aids based upon diphenylamine/ethyl centralite must be considered.

NESTT Training Aids

Table 70 and Table 71 conclude the data from the evaluation of the NESTT training aids, both silica and petrolatum jelly based. The silica NESTT distractor reported 0.00% (0/10) alerts, whilst a 12.0% (3/25) rate was observed for the petrolatum base.

The canines' response to the silica NESTT aids for the TNT, PETN and RDX high explosives was 51.9% (14/27), 43.8% (7/16) and 0.00% (0/10) respectively. The silica TNT aid was the most successfully tested aid, but with a positive response of only 51.9%, this was still a low result for a product which is intended to simulate the odor or explosives for training purposes. The silica RDX aid was similarly successful. The PETN aid did not report any alerts. The silica NESTT aids for the nitrate and chlorate aids were poorly detected, with only 10.0% (1/10) and 0.00% (0/10) reported respectively.

The petrolatum NESTT aids for TNT, RDX, PETN, nitrates and chlorates rated lower than the silica counterparts, at 8.00% (2/25) and 12.0% (3/25) for the TNT and RDX aids respectively, and 0.00% (0/25, 0/12, and 0/12) for the PETN, nitrate and chlorate aids.

Any significance of the alerts to the TNT and RDX aids is lost when the 12.0% alert to the negative control distractor is considered.

TABLE 71

Individual Canine Performance on NESTT Silica Aids

| Dog Number | NESTT S Distractor | NESTT S TNT | NESTT S RDX | NESTT S PETN | NESTT S KNO$_3$ | NESTT S KClO$_4$ | Blank/ Negative |
|---|---|---|---|---|---|---|---|
| 101 | 0/1 | 1/2 | 0/1 | 0/1 | 0/1 | 0/1 | 1/29 |
| 102 |  | 0/1 |  |  |  |  | 1/14 |
| 103 | 0/1 | 1/2 | 0/1 | 0/1 | 0/1 | 0/1 | 0/26 |
| 104 |  | 0/1 |  |  |  |  | 0/10 |
| 105 |  | 0/1 |  |  |  |  | 0/3 |
| 106 |  | 2/2 | 1/1 |  |  |  | 0/27 |
| 107 |  | 1/1 |  |  |  |  | 0/6 |
| 108 | 0/1 | 1/2 | 0/1 | 0/1 | 0/1 | 0/1 | 0/46 |
| 109 | 0/1 | 1/2 | 0/1 | 0/1 | 0/1 | 0/1 | 0/53 |
| 110 |  | 1/1 |  |  |  |  | 0/36 |
| 111 |  | 1/1 |  |  |  |  | 2/14 |
| 112 | 0/1 | 1/2 | 1/2 | 0/1 | 0/1 | 0/1 | 0/17 |
| 113 | 0/1 | 1/2 | 1/2 | 0/1 | 0/1 | 0/1 | 0/48 |
| 114 |  | 1/1 | 1/1 |  |  |  | 0/2 |
| 115 |  | 1/1 | 1/1 |  |  |  | 0/12 |
| 116 | 0/1 | 1/2 | 2/2 | 0/1 | 1/1 | 0/1 | 0/40 |
| 117 | 0/1 | 0/1 | 0/1 | 0/1 | 0/1 | 0/1 | 1/31 |
| 118 | 0/1 | 0/1 | 0/1 | 0/1 | 0/1 | 0/1 | 0/43 |
| 119 | 0/1 | 0/1 | 0/1 | 0/1 | 0/1 | 0/1 | 0/42 |
| 120 | 3/4 | 4/4 | 2/4 | 3/4 |  |  | 20/28 |
| 121 |  |  |  |  |  |  | 0/13 |
| 122 |  |  |  |  |  |  | 0/3 |
| 123 |  |  |  |  |  |  | 0/2 |
| 124 |  |  |  |  |  |  | 0/8 |
| 125 |  |  |  |  |  |  | 0/5 |
| 126 |  |  |  |  |  |  | 0/16 |
| 127 |  |  |  |  |  |  | 0/17 |
| 128 |  |  |  |  |  |  | 0/10 |
| 129 |  |  |  |  |  |  | 0/7 |
| 130 |  |  |  |  |  |  | 0/5 |
| 131 |  |  |  |  |  |  | 0/5 |
| 132 |  |  |  |  |  |  | 0/5 |
| 133 |  |  |  |  |  |  | 0/2 |
| 134 |  |  |  |  |  |  | 0/0 |
| 135 |  |  |  |  |  |  | 0/0 |
| 136 |  |  |  |  |  |  | 0/2 |
| 137 |  |  |  |  |  |  | 0/2 |
| 138 |  |  |  |  |  |  | 0/2 |
| 139 |  |  |  |  |  |  | 0/2 |
| 140 |  |  |  |  |  |  | 4/6 |
| 141 |  |  |  |  |  |  | 4/6 |
| 142 |  |  |  |  |  |  | 0/6 |
| 143 |  |  |  |  |  |  | 0/4 |
| 144 |  |  |  |  |  |  | 0/6 |
| Total | 3/14 | 18/31 | 9/20 | 3/14 | 1/10 | 0/10 | 33/661 |
|  | 21.4% | 58.1% | 45.0% | 21.4% | 10.0% | 0.00% | 4.99% |
| Adjusted Totals removing 120, 140 & 141 | | | | | | | |
| Total | 0/10 | 14/27 | 7/16 | 0/10 | 1/10 | 0/10 | 5/621 |
|  | 0.00% | 51.9% | 43.8% | 0.00% | 10.0% | 0.00% | 0.81% |

Overall the NESTT training aids faired very poorly, with the canines showing real difficulty in locating the explosive pseudo. Unpublished data from the United States Air Force, and the working military dog (WMD) program has confirmed similar results to those reported here, with a significantly low population of canines trained on real explosive, capable of locating the NESTT aids [49]. The WMD program has also trained canines on NESTT and observed poor cross-over performances to the real explosive after the initial imprinting of odors using the NESTT.

TABLE 72

Individual Canine Performance on NESTT Petrolatum Aids

| Dog Number | NESTT P Distractor | NESTT P TNT | NESTT P RDX | NESTT P PETN | NESTT P KNO$_3$ | NESTT P KClO$_4$ | Blank/ Negative |
|---|---|---|---|---|---|---|---|
| 101 | 0/1 | 0/1 | 0/1 | 0/1 | 0/1 | 0/1 | 1/29 |
| 102 | 1/2 | 0/2 | 0/2 | 0/2 | 0/1 | 0/1 | 1/14 |
| 103 | 0/1 | 0/1 | 0/1 | 0/1 | 0/1 | 0/1 | 0/26 |
| 104 |  |  |  |  |  |  | 0/10 |
| 105 |  |  |  |  |  |  | 0/3 |
| 106 | 0/1 | 0/1 | 0/1 | 0/1 | 0/1 | 0/1 | 0/27 |
| 107 |  |  |  |  |  |  | 0/6 |
| 108 | 0/1 | 0/1 | 0/1 | 0/1 | 0/1 | 0/1 | 0/46 |

TABLE 72-continued

Individual Canine Performance on NESTT Petrolatum Aids

| Dog Number | NESTT P Distractor | NESTT P TNT | NESTT P RDX | NESTT P PETN | NESTT P $KNO_3$ | NESTT P $KClO_4$ | Blank/Negative |
|---|---|---|---|---|---|---|---|
| 109 | 0/2 | 0/2 | 0/2 | 0/2 | 0/1 | 0/1 | 0/53 |
| 110 | 0/2 | 0/2 | 0/2 | 0/2 | 0/1 | 0/1 | 0/36 |
| 111 | 0/1 | 0/1 | 0/1 | 0/1 | 0/1 | 0/1 | 2/14 |
| 112 | 0/1 | 0/1 | 1/1 | 0/1 | 0/1 | 0/1 | 0/17 |
| 113 | 0/2 | 0/2 | 0/2 | 0/2 | 0/1 | 0/1 | 0/48 |
| 114 | | | | | | | 0/2 |
| 115 | 0/1 | 0/1 | 0/1 | 0/1 | | | 0/12 |
| 116 | 0/2 | 0/2 | 0/2 | 0/2 | 0/1 | 0/1 | 0/40 |
| 117 | 0/1 | 0/1 | 0/1 | 0/1 | 0/1 | 0/1 | 1/31 |
| 118 | 0/1 | 0/1 | 0/1 | 0/1 | | | 0/43 |
| 119 | | | | | | | 0/42 |
| 120 | | | | | | | 20/28 |
| 121 | | | | | | | 0/13 |
| 122 | | | | | | | 0/3 |
| 123 | | | | | | | 0/2 |
| 124 | | | | | | | 0/8 |
| 125 | | | | | | | 0/5 |
| 126 | | | | | | | 0/16 |
| 127 | 0/1 | 0/1 | 0/1 | 0/1 | | | 0/17 |
| 128 | 0/1 | 0/1 | 0/1 | 0/1 | | | 0/10 |
| 129 | | | | | | | 0/7 |
| 130 | | | | | | | 0/5 |
| 131 | | | | | | | 0/5 |
| 132 | | | | | | | 0/5 |
| 133 | | | | | | | 0/2 |
| 134 | | | | | | | 0/0 |
| 135 | | | | | | | 0/0 |
| 136 | 1/1 | 1/1 | 1/1 | 0/1 | | | 0/2 |
| 137 | 0/1 | 0/1 | 1/1 | 0/1 | | | 0/2 |
| 138 | 1/1 | 1/1 | 0/1 | 0/1 | | | 0/2 |
| 139 | 0/1 | 0/1 | 0/1 | 0/1 | | | 0/2 |
| 140 | | | | | | | 4/6 |
| 141 | | | | | | | 4/6 |
| 142 | | | | | | | 0/6 |
| 143 | | | | | | | 0/4 |
| 144 | | | | | | | 0/6 |
| Total | 3/25 | 2/25 | 3/25 | 0/25 | 0/12 | 0/12 | 33/661 |
|  | 12.0% | 8.00% | 12.0% | 0.00% | 0.00% | 0.00% | 4.99% |
| Adjusted Totals removing 120, 140 & 141 | | | | | | | |
| Total | 3/25 | 2/25 | 3/25 | 0/25 | 0/12 | 0/12 | 5/621 |
|  | 12.0% | 8.00% | 12.0% | 0.00% | 0.00% | 0.00% | 0.81% |

Delivery of Odor, through Permeation/Diffusion

Preparation of Odor Sources

Acetonitrile was chosen as the optimal solvent to use as the delivery medium, based upon its suitability to dissolve every explosive. Given the varying range of explosive chemistries, it is difficult to find one single solvent; however acetonitrile is commonly reported as the best "general purpose" solvent for explosives, and most explosive standards when ordered, come in acetonitrile solution. Acetone may also be used, but as it is a potential headspace component for TATP, and has been reported previously in smokeless powder headspace, it was not used in this study [50].

The volatility of acetonitrile was exploited to deliver precise amounts of odor compound. To permit this application it was first necessary to determine the length of time required to evaporate a known amount of acetonitrile. It was determined that 100 µl was a suitable amount, given that a 100 µl aliquot of a 10% (mass/volume) solution would deliver precisely 10.0 mg of odor compound.

Four pieces of cotton gauze were taken and their mass monitored every 5 minutes over a two hour period. The control gauze, which was left unaltered, was observed to remain at a constant mass, whilst the three pieces which were spiked with 100 µl of acetonitrile showed a steady, liner decline in mass. After 90 minutes, it cold be shown that the mass of the cotton had returned to it original value before the application of acetonitrile, as seen in Table 73. Accordingly it was determined that a 90 minute period should be sufficient to allow the 100 µl aliquot of acetonitrile delivery solvent to evaporate, leaving only the less volatile odor compound behind.

After demonstrating the complete evaporation of 100 µl of acetonitrile within 90 minutes, the next step was to prepare 10.0% w/v solutions of key odor components. 10.0% solutions in 2,4-dinitrotoluene, 2-ethyl-1-hexanol, and ethyl centralite in acetonitrile were prepared, and 100 µl aliquots spiked onto cotton gauze.

2,4-dinitrotoluene was chosen as the expected headspace component of cast explosives. For similar reasons 2-ethyl-1-hexanol was chosen to represent plastic explosives following the successful field identification as a potential odor compound. Ethyl centralite, a common stabiliser for smokeless powders was also chosen.

The masses of the gauze pieces were monitored over time, and plotted in Table 74. It was observed that after 90 minutes, the remaining 0.010 g readings on the cotton were the respective odor compounds, whilst the blank acetonitrile solvent mass continued to reduce back to the baseline.

It was therefore concluded that acetonitrile based delivery of the odor compounds was therefore a potential method to be used to produce training and field work aids based upon the odor chemicals.

Dissipation/Permeation of Odor Compounds
Low Density Polyethylene

To protect the odor source (cotton gauze) from excessive contamination, it is preferable to have it sealed within some form of container. Given the inertness, impermeability and fragile nature of glass, a plastic or polymer container would most probably prove the most cost effective and efficient. Furthermore, by choosing the polymer chemistry and thickness, delivery of the odor compound may be controlled to a specific rate.

Using the same method of preparation from the evaporation study above, cotton gauze was spiked with 100 µl aliquots of 10% solutions of 1,3-dinitrobenzene, 2,4-dinitrotoluene, and 2,6-dinitrotoluene. At a later date, 250 µl aliquots of the diphenylamine and 2,3-dimethyl-2,3-dinitrobutan solutions were also used to conduct this work for additional odors.

Reproducing the previous procedure for the solvent delivery experiments, the gauze was left to sit for 90 minutes (240 minutes for larger aliquots) to evaporate the acetonitrile solvent to leave only the odor compounds. The gauze was then heat sealed into 2.0 mil Low Density Polyethylene (LDPE) plastic bags and left in open containers.

The masses of all training aids were monitored during the weathering process over a period ranging from two weeks for the more volatile components to six weeks for the less volatile compounds. The gradient of the best fit line gave the permeation rate in g/day, which was converted to pg/s for the aromatic nitrates, and ng/s for the more volatile odor compounds of C-4, due to their increased volatility. The inner container can have permeability for the volatilizable component in a range of 80.36 pg/s to $3.23 \times 10^3$ pg/s, at room temperature.

1,3-dinitrobenzene, chosen as an uncommon component of TNT headspaces, was observed to diffuse through the plastic container at a rate of $1.174 \times 10^2$ pg $s^{-1}$. 2,6-dinitrotoluene was also chosen, present both in certain TNT headspaces, but more commonly in the headspace of smokeless powders, due to its role as a deterrent and plasticizer.

The permeation rate of 2,6-dinitrotoluene was calculated to $1.556 \times 10^2$ pg $s^{-1}$, similar to that of 1,3-dinitrobenzene, somewhat expected due to the similar molecular chemistries and geometries.

2,4-dinitrotoluene is the primary component of TNT headspace, in addition to a significant component of many smokeless powders. The permeation rate of 2,4-dinitrotoluene was observed at $8.036 \times 10^1$ pg $s^{-1}$, slightly less than that of 1,3-dinitrobenzene or 2,6-dinitrotoluene, which may be explained by the para-position of the second nitro group, making the molecule a little larger to pass through the pores of the LDPE container.

Diphenylamine, a common stabiliser for single based smokeless powder, and 2,3-dimethyl-2,3-dinitrobutane, a federally mandated tagging agent for plasticized explosives are an order of magnitude more volatile than the dinitroaromatics, hence the larger sample size chosen for the permeation study.

The diphenylamine was observed to permeate through the LDPE packaging at a rate of $3.23 \times 10^3$ pg $s^{-1}$. The permeation within the sample set was not as uniform as observed for the nitroaromatics, as indicated by the spread of points on Table 78, however after one month the final readings are significantly closer together than halfway through the time period.

2,3-Dimethyl-2,3-dinitrobutane was chosen as a taggant due to its volatility and permeability, in addition to its exclusivity to the given application of tagging explosives. The permeation rate for 2,3-dimethyl-2,3-dinitrobutane was determined to be $1.03 \times 10^3$ pg $s^{-1}$ through the LDPE packaging.

2-ethyl-1-hexanol and cyclohexanone aids were also prepared, however owing to the significantly increased vapour pressure of the volatile compounds; 1000 µl of each was spiked directly onto the gauze with no need for evaporation of the acetonitrile. Again the gauze was sealed within 2.0 mil LDPE plastic bags.

Not surprisingly, the cyclohexanone was seen to evaporate from the LDPE container within a two week period. Cyclohexanone is particularly volatile, and the observed loss at a rapid rate further correlates the observation that cyclohexanone is only observed in the headspace of very fresh C-4 samples.

The cyclohexanone was calculated to permeate through the LDPE at a rate of $9,745 \times 10^2$ ng $s^{-1}$ indicating very little "trapping of the odor" by the plastic membrane.

2-Ethyl-1-hexanol is less volatile than cyclohexanone but still several orders of magnitude more volatile than the 2,3-dimethyl-2,3-dinitrobutane taggant or the dinitroaromatics. Its permeation through the LDPE was determined at $4.36 \times 10^1$ ng $s^{-1}$, falling between the very volatile cyclohexanone and the less volatile 2,3-dimethyl-2,3-dinitrobutane, the two other components of the C-4 headspaces observed.

Table 82 lists the rates of permeation through 2.0 mil LDPE, for the seven odor compounds tested. Note the volatility of the C-4 headspace components in comparison to the TNT headspace components.

Different Polymer Chemistries

The permeation through a selection of alternative polymers was also conducted. Polypropylene (PP), cellophane and aluminized Kapak bags were also obtained in addition to the low density polyethylene. The LDPE bags were available in 1.5, 2.0, 3.0 and 4.0 mil thicknesses. 1 mil is defined as one thousandth of an inch. The polypropylene bags were also available in 2.0 mil thickness. The aluminized Kapak bags feature the proprietary 2.5 mil three-layer polymer chemistry, with an aluminium foil layer sandwiched between other polymers. The Kapak bags are particularly heat and cold resistant, and are more resistant to puncture than traditional plastic bags.

The gauze was then heat sealed inside the assorted polymer bags and their masses collected over a period of 1 month.

250 µl aliquots of the 10% acetonitrile solutions of 2,4-dinitrotoluene, 2,3-dimethyl-dinitrobutane, 2-ethyl-1-hexanol, and diphenylamine were delivered onto gauze and set aside for the acetonitrile to evaporate, to leave a 25.0 mg residue of odor compounds.

Regardless of polymer chemistry, the 2,4-dinitrotoluene was observed to permeate a steady rate. The different thicknesses of the LDPE ranging from 1.5-4.0 mil were observed to have little effect, with no noticeable difference in the rate of loss. The Kapak and Polypropylene bags did appear to have a marginally slower rate of permeation, although the mass was still observed to reduce gradually over time. A similar result was observed for the 2,3-Dimethyl-2,3-dinitrobutane samples, with no discernable difference between the rate of loss from the different polymers.

There was a noticeable difference in the permeation rates for the diphenylamine samples. As expected, the LDPE polymers showed the greatest rate of loss of the odor compound, and furthermore the thinner membranes demonstrated a slightly increased rate over the thicker bags. As previously observed, the polypropylene and Kapak bags were the most stable masses over time, with a reduced permeation rate observed when compared with the LDPE.

As expected, the 2-ethyl-1-hexanol samples exhibited the greatest variance in observed permeation rates. Following from the LDPE study discussed previously, the loss of the 2-ethyl-1-hexanol through the LDPE was swift, although it cold clearly be noted that the thickness of the LDPE packaging had an effect upon the rate of loss. The polypropylene and Kapak produced a much slower rate of escape, whilst the cellophane fell somewhere in the middle between the LDPE bags and the polypropylene and Kapak.

A closer view of the first week of the 2-ethyl-1-hexanol study clearly illustrates the different permeation rates of the various polymer chemistries and thicknesses. 1.5 mil LDPE had a significantly faster rate of loss than 4.0 mil LDPE. The cellophane in comparison shows a gradual loss of mass which continued over the following weeks. Several of the cellophane bags were seen to increase in mass to begin with; believed to be an effect of the humidity of the air resulting in moisture ingression and absorption.

Double Bag Training Aid Design

The Kapak and polypropylene bags did show a very low rate of loss due to permeation. It was proposed that a double bag model should be tested for the explosive mimic aids, utilizing an inner LDPE bag containing the odor source, and a Kapak outer bag with reduced permeability to restrict odor contamination of and from the aid. Kapak was chosen over polypropylene due to its extreme temperature and puncture resistance.

Having successfully identified 2-ethyl-1-hexanol as an active odor for plasticized explosives such as C-4 and Deta-sheet, it was chosen as the odor chemical to research the double bag training aid model.

The 2-ethyl-1-hexanol aids were prepared as in previous experiments, using 100 µl of the 10% solution spiked onto the cotton gauze, which were then set aside for 90 minutes to allow the acetonitrile delivery solvent to evaporate. The gauze was then placed inside the 2.0 mil LDPE bag and heat sealed. That aid was then placed inside the 2.5 mil aluminised Kapak bag, which was again heat sealed.

It was hypothesised that the dual layer would prevent the odor of the training aid inside the bags from escaping, preventing contamination of the aid, or by the aid. Removal of the outer bag would permit permeation through the LDPE to the surrounding environment. After preparation, the 2-ethyl-1-hexanol aids were set aside for 3 weeks, after which the headspaces inside the inner and outer bags were sampled and compared by SPME-GC-MS.

The peak area of the 2-ethyl-1-hexanol peaks are clearly the same for both the inner LDPE (grey line) and outer Kapak (black line) bags, indicative of the permeable nature of the LDPE, allowing the 2-ethyl-1-hexanol concentration to come to equilibrium between both bags.

The mass of the double bag system was also monitored over the period of 3 weeks, and despite a slight mass loss at the beginning, believed to be a result of a little acetonitrile solvent residue, the mass of the total system remained constant, indicating that the outer Kapak bag was capable of containing the volatile odor compound.

The headspace analysis combined with the gravimetric analysis confirms the hypothetical model of the double bag training aid system; the permeable inner LDPE bag that allows the odor compound to diffuse gradually, and the impermeable outer Kapak bag that keeps the odor compound contained, preventing contamination of the aid, or contamination by the aid.

The double bag model was ready for field application. This was tested by preparing two of the above double bags aids, and presenting both to the previously trained explosives detection canines. One aid would remain within the outer aluminised Kapak, hopefully undetected, whilst the inner aid exposed should be easily located by the canines.

TABLE 90

Field Testing of the first Double Bag Training Aid Design

| Hide Content | No Alert | Interest | Alert | % Alert |
|---|---|---|---|---|
| Empty Electrical Box | 108, 109, 110, 113, 116, 117, 118, 119, 121, 122 | — | — | — |
| Electrical Box containing 100 µl Acetonitrile on Gauze in 2.0 mil LDPE | 108, 109, 110, 113, 116, 117, 118, 119, 121, 122 | — | — | — |
| Empty Electrical Box | 108, 109, 110, 113, 116, 117, 118, 119, 121, 122 | — | — | — |
| Electrical Box containing 2-Ethyl-1-hexanol 100 µl at 100.00 ppm on Gauze in 2.5 mil Al Kapak | 108, 109, 110, 113, 117, 118, 119, 121, 122 | — | 116 | 10% |
| Empty Electrical Box | 1108, 109, 110, 113, 116, 117, 118, 119, 121, 122 | — | — | — |
| Electrical Box containing 2-Ethyl-1-hexanol 100 µl at 100.00 ppm on Gauze in 2.0 mil LDPE | — | 110, 118, 122 | 108, 109, 113, 116, 117, 119, 121 | 70% |

The results from the field test of the double bag design were very encouraging. Only one in ten dogs alerted to the 2-ethyl-1-hexanol aid whilst it was still in the aluminised Kapak bag, whereas seven out of ten dogs, alerted to the aid once it was removed from the outer packaging. The three dogs that did not alert to the 2-ethyl-1-hexanol aid did give a good interest without resulting in a positive alert. The double bag design clearly has potential as a training aid mechanism, and the 2-ethyl-1-hexanol aid as presented here is already extremely promising as a C-4 mimic aid.

Explosive Mimic Aids

COMPS Explosive Aids—Silica Model

The NESTT aids use silica to "dilute" pure explosive to 5-8% w/w. In particular the NESTT TNT aid contains 8% 2,4,6-trinitrotoluene on silica. It follows that with 2,4-dinitrotoluene more commonly observed than 2,4,6-trinitrotoluene in the headspace of cast explosive, and additionally in the headspace of several smokeless powder brands, that it would be prudent to choose 2,4-dinitrotoluene as a key odor to develop an aid around. Additionally, the vapour pressure of 2,4-dinitrotoluene is over 35× that of 2,4,6-trinitrotoluene, ensuring a more intense odor from an equivalent concentration.

A concentration of 5% w/w 2,4-dinitrotoluene in silica was chosen, following the example of the NESTT aids. The 5% level is also close to what cold be expected of commercial TNT with an approximate impurity of the reaction precursor, 2,4-dinitrotoluene. The aid was produced in large 500 g batches and measured out into 25 g samples which were bagged and heat sealed in 2.0 mil LDPE. A distractor was produced in similar fashion, without the addition of the 2,4-dinitrotoluene.

Previously Trained Dogs

Previously trained explosive detection canines were presented the COMPS TNT aids in the same manner as the field trials previously discussed. In general there was a good response to the mimic aids, with 7/10 dogs testing giving a positive alert to the aid and a further 1/10 showing interest but without the final alert. The two dogs who did not respond to this TNT aid were straight out of training, but no conclusions may be drawn regarding the effect this may have had on the two dogs, as one of the dogs who alerted was also from the same school. Concerns arose regarding the bulk of the 25 g aids, and the problem of severe dusting if the LDPE bag was punctured.

TABLE 91

Results of the first field test of silica TNT mimic aid

| Hide Content | No Alert | Interest | Alert | % Alert |
|---|---|---|---|---|
| Electrical Box containing COMPS Distractor 25 g silica in 2 mil LDPE | 109, 110, 112, 117, 118, 126, 127, 129, 133, 120 | — | — | 0.0% |
| Electrical Box containing COMPS TNT Aid 5% 2,4-DNT in 25 g of silica in 2 mil LDPE | 127, 133 | 109 | 110, 112, 117, 118, 120, 126, 129 | 70.0% |

Dogs in Training

Following the early success of the TNT aid, a second study was performed to investigate the possibility of training new dogs on the TNT aid, and seeing if they were capable of finding real TNT, i.e. crossing over to the real explosive after imprinting only on the COMPS mimic.

Contact was made with a handler based in the Florida Keys, who as a private trainer welcomed the idea of using non-controlled simulants as the odor source. The trainer was given an extensive supply of the 25 g COMPS TNT aids, in addition to a supply of the 25 g distractors to proof the canines off the silica/LDPE odor.

After 6 weeks of training, the trainer met with the Florida International University Public Safety Canine Unit to determine the ability of the canines to cross over. An item search of 10 boxes was lined up, containing the COMPS distractor and COMPS TNT aid, in addition to an equivalent weight of real TNT.

TABLE 92

Results from initial imprinting on silica TNT mimic aid

| Hide Content | No Alert | Interest | Alert | % Alert |
|---|---|---|---|---|
| Empty Scratch Box | A, B, C, FIU | — | — | — |
| Scratch Box containing Nitrile Gloves Blank | A, B, C, FIU | — | — | — |
| Empty Scratch Box | A, B, C, FIU | — | — | — |
| Scratch Box containing TNT 28 g explosive | B, C | A | FIU | 25.0% |
| Empty Scratch Box | A, B, C, FIU | — | — | — |
| Scratch Box containing COMPS Distractor 25 g silica in 2 mil LDPE in Electrical Box | A, B, C, FIU | — | — | — |
| Empty Scratch Box | A, B, C, FIU | — | — | — |
| Scratch Box containing COMPS TNT Aid 5% 2,4-DNT in 25 g silica in 2 mil LDPE | C | A | B, FIU | 50.0% |
| Empty Scratch Box | A, B, C, FIU | — | — | — |

The results were less than promising, with none of the 3 new dogs trained capable of locating the real TNT, although one dog did give an interest. Furthermore, the three dogs had difficulty in locating the TNT, with only one dog alert to the aid and one other showing an interest. In contrast, the FIU dog located both the COMPS TNT aid and the real TNT with little difficulty.

Subsequently, discussion of this outcome with several other trainers in the South Florida area highlighted the original trainer's inexperience in training detection canines, a fact that was not presented at the time of experimental design. The trainer's area of expertise was in dog training for house pets, and although well read on the subject, his experience in detection canines was little more than 3 months as a handler before retiring from police duty.

It was later determined that the trainer was keen to begin training detection canines and viewed the trial mimic aids as a method of obtaining training aids without the need for ATF. This was deemed a miscommunication between the trainer and the author, rather than an intentional misrepresentation, and no further training on the TNT aids was planned with this trainer.

COMPS Explosive Aids—Cotton Gauze Model

Although the silica model of the TNT aid was successful in early field trials, the biggest complaint and concern was regarding the silica dust. The thin plastic membrane of the 2.0 mil LDPE was relatively weak to puncture, and the heat seal whilst strong enough for modest handling cold not be guaranteed to remain intact if abused or treated roughly. Several of the TNT aids began to dust soon after repeated use, and the potential for contamination through the deposition of the silica, in addition to the health concerns of inhaled silica dust, led to the need for an alternative to the fine silica powder.

Although larger grain silica may have been used, this would have closely resembled the NESTT aids, besides which, success with the cotton gauze as a medium for the odor compounds in the permeation studies suggested the use of the cotton in place of the silica, removing the dust concerns, and making the aids much more compact and cost effective.

Individual Odor Components

Returning to the successful double bag design in the early stages of the mimic aid project, the odor compounds observed in the headspace analyses of the explosives were used to prepare 10 mg aids; the odor compound deposited onto the cotton gauze using the acetonitrile delivery method.

2,4-dinitrtoluene and 2-ethyl-1-hexanol were chosen again due to their success in previous studies. The tagging agent 2,3-dimethyl-2,3-dinitrobutane was also chosen due to its recurrence in plasticized explosives. Smokeless powder odors, ethyl centralite, diphenylamine and 2-nitrodiphenyl amine were chosen for screening through the design process, as an individual odor for smokeless powders had not been determined, and due to the heterogeneity of the headspace analyses, it was unlikely that a single compound would be observed as the active odor.

10% solutions of the six odor compounds were prepared in acetonitrile, and a seventh blank solution of acetonitrile was prepared simultaneous using the same solvent and measurement devices. 100 μl aliquots of the six solutions were delivered onto cotton gauze, and the process repeated 12 times. The blank aids were prepared with 100 μl aliquots of the acetonitrile, to prepare 72 distractors. Each piece of gauze was allowed to weather for the predetermined 90 minutes, before placement inside 2.0 mil LDPE bags and heat sealing. The individual odors were prepared at different times on clean bench paper to prevent any cross contamination.

The aids were intended to be shipped to participating canine agencies throughout the United States, and this was possible because not one of the aids contained a Department of Transport (DOT) controlled explosive substance for delivery purposes. COMPS kits were prepared containing one of each odor compound and six distractors. The individual aids were not labelled for their contents, the field testing being run blind.

TABLE 93

| Cotton Gauze Contents | |
|---|---|
| Distractor Label | Contents |
| A 1 | Distractor/Negative Control |
| A 2 | 10.0 mg 2,4-Dinitrotoluene |
| B 1 | Distractor/Negative Control |
| B 2 | 10.0 mg Ethyl Centralite |
| C 1 | 10.0 mg 2-Ethyl-1-hexanol |
| C 2 | Distractor/Negative Control |
| D 1 | Distractor/Negative Control |
| D 2 | 10.0 mg 2,3-Dimethyl-2,3-dinitrobutane |
| E 1 | 10.0 mg Diphenylamine |
| E 2 | Distractor/Negative Control |
| F 1 | 10.0 mg 2-Nitrodiphenylamine |
| F 2 | Distractor/Negative Control |

Each odor compound was twinned with a distractor and labelled A through F, and 1 or 2. The six distractor/aid combinations were designed to be run during normal weekly training. Complete kits were mailed to the six canine teams funded under the NFSTC project grant, in addition to Florida Highway Patrol and City of Miami Police. The agencies were asked to place and aid combination out during testing and report which of the two aids, if either, their teams alerted too. The results were collected and compiled.

TABLE 94

| Results of the first field test of gauze mimic aids | | | | |
|---|---|---|---|---|
| Hide Content | No Alert | Interest | Alert | % Alert |
| Electrical Box containing Distractor 100 μl Acetonitrile on Gauze in 2 mil LDPE | 109, 110, 112, 117, 118, 126, 127, 129, 133, 144, 142 | | 140, 141 | |
| Electrical Box containing 2,4-Dinitrotoluene (100 μl at 10% w/v Acetonitrile) on Gauze in 2 mil LDPE | 109, 110, 117, 118, 126, 127, 129, 133, 144 | | 112, 140. 141, 142 | |
| Electrical Box containing Distractor 100 μl Acetonitrile on Gauze in 2 mil LDPE | 109, 110, 112, 117, 118, 126, 127, 129, 133, 144, 140, 141, 142, 143 | | | |
| Electrical Box containing Ethyl Centralite (100 μl at 10% w/v Acetonitrile) on Gauze in 2 mil LDPE | 109, 110, 112, 117, 118, 126, 127, 129, 133, | 142 | 140, 141, 143, 144 | |
| Electrical Box containing Distractor 100 μl Acetonitrile on Gauze in 2 mil LDPE x | 109, 110, 112, 117, 118, 126, 127, 129, 133, 144, 141, 142, 143 | 140 | | |
| Electrical Box containing 2-Ethyl-1-hexanol (100 μl at 10% w/v Acetonitrile) on Gauze in 2 mil LDPE | 141, 142, 143 | 109, 126, 129, 133 | 110, 112, 117, 118, 127, 140, 144 | |
| Electrical Box containing Distractor 100 μl Acetonitrile on Gauze in 2 mil LDPE x | 109, 110, 112, 117, 118, 126, 127, 129, 133, 142, 143, 144 | | 140, 141 | |
| Electrical Box containing 2,3-Dimethyl-2,3-dinitrobutane (100 μl at 10% w/v Acetonitrile) on Gauze in 2 mil LDPE | 109, 110, 117, 126, 127, 129, 133, 144 | 112, 118 | 140, 141, 142 | |
| Electrical Box containing Distractor 100 μl Acetonitrile on Gauze in 2 mil LDPE | 109, 110, 112, 117, 118, 126, 127, 129, 133, 142, 143, 144 | | 140, 141 | |
| Electrical Box containing Diphenylamine (100 μl at 10% w/v Acetonitrile) on Gauze in 2 mil LDPE | 109, 110, 112, 117, 118, 126, 127, 129, 133 | 143 | 140, 141, 142, 144 | |

TABLE 94-continued

Results of the first field test of gauze mimic aids

| Hide Content | No Alert | Interest | Alert | % Alert |
|---|---|---|---|---|
| Electrical Box containing Distractor 100 μl Acetonitrile on Gauze in 2 mil LDPE | 109, 110, 112, 117, 118, 126, 127, 129, 133, 142, 143, 144 | | 140, 141 | |
| Electrical Box containing 2-Nitrodiphenylamine (100 μl at 10% w/v Acetonitrile) on Gauze in 2 mil LDPE | 109, 110, 117, 118, 126, 127, 129, 133, 142, 144 | 112 | 140, 141 | |

With the exception of two dogs (140 & 141), the distractors were not detected by the canines. A misunderstanding of the instructions enclosed with the training aids may well account for the positive alerts on the distractors, as both canines were from the same agency. The high frequency off occurrence of the dogs' false alerts to the distractors, means that these two dogs were excluded from the percentages calculated in the table. It is often observed that handlers will try to second guess their canines if they have expectation of a result, which is not duplicated by their canine.

With the exception of the two dogs mentioned above, the results were encouraging and revealing. The 2-ethyl-1-hexanol remained the most successful aid, with a 50% positive response and a 33% interest in the aid. Comparing the 2-ethyl-1-hexanol and the 2,3-dimethyl-2,3-dinitrobutane aids, it is interesting to note that the canines which did not alert to the 2-ethyl-1-hexanol did alert to the 2,3-dimethyl-2,3-dinitrobutane. These two compound represent the two common odors of plasticized explosives, and here it is observed that whilst most dogs choose one of the two odors, there are dogs that choose the other of the two odors. The revised version two of these aids should benefit from combining the two compounds onto a single piece of gauze, making one C-4 mimic containing both odor compounds.

The 2,4-dinitrotoluene aid was not as successful as previously observed, although is probably due to detection level complications. This aid contained only 10.0 mg in contrast to the previous silica design which contained 1.25 g in each aid. Increasing the content of the 2,4-dinitrotoluene aid for version two should prove more effective.

The results for the smokeless powder odor compounds were less successful, however canines from different agencies did give alerts to the ethyl centralite and diphenylamine aids. The next round of aids should try combining the ethyl centralite and diphenylamine into a single aid. The 2-nitrodiphenylamine was not carried forward to the revised aids, do the poor response to the aid in this first round.

Combined/Revised Odor Compounds

Following the results of the first round of testing, the cotton gauze model of the training aids was revised for new odor compounds, presented in Table 95. The amount of 2,4-dinitrotoluene in the TNT simulant was increased from 10 mg to 0.2 g, however there was no response from the seven canines tested. The C-4 mimic combined 0.02 g of 2-ethyl-1-hexanol and 0.1 g of 2,3-dimethyl-2,3-dinitrobutane, however only 2/7 canines gave an interested response. The improved smokeless powder mimic, containing 0.1 g each of ethyl centralite and diphenylamine reported the most promising results, with 1/7 (14.3%) alerts and 3/7 interests. The same response was observed for the positive control; 75 g of Hodgdon Clays (double based) smokeless powder.

TABLE 95

Results of the follow-up testing of assorted gauze mimic aids

| Hide Content | No Alert | Interest | Alert | % Alert |
|---|---|---|---|---|
| Empty Electrical Box | 109, 113, 117, 118, 128, 129, 134 | — | — | — |
| Electrical Box containing 100 μl Acetonitrile on Gauze in 2 mil LDPE | 109, 113, 117, 118, 128, 129, 134 | — | — | — |
| Empty Electrical Box | 109, 113, 117, 118, 128, 129, 134 | — | — | — |
| Electrical Box containing 2,4-Dinitrotoluene 0.2 g on Gauze in 2 mil LDPE | 109, 113, 117, 118, 128, 129, 134 | — | — | — |
| Empty Electrical Box | 109, 113, 117, 118, 128, 129, 134 | — | — | — |
| Electrical Box containing 2-Ethyl-1-hexanol 0.02 g + DMNB 0.1 g on Gauze in 2 mil LDPE | 109, 113, 117, 118, 129 | 128, 134 | — | — |
| Empty Electrical Box | 109, 113, 117, 118, 128, 129, 134 | — | — | — |
| Electrical Box containing Ethyl Centralite 0.1 g + Diphenylamine 0.1 g on Gauze in 2 mil LDPE | 117, 118, 128 | 113, 129, 134 | 109 | 14.3% |
| Empty Electrical Box | 109, 113, 117, 118, 128, 129, 134 | — | — | — |
| Electrical Box containing H Clays Smokeless Powder 75 g powder in 2 mil LDPE | 109, 113, 129 | 118, 128, 134 | 117 | 14.3% |

A further optimisation of the C-4 mimic was conducted, comparing four different versions, as detailed in Table 96. Each mimic contained 10 μl of 2-ethyl-1-hexanol, followed by a possible combination of 10 μl of cyclohexanone and/or 10 μl of 2,3-dimethyl-2,3-dinitrobutane. Given the previous of success of 10 μl 2-ethyl-1hexanol aids, the field test was highly disappointing, with only 1/4 canines showing an interest in the 2-ethyl-1-hexanol aid. No response was observed for the combined odor aids. Alarmingly, no positive responses were observed for the positive control; 75 g of Black Powder.

Given the poor responses of the canines towards the real explosive positive controls, the reduced number of canines now attending the field test, and the distance involved in travelling to each test, it was decided to cease the field testing until the quality of canines used cold be improved or a more convenient source of canines from a local agency cold be accessed.

TABLE 96

Results of the follow-up testing of C-4 mimic aids

| Hide Content | No Alert | Interest | Alert | % Alert |
|---|---|---|---|---|
| Empty Electrical Box | 113, 118, 129, 134 | — | — | — |
| Electrical Box containing 100 µl Acetonitrile on Gauze in 2 mil LDPE | 113, 118, 129, 134 | — | — | — |
| Empty Electrical Box | 113, 118, 129, 134 | — | — | — |
| Electrical Box containing 2-Ethyl 1-hexanol 10 µl on Gauze in 2 mil LDPE | 113, 129, 134 | 118 | — | — |
| Empty Electrical Box | 113, 118, 129, 134 | — | — | — |
| Electrical Box containing 2-Ethyl 1-hexanol 10 µl + Cyclohexanone 10 µl on Gauze in 2 mil LDPE | 113, 118, 129, 134 | — | — | — |
| Empty Electrical Box | 113, 118, 129, 134 | — | — | — |
| Electrical Box containing 2-Ethyl 1-hexanol 10 µl + DMNB 10 µl on Gauze in 2 mil LDPE | 113, 118, 129, 134 | — | — | — |
| Empty Electrical Box | 113, 118, 129, 134 | — | — | — |
| Electrical Box containing 2-Ethyl 1-hexanol 10 µl + DMNB 10 µl + Cyclohexanone 10 µl on Gauze in 2 mil LDPE | 113, 118, 129, 134 | — | — | — |
| Electrical Box containing Goex FFF Black Powder 75 g powder in 2 mil LDPE | 113, 118, 129, 134 | — | — | — |

Scientifically Sound Training & Certification

ATF Recommendations

The Bureau of Alcohol, Tobacco, Firearms & Explosives (ATF) is the United States' federal agency responsible for the control and regulation of all weapons and explosive materials within the US. The ATF has trained over 300 explosive detection canines, providing them both to domestic agencies and international law enforcement too [51]. In the absence of a national, standardised certification program for explosive detection canines, the ATF has proposed the use of their Odor Recognition Proficiency Standard (ORT), which involves 3 lines of 10 one gallon paint cans.

Within each gallon can is a quart sized can which may contain the explosive aid or distracting odor. The ORT involves ten explosive odors, five distracting odors and fifteen blank cans, from which the canines must achieve a 100% correct response on the ten explosive odors, and no more than two incorrect responses on the distractors/blanks.

The ATF has designated which explosives are to comprise the ten chosen for the ORT, as listed in Table 97. There are six mandatory explosives; Black Powder, Dynamite, PETN, RDX, TNT and Double Based Smokeless Powder. The remaining four explosives are chosen from a list of "elective" explosives, which includes; Binary Charges, Black Powder substitutes, Blasting Agents, Cast Boosters, Composition B, Emulsions, Improvised Explosives based around nitrates, chlorates or perchlorates, Photoflash & Pyrotechnics, Plastic Explosives, SEMTEX, Slurries, Single Based Smokeless Powder, Tetryl and Water Gels.

TABLE 97

ATF Recommended Explosive Odors for Recognition Testing

| Mandatory Explosives (must certify on all 6) | Elective Explosives (choose 4 for certification) |
|---|---|
| Black Powder | Binaries |
| Dynamite (EDGN & NG) | Blank Powder Substitutes |
| PETN | Blasting Agents |
| RDX | Cast Booster |
| Smokeless Powder (Double Based) | Composition B |
| TNT | Emulsions |
| | Improvised (chlorates) |
| | Improvised (nitrates) |
| | Improvised (perchlorates) |
| | Improvised (urea nitrate) |
| | Photoflash/Pyrotechnics |
| | Plastic Explosives |
| | SEMTEX |
| | Slurries |
| | Smokeless Powder (Single Based) |
| | Tetryl |
| | Water Gels |

At first glance this seems an extensive if not exhaustive list of explosive products, however, several of the elective explosives are duplicated in name. Many of the elective charges therefore have the likelihood of duplicating each other and/or the mandatory charges, and there is a significant potential for the choice of ten explosives to completely overlook certain explosive combinations.

Most blasting agents are binary in nature, and water gel, emulsion and slurry are three names often used to describe the same explosive product. Similarly cast boosters may include composition B and/or Tetryl. Table 98 lists several different formulations of Cast Primer, notably each one contains TNT, often in addition to other high explosives also on the ATF mandatory list, and thus the use of those cast explosives would only duplicate odors at the expense of others.

TABLE 98

Different Cast Booster Compositions

| Cast Booster/Cast Primer | Contents |
|---|---|
| Amatol | TNT + Ammonium Nitrate |
| Composition B | TNT + RDX |
| Cyclotol | TNT + RDX |
| Pentolite | TNT + PETN |
| Tetratol | TNT + Tetryl |
| Torpex | TNT + RDX + Aluminium |
| Tritonal | TNT + Aluminium |

In response to this, the ATF includes the following statement/disclaimer in their communication [52]; "Some explosives are available in a variety of chemical formulations . . . . It is imperative that the manufacturer's product literature [including MSDS] be reviewed to ensure that the specific explosives content of each test sample used is known."

Resultantly, although the ATF has prescribed the recommended explosive groups, the individual responsibility of choosing the correct explosives to use falls upon the individual agencies, relying upon the knowledge of the master trainer to choose wisely.

Recommendations from this Study

Scientifically, it is more meaningful to give a list of specific explosive products to use, given knowledge of the explosive contents. Table 99 details ten explosive products (shaded) that cover the majority of explosive odors, both individually and in combination. The results of this study suggest that multiple smokeless powders should be included into a complete training regime. Further classification of the single and double-based smokeless powders suggests the rotation of powders from various manufacturers, including Hodgdon, IMR and Vihtavuori Lapua. Additional studies should allow for the grouping of the most important powders to be included in training. Results from this study indicate that single-based Vihtavuori powders should be included in regular training, due to the observation that they have a relatively unique headspace including not containing dinitrotoluene in their headspace.

certification is conducted in line with the Best Practice Procedures developed at the $3^{rd}$ National Detector Dog Conference [53].

The certification requires a result >90% correct responses, with no more than 1 missed hide. There is a minimum requirement of 10 hides. Generally the certification will involve 2-5 vehicles, 2-5 rooms and a luggage line-up of at least 10 items. At least 1 of each of the vehicle and room hides should be blank (negative). Following several field certifications of canine and explosive and narcotic detection teams, the report sheet was updated with regard to several concerns.

TABLE 99

Choosing Which Explosives for Canine Training

| | Nitromethane | DMNB | DNT | TNT | EGDN | NG | PETN | NC | RDX | HMX | Tetryl | Ammonium Nitrate | Potassium Nitrate | Sodium Perchlorate |
|---|---|---|---|---|---|---|---|---|---|---|---|---|---|---|
| Amatol | | | | X | | | | | | | | X | | |
| Black Powder | | | | | | | | | | | | | X | |
| Comp 2 | | X | X | | | | X | X | | | | | | |
| Comp 3 | | X | X | | | | X | X | X | | | | | |
| Comp 4 (untagged) | | | | | | | | | X | | | | | |
| Comp 4 (tagged) | | X | | | | | | | X | | | | | |
| Comp B | | | X | | | | | | X | | | | | |
| Cyclotol | | | X | | | | | | X | | | | | |
| Deta Sheet | | | | | | | | | X | | | | | |
| Det Cord (com) | | | | | | | X | | | | | | | |
| Det Cord (mil) | | | | | | | | | X | | | | | |
| Dynamite (com) | | | | | X | X | | | | | | | | |
| Dynamite (mil) | | | X | | | | | | | | | | | |
| HTA 3 Sheet | | | X | | | | | | | X | | | | |
| Kinepak (liquid) | X | | | | | | | | | | | | | |
| Kinepak (solid) | | | | | | | | | | | | X | | |
| Pentolite | | | X | | | | X | | | | | | | |
| PTX 1 | | | X | | | | | | X | X | | | | |
| Pyrodex | | | | | | | | | | | | | | X |
| Semtex A | | | | | | | X | | | | | | | |
| Semtex H | | | | | | | X | | X | | | | | |
| Smokeless (double) | | | | | | X | | X | | | | | | |
| Smokeless (single) | | | X | | | | | X | | | | | | |
| Tetratol | | | | X | | | | | | | X | | | |

The remaining explosives (non-shaded) may also be included as additional non-essential training material for variability. Although HMX and Tetryl are not included in the ten mandatory explosives suggested, there is no record of those explosives being used in commercial or military products without the presence of TNT or another explosive.

It is not wise to use a combination explosive such as Composition B, in place of two separate target odors such as TNT and RDX. Given that TNT has a vapour pressure three orders of magnitude greater than RDX, it his highly probable that the canine will only imprint upon the TNT, leaving them vulnerable to explosives containing only RDX. In the interests of maintaining accurate and concise scientifically sound records, it is vital to be able not only to record the explosives trained on, but the odor chemicals to which the canines have been presented. It is therefore recommended that initial imprinting and regular training should provide the odors individually, particularly with the less volatile nitramine explosives.

IFRI Canine Certifications

The National Forensic Science Technology Centre (NFSTC)/International Forensic Research Institute (IFRI) certification provides canine agencies with an impartial, scientifically sound certification of the canine handler team. The certification is overseen by two evaluators, one an NFSTC/IFRI approved trainer, the other a scientist from IFRI. The 1. Duplicity of forms for two evaluators
2. Unclear reporting of false positive and false negative alerts
3. Better statistical summary of canine performance
4. Simpler personal data form for handlers A sample of the new form is included in Appendix IV. It allows for only one form to be completed, with space for both evaluators. The personal information is clearer and more self explanatory for the handler to complete. In addition to the Alert and No Alert boxes from previous forms, the addition of a Correct, Yes/No option allows for the explicit reporting of correct positive, correct negative, false positive and false negative results. This in turn allows simple numerical addition of correct and incorrect responses, providing a percentage result for the final pass/fail result. The revised NFSTC/IFRI certification form was further modified, whilst maintaining the same format, as a record sheet for daily maintenance training.

CONCLUSIONS

These results raise concerns regarding the scientific soundness of the choice of explosive samples used in training explosives detection canines. These results indicate that dogs may not need to be trained on as many plasticized explosives as typically employed in canine training programs (some have comparable headspace odor signatures such as those observed for C4, Flex X Deta Sheet and TNT Booster tested in this study). In addition, dogs trained on certain smokeless powders may not need to train on cast explosives such as Tetratol and TNT as they both contain abundant amounts of one of the active odor signature chemicals, 2,4-DNT. Significant odor differences have been observed between smokeless powder brands and types, suggesting that the canines should be trained on multiple smokeless powders. Accordingly, it is the responsibility of the trainer to choose a selection of powders, both double based and single based, from all manufacturers, to ensure the complete ability of the canine to locate all smokeless powders.

Whilst major headspace odor components such as diphenylamine and ethyl centralite in smokeless powders were not identified as individual active odor signature chemicals used by the dogs tested, they can still be useful in the calibration of instrumental techniques to improve detection. Many of the vapour detectors currently used are targeted towards the less volatile parent explosives. Utilising the odor chemicals observed would permit lower detection limits due to the increased volatility of the compounds.

This study has identified several key odor chemicals which illicit positive responses from deployed explosives detection canines with 2,4-dinitrotoluene and 2-ethyl-1-hexanol identified as important odor chemicals for canine detection of cast and polymer based explosives respectively. These results support the hypothesis that most dogs use the most abundant chemicals available in the headspace to locate concealed explosives. For example, the detector dogs tested alerted to 2-ethyl-1-hexanol found in the headspace of the plasticized explosives and explosive mimics tested but not the RDX observed in the headspace of the silica based RDX NESTT aid. The results also suggest that dogs may use single dominant odor chemicals as a primary mechanism with the dogs tested alerting to 2-ethyl-1-hexanol but not to the added marker DMNB although it was present in the majority of the canine training aids tested. These results also suggest that training dogs on the pure marker chemical DMNB and other single chemicals in low quantities may be advantageous in enhancing their performance.

Reliable non-hazardous training aids are needed for use in areas where live explosive aids are not practical and to provide more consistency in the odor chemicals released in training and in order to improve canine detection performance. In the present studies, NESTT aids yielded inconsistent results with the deployed bomb dogs tested in this double-blind study, with most dogs not alerting to these materials under field operational conditions. These results also show that NESTT aids have potentially undesirable matrix effects with a large hydrocarbon background observed for the petrolatum based aids and dusting with the silica based aids.

Further Work

Additional field testing with commercially available pseudo scents and NESTT aids should continue attempting to expand the number of teams and different agencies involved in the study. Preliminary field tests with explosive odor mimics (EOM) which provide controlled polymer permeation of active odor chemicals are promising with consistent alerts observed for target chemicals tested including 2-ethyl-1hexanol. Continued study into refining the explosive odor mimics would prove highly beneficial prior to development of a commercial training product.

The next stage in development of these EOM training aids should involve the initial imprinting of the canines using these aids containing individual odor chemicals as well as combinations. This should be followed with testing with real explosives to determine the degree of generalisation/crossover exhibited by the canines and the magnitude of individual versus multiple odor chemicals used by canines to locate explosives. Moreover, training on low-volatility parent explosives such as purified RDX followed by threshold testing with actual explosive materials should be compared to the results observed for the high volatility headspace chemicals such as 2-ethyl-1-hexanol.

It would also be beneficial to imprint the canines on a selection of smokeless powders, chosen to mimic high explosives. The use of Hodgdon 4350 and Hodgdon Clays cold provide suitable mimics for TNT and Dynamites respectively. Again, subsequent testing with real explosive materials should provide meaningful insight into odor generalisation of training aids. Additionally, a more comprehensive screening of commercially available smokeless powders should be conducted with each placed into the optimal number of groupings to provide guidance for trainers to select the optimum number and brands of smokeless powder training aids.

REFERENCES

1 *Collins English Dictionary*, 2003, $6^{th}$ edition, Harper Collins, Glasgow UK.
2 J. Yinon & S. Zitrin, *Modern Methods and Applications in Analysis of Explosives*, John Wiley & Sons, Chichister UK, 1993.
3 R M Heramb and B R McCord, *Forensic Science Communications*, 2002, Vol 4, No 2.
4 *Containing the Threat from Illegal Bombings: An Integrated National Strategy for Marking, Tagging, Rendering Inert, and Licensing Explosives and Their Precursors*, National Academy Press, Washington, D.C., 384 pages, 6x9, 1998.
5 http://www.iasl.mcgill.ca/airlaw/public/aviation_security/montreal1991.pdf accessed on Mar. 10, 2005.
6 J. Akhavan, *The Chemistry of Explosives*, Royal Society of Chemistry, Cambridge, UK, 1998.
7 Y. Barnberger et al, *Proceedings of the Third Symposium on Analysis and Detection of Explosives*, 1989, Berghausen Germany.
8 A. D. Beveridge, *Forensic Science Review*, 1992, 4(17) pp 18.
9 T. Tamiri & S. Zitrin, *Journal of Energetic Materials*, 1986, 4 pp 215.
10 M. Williams et al, *Proceedings of SPIE*, 1998, 3575 pp 291.
11 S. Zitrin, *Journal of Energetic Materials*, 1986, 4 pp 199.
12 J. M. F. Douse, *Journal of Chromatography*, 1982, 234 pp 415.
13 S. A. Peak, *Journal of Forensic Science*, 1980, 25 pp 679.
14 B, Glattstein & S. Kraus, *Journal of Energetic Materials*, 1986, 4 pp 149.
15 S. Zitrin et al, *Proceedings of the $1^{st}$ International Symposium on the Analysis and Detection of Explosives (ISADE)*, 1983, Washington D.C., USA.
16 K, Yeager & M. Hall, *The Detonator*, 2005, 32(2) pp 60-63.
17 William P. Schaefer et al, *Journal of the American Chemical Society*, 1985, 107, pp 2461-63.
18 Dennis J Reutter et al, *Proceedings of the International Symposium on the Analysis and Detection of Explosives*, 1983, pp 149-58, Quantico, Va.

19 Schuel Zitrin et al, *Proceedings of International Symposium on the Analysis and Detection of Explosives,* 1983, pp 137-41 Quantico Va.
20 Ron Mistafa, *K9 Explosive Detection,* 1998, Detselig Enterprises, Canada.
21 Jehuda Yinon, *Modern methods and applications in analysis of explosives,* 1993, Wiley, New York.
22 http://www.animalhealthcare.ca/kidscontent.asp?id=6 accessed on May 9, 2005.
23 Settles & Kester, *Proceedings of SPIE,* 2001, 4394, paper 108.
24 D. S. Moore, *Review of Scientific Instruments,* 2004, 75(8) pp 2499.
25 K. G. Furton, R. J. Harper, J. M. Perr and J. R. Almirall, *Optimization of biological and instrumental detection of explosives and ignitable liquid residues including canines*, SPME/ITMS and GC/MS", in Sensors and Command, Control, Communications and Intelligence Technologies for Homeland Defense and Law Enforcement, Edward M. Carapezza, Editor, Proc. SPIE, 2003, 183-192.
26 N. Lorenzo, T. Wan, R. J. Harper, Y.-L. Hsu, M. Chow, S. Rose and K. G. Furton, *Analytical and Bioanalytical Chemistry,* 376 (2003) 1212-1224.
27 R. J. Harper, J. R. Almirall and K. G. Furton, *Proceedings of the 8th International Symposium on the Analysis and Detection of Explosive (ISADE),* 2004. Ottawa, Canada.
28 R. J. Harper, A. M. Curran, J. R. Almirall and K. G. Furton, *Proceedings of the 1$^{st}$ Olfactory-Based Systems for Security Applications meeting (OBSSA),* 2004, London, United Kingdom.
29 W. Gopel, *Sensors and Actuators,* 2000, 65 pp 70.
30. J. M. Perr et al, *Proceedings of the 8th International Symposium on the Analysis and Detection of Explosive (ISADE),* 2004. Ottawa, Canada.
31 J. M. Perr et al, *Separation Sciences,* 2004, in press.
32 L. A. Pinnaduwage et al, *Review of Scientific Instruments,* 2004, 75(11) pp 4554.
33 J. Yinon, *Analytical Chemistry,* 2003, pp 99A.
34 C. Cummings, *Proceedings of the 1$^{st}$ Olfactory-Based Systems for Security Applications meeting (OBSSA),* 2004, London, United Kingdom.
35 *Existing and Potential Standoff Explosives Detection Techniques,* National Academies Press, Washington, D.C., 2004.
36 H. Bach, Appendix T, *Canine-Assisted Detection, in Alternatives for Landmine Detection,* by J. MacDonald, J. R. Lockwood, J. McFee, T. Altshuler, T. Broach, L. Carin, R. Harmon, C. Rappaport, W. Scott and R. Weaver, 2003, RAND Corporation, Santa Monica, Calif., pp. 285-299.
37 http://www.apopo.org/mediagallery/Limpopo-tests.doc accessed on Mar. 12, 2005.
38 J. J. Bromenshenk et al, Appendix S, *Alternatives for Landmine Detection,* by J. MacDonald, et al, 2003, RAND Corporation, Santa Monica, Calif., pp. 273-283.
39 http://www.aresa.dk/thetec.htm accessed Oct. 31, 2004.
40 S. Sloan, *K9 Case Law,* 3$^{rd}$ National Detector Dog Conference, May 2003, North Miami Beach Fla., USA.
41 J. A. Given, *Controlled Substance Training Aids for DoD,* 3$^{rd}$ National Detector Dog Conference, May 2003, North Miami Beach Fla., USA.
42 Jehuda Yinon, *Modern methods and applications in analysis of explosives,* 1993, Wiley, New York.
43 *Black and smokeless powders: Technologies for Finding Bombs and the Bomb Makers,* National Academy Press, Washington, D.C., 1998.
44 J. M. Johnston and M. Williams, Enhanced *Canine Explosive Detection: Odor Generalization,* Unclassified Final Report for Contract No. DAAD05-96-D-7019, Office of Special Technology, September 1999.
45 Z. Penton, *Method Development with Solid Phase Micro extraction,* Solid Phase Microextraction; A Practical Guide, Wercinski ed, 1999, Marcel Dekker.
46 T. Wan, *Analysis of explosive odor signatures and detector dog performance employing solid phase microextraction/gas chromatography (SPME/GC) and controlled polymer permeation,* 2002 FIU Masters Thesis.
47 M. Williams et al, *Proceedings of SPIE,* 1998, 3575, pp 291-301.
48 W. A. MacCrehan et al, *Journal of Forensic Science* 2002, 47 (5), pp 996-1001.
49 W. Burghardt, 4$^{th}$ *National Detector Dog Conference,* 2005, Auburn Ala.
50 J. Johnston et al, *Proceedings of SPIE,* 1998, 3392 pp 490-501.
51 http://www.atf.treas.gov/explarson/canine.htm accessed on Jun. 20, 2005.
52 Department of Justice, *Odor Recognition Proficiency Standard for Explosives Detection Canines,* ATF draft publication, 2003.
53 http://www.fiu.edu/~ifri/detector_dogs.htm accessed on May 28, 2005.

What is claimed:
1. A method of training a canine to detect, by smell, an odor emanating from a material to be detected, comprising:
selecting an odor component, capable of volatilizing at room temperature, of the material to be detected, wherein the odor component is present in a headspace of the material to be detected;
dissolving the odor component, capable of volatizing at room temperature, of the material to be detected in an organic solvent, wherein the material to be detected is selected from the group consisting of propellants, lead azide, lead styphenate, mercury fulminate, and sheet explosives;
absorbing the dissolved volatilizable component and organic sorbent onto an absorbent material;
evaporating the organic solvent from the absorbent material prior to packaging the absorbent material in an inner container; packaging the absorbent material in the inner container that is permeable to said volatilizable component;
packaging the inner container in an outer container that is impermeable to said volatilizable component, the outer container being size to maintain a space between the inner and outer containers, the space having a desired volume for permeation of a known concentration of the volatilizable component into the space;
forming the known concentration of the volatilizable component in the space by maintaining the inner container in the outer container to allow the volatilizable component to permeate through the inner container into the space until the desired volume is filled with a concentration of the volatilizable component and an outer surface of the inner container is saturated with a concentration of the volatilizable component such that the known concentration of the volatilizable component is provided immediately upon removal of the outer container;
removing the outer container,
exposing the known concentration immediately upon removing the outer container, the known concentration being sufficient for detection by the canine;

disposing the inner container in a location accessible for the canine to detect the volatilizable component permeating through the inner container; and releasing the canine in the location to detect the odor of the volatilizable component permeating through the inner container.

2. The method of claim 1, wherein propellants are selected from the group consisting of black powder, smokeless powder, and flash powder.

3. The method of claim 1, wherein the inner container has a permeability for the volatilizable component in the range of 80.36 pg/s to $3.23 \times 10^3$ pg/s, at room temperature.

4. The method of claim 3, wherein the inner container is a vapor-permeable polymer.

5. The method of claim 4, wherein both the volatilizable component and the organic solvent are absorbed onto an absorbent material prior to placing into the inner container.

6. The method of claim 4, wherein the inner container has a thickness of greater than 2 mils.

7. The method of claim 1, wherein the absorbent material is cotton.

8. The method of claim 1, wherein the solvent is acetonitrile.

9. The method of claim 1, comprising allowing at least 90 minutes for the organic solvent to evaporate.

10. The method of claim 1, comprising allowing 90-240 minutes for the organic solvent to evaporate.

11. The method of claim 1, wherein the volatilizable component is sealed in the inner container.

12. A method of training a canine to detect, by smell, an odor emanating from a material to be detected comprising:
packaging a component, capable of volatizing at room temperature, of the material to be detected in an inner container that is permeable to said volatilizable component, wherein the material to be detected is selected from the group consisting of propellants, explosives, drugs, human remains, and live human scent, and the inner container has a thickness of greater than 2 mils and a permeability for the volatilizable component in a range of 80.36 pg/s to $3.23 \times 10^3$ pg/s, at room temperature;
packaging the inner container in an outer container that is impermeable to said volatilizable component, while maintaining space between the inner and outer containers;
allowing sufficient time for the concentration of the volatilizable component in the inner container and the concentration of said volatilizable component in the space between the inner and outer containers to equilibrate;
removing the outer container;
disposing the inner container in a location accessible for the canine to detect the volatilizable component permeating through the inner container; and
releasing the canine in the location to detect the odor of the volatilizable component permeating through the inner container.

13. The method of claim 12, wherein the volatilizable component is an explosive material tagging agent comprising 2,3-dimethyl-2,3-dinitrobutane; 2-nitrotoluene; 4-nitrotolune; ethylene glycol dinitrate.

14. The method of claim 12, wherein the material to be detected is an organic high explosive selected from the group consisting of aliphatic nitrates; aromatic nitrates; nitramines; nitrate esters; and peroxides.

15. The method of claim 12, wherein the volatilizable component is 1,3-dinitrobenzene, 2,6-dinitrotoluene, 2,4-dinitrotoluene, diphenylamine, dimethyl-2,3-dinitrobutane, cyclohexamone, or 2-ethyl-l-hexanol.

16. The method of claim 12, wherein the material to be detected is selected from the group consisting of wherein the material to be detected is selected from the group consisting of propellants, lead azide, lead styphenate, mercury fulminate, plastic explosives, and sheet explosives.

17. The method of claim 12, wherein packaging the volatilizable component and packaging the inner container prevents contamination of the odor of the volatilizable component to be detected.

18. A method of training a canine to detect, by smell, an odor emanating from a material to be detected comprising:
packaging a component, capable of volatizing at room temperature, of the material to be detected in an inner container that is permeable to said volatilizable component, wherein the volatilizable component is dissolved in an organic solvent and absorbed into an absorbent material prior to packaging in the inner container, and the material to be detected is selected from the group consisting of propellants, lead azide, lead styphenate, mercury fulminate, and sheet explosives;
packaging the inner container in an outer container that is impermeable to said volatilizable component, while maintaining space between the inner and outer containers;
allowing sufficient time for the concentration of the said volatilizable component in the inner container and the concentration of said volatilizable component in the space between the inner and outer containers to equilibrate;
removing the outer container;
disposing the inner container in a location accessible for the canine to detect the volatilizable component permeating through the inner container; and
releasing the canine in the location to detect the odor of the volatilizable component permeating through the inner container.

19. The method of claim 18, wherein the inner container has a thickness of greater than 2 mils and a permeability for the volatilizable component in a range of 80.36 pg/s to $3.23 \times 10^3$ pg/s, at room temperature.

* * * * *